US010575699B2

(12) United States Patent
Bassa et al.

(10) Patent No.: US 10,575,699 B2
(45) Date of Patent: Mar. 3, 2020

(54) SYSTEM FOR SPOT CLEANING BY A MOBILE ROBOT

(71) Applicant: iRobot Corporation, Bedford, MA (US)

(72) Inventors: Angela Bassa, Stoneham, MA (US); Husain Al-Mohssen, Cambridge, MA (US)

(73) Assignee: iRobot Corporation, Bedford, MA (US)

( * ) Notice: Subject to any disclaimer, the term of this patent is extended or adjusted under 35 U.S.C. 154(b) by 199 days.

(21) Appl. No.: 15/863,705

(22) Filed: Jan. 5, 2018

(65) Prior Publication Data

US 2019/0208979 A1 Jul. 11, 2019

(51) Int. Cl.
*A47L 11/40* (2006.01)
*G05D 1/02* (2020.01)
(Continued)

(52) U.S. Cl.
CPC ....... *A47L 11/4038* (2013.01); *A47L 11/4044* (2013.01); *A47L 11/4061* (2013.01);
(Continued)

(58) Field of Classification Search
CPC ............. A47L 11/4038; A47L 11/4044; A47L 11/4061; A47L 2201/04; G05D 1/0219;
(Continued)

(56) References Cited

U.S. PATENT DOCUMENTS

2016/0379092 A1* 12/2016 Kutliroff .................. G06N 3/04
382/158
2017/0169313 A1* 6/2017 Choi .................... G06K 9/6267
(Continued)

FOREIGN PATENT DOCUMENTS

EP 2977844 1/2016
WO WO 2014/070470 5/2014

OTHER PUBLICATIONS

Extended European Search Report in European Appln. No. EP 18206641, dated Apr. 2, 2019, 10 pages.
(Continued)

*Primary Examiner* — Wesley J Tucker
(74) *Attorney, Agent, or Firm* — Fish & Richardson P.C.

(57) ABSTRACT

A system for enabling spot cleaning includes a mobile computing device and a mobile cleaning robot. The mobile computing device includes at least one camera configured to capture images of an environment, and at least one data processor configured to (a) establish, based at least in part on first information provided by the at least one image sensor, a coordinate system in the environment, (b) determine, based at least in part on second information provided by the at least one camera, a first set of coordinates of a region at a first location, (c) determine, based at least in part on third information provided by the at least one camera, a second set of coordinates of a mobile cleaning robot at a second location, (d) send the first set of coordinates and second set of coordinates, or coordinates of the first location relative to the second location, to the mobile cleaning robot, and (e) send an instruction to the mobile cleaning robot to request the mobile cleaning robot to travel to the first location.

30 Claims, 35 Drawing Sheets

(51) Int. Cl.
    *G06K 9/00*     (2006.01)
    *G06K 9/62*     (2006.01)
    *G06K 9/66*     (2006.01)
    *G05D 1/00*     (2006.01)

(52) U.S. Cl.
CPC ......... *G05D 1/0016* (2013.01); *G05D 1/0234* (2013.01); *G05D 1/0246* (2013.01); *G05D 1/0274* (2013.01); *G06K 9/00664* (2013.01); *G06K 9/6273* (2013.01); *G06K 9/66* (2013.01); *A47L 2201/04* (2013.01); *G05D 1/0219* (2013.01); *G05D 1/0227* (2013.01); *G05D 1/0238* (2013.01); *G05D 2201/0203* (2013.01); *G05D 2201/0215* (2013.01)

(58) Field of Classification Search
CPC ......... G05D 2201/0215; G05D 1/0238; G05D 2201/0203; G05D 1/0227; G05D 1/0016; G05D 1/0234; G05D 1/0246; G05D 1/027; G06K 9/00664; G06K 9/6273; G06K 9/66
See application file for complete search history.

(56) References Cited

U.S. PATENT DOCUMENTS

| | | | | |
|---|---|---|---|---|
| 2018/0174001 | A1* | 6/2018 | Kang | G06K 9/6262 |
| 2019/0212752 | A1* | 7/2019 | Fong | A47L 9/2815 |
| 2019/0213438 | A1* | 7/2019 | Jones | A47L 9/009 |
| 2019/0213755 | A1* | 7/2019 | Bassa | G06K 9/00671 |
| 2019/0216283 | A1* | 7/2019 | Cabrera | A47L 9/2821 |

OTHER PUBLICATIONS

Angra et al., "Machine Learning and its Applications: A Review," 2017 International Conference on Big Data Analytics and Computational Intelligence (ICBDAC), Mar. 23-25, 2017, 4 pages.
Bagnell et al., "Learning for Autonomous Navigation," IEEE Robotics & Automation Magazine, Jun. 2010, 11 pages.
Ellis et al., "Autonomous Navigation and Sign Detector Learning," 2013 IEEE Workshop on Robot Vision (WORV), Jan. 15-17, 2013, 8 pages.
Fromm et al., "Robust Multi-Algorithm Object Recognition Using Machine Learning Methods," 2012 IEEE International Conference on Multisensor Fusion and Integration for Intelligent Systems (MFI) Sep. 13-15, 2012. Hamburg, Germany, 8 pages.
Golding et al., "Indoor navigation using a diverse set of cheap, wearable sensors," Digest of Papers. Third International Symposium on Wearable Computers, Oct. 18-19, 1999, 8 pages.
Howard et al., "MobileNets: Efficient Convolutional Neural Networks for Mobile Vision Applications," Joshua's Blog, retrieved from the Internet <https://joshua19881228.github.io/2017-07-19-MobileNet/>, retrieved on Nov. 15, 2018, 7 pages.
LeCun et al., "Learning Methods for Generic Object Recognition with Invariance to Pose and Lighting," Proceedings of the 2004 IEEE Computer Society Conference on Computer Vision and Pattern Recognition, 2004. CVPR 2004, Jun. 27-Jul. 2, 2004, 8 pages.
Louridas et al., "Machine Learning," IEEE Software, vol. 33 Issue 5 • Sep.-Oct. 2016, 6 pages.
Malowany et al., "Visual Reinforcement Learning for Object Recognition in Robotics," 2016 ICSEE International Conference on the Science of Electrical Engineering, Jan. 1995, 14(1):1-5.
Moore et al., "Efficient Memory-based Learning for Robot Control," Dissertation submitted for the degree of Doctor of Philosophy in the University of Cambridge, Oct. 1990, 42 pages.
Murase et al., "Visual Learning and Recognition of 3-D Objects from Appearance," International Journal of Computer Vision, 1995, 14:5-24.
Paletta et al., "Active object recognition by view integration and reinforcement learning," Robotics and Autonomous Systems, 2000, 31:71-86.
Pontil et al. "Support Vector Machines for 3D Object Recognition," IEEE Transactions on Pattern Analysis and Machine Intelligence, Jun. 1998, 20(6):637-646.
Stauffer et al., "Learning Patterns of Activity Using Real-Time Tracking," IEEE Transactions on Pattern Analysis and Machine Intelligence, Aug. 2000, 22(8):747-757.
Thrun, "Learning metric-topological maps for indoor mobile robot navigation," Artificial Intelligence, 1998, 99:21-71.
Tsutsumi et al., "Hybrid Approach of Video Indexing and Machine Learning for Rapid Indexing and Highly Precise Object Recognition," Proceedings 2001 International Conference on Image Processing (Cat. No. 01CH37205), Oct. 7-10, 2001, 4 pages.
Viola et al., "Rapid Object Detection using a Boosted Cascade of Simple Features," Proceedings of the 2001 IEEE Computer Society Conference on Computer Vision and Pattern Recognition. CVPR 2001, Dec. 8-14, 2001, 8 pages.
Xu et al., "Extreme Learning Machine Based Fast Object Recognition," 2012 15th International Conference on Information Fusion, Jul. 9-12, 2012, 7 pages.
Zuo et al., "A Reinforcement Learning Based Robotic Navigation System," 2014 IEEE International Conference on Systems, Man, and Cybernetics, Oct. 5-8, 2014, San Diego, CA, USA, 6 pages.

* cited by examiner

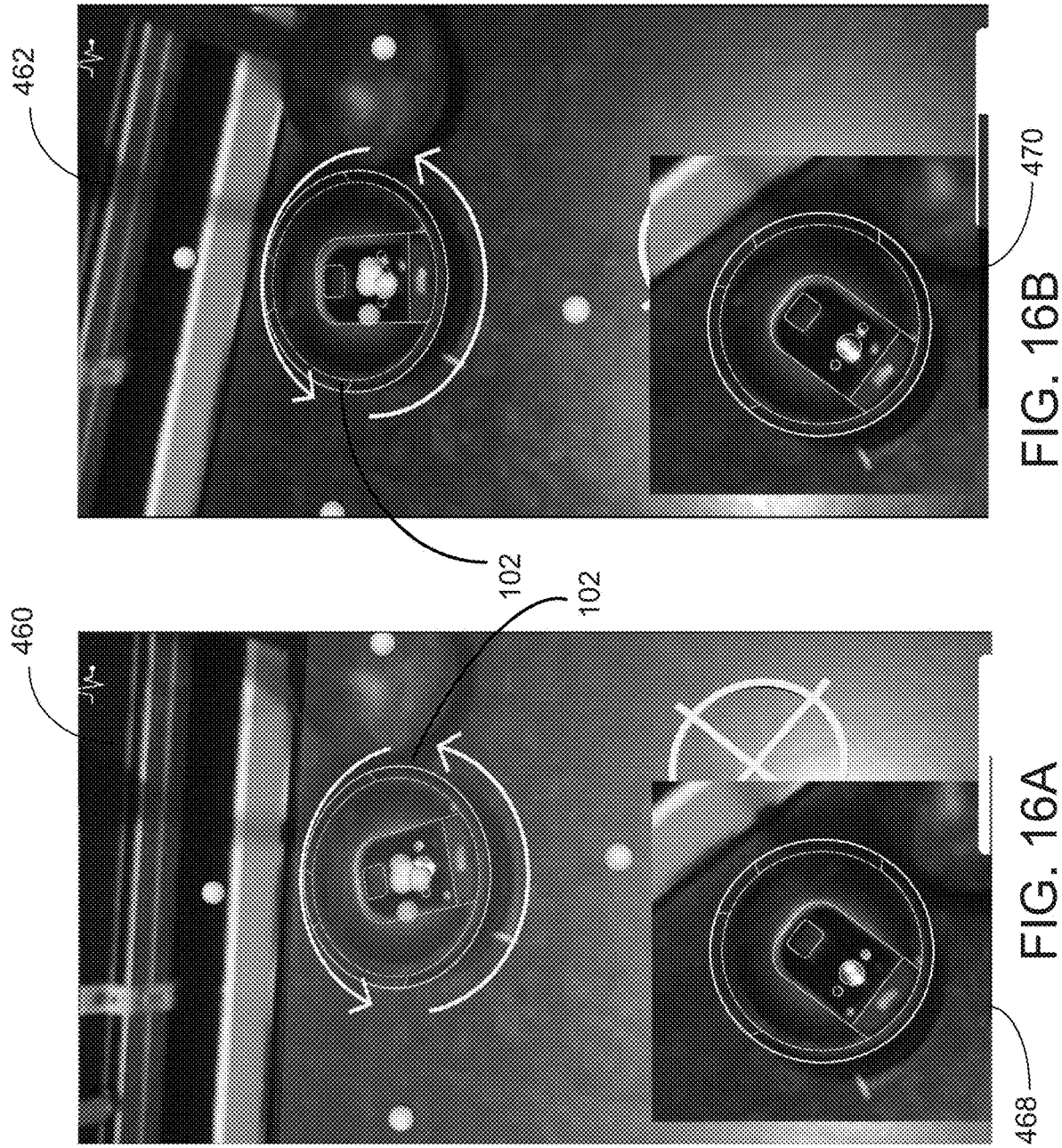

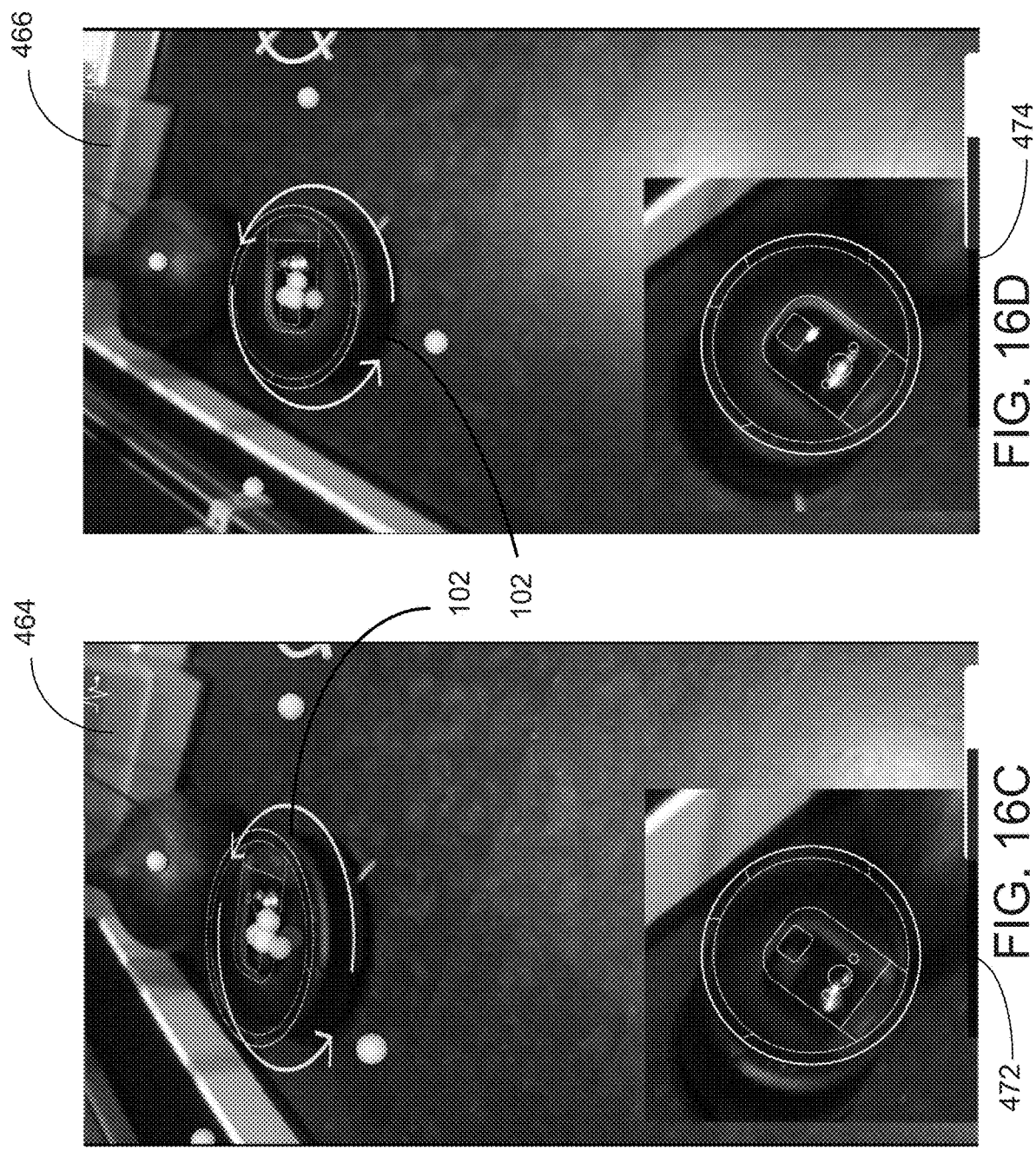

SYSTEM FOR SPOT CLEANING BY A MOBILE ROBOT

TECHNICAL FIELD

The description relates to a system for spot cleaning by mobile robots.

BACKGROUND

In some examples, a conventional cleaning robot can clean an entire room by roaming around the room and sweeping up dust along the way. The robot may make several passes across the room and attempt to cover as much floor area as possible. If the user of the cleaning robot wants the robot to clean a particular spot in the room, the user can pick up the robot and place the robot near the spot that needs to be cleaned. The robot establishes a map of the areas that it has traveled. After the robot determines that it has covered most of the floor areas of the room, the robot returns to a charging station to recharge and waits for the next scheduled cleaning session.

SUMMARY

This document describes a system that enables spot cleaning by one or more mobile robots. In some implementations, the system includes a mobile computing device that determines the position(s) of one or more spots or regions to be cleaned and the position(s) of one or more mobile robots, and sends the position information to the mobile robot(s). In some implementations, a remote computing system (e.g., a system that includes cloud server computers) performs some of the computations, and instructions can be sent from the remote computing system to the mobile robot(s). In some implementations, markers are placed in the environment to assist the robot(s) in navigating an environment or serve as references for the robot(s) in determining the position(s) of the spot(s) or regions(s) to be cleaned. In some implementations, an augmented reality toolkit is used to determine the coordinates of the spot(s) or regions(s) to be cleaned and the coordinates of the robot(s). In some implementations, deep machine leaning is used to train one or more leaning modules to establish models for identifying the robot(s) and models for determining the orientation angles of the robot(s).

In a general aspect, a system for enabling spot cleaning is provided. The system includes a mobile computing device having at least one camera configured to capture images of an environment (e.g., a home). The mobile computing device includes a storage device storing processor-executable instructions, and at least one data processor communicatively coupled to the storage device. Upon execution of the processor-executable instructions by the at least one data processor, the at least one data processor is configured to establish, based at least in part on first information (e.g., images of the environment) provided by the at least one camera, a coordinate system corresponding to the environment. The at least one data processor is configured to determine, based at least in part on second information (e.g., one or more images of a region) provided by the at least one camera, a first set of coordinates of a region at a first location. The at least one data processor is configured to determine, based at least in part on third information (e.g., one or more images of a mobile cleaning robot) provided by the at least one camera, a second set of coordinates of a mobile cleaning robot at a second location. The at least one data processor is configured to send the first set of coordinates and the second set of coordinates, or the coordinates of the first location relative to the second location, to the mobile cleaning robot, and send a first instruction to the mobile cleaning robot to request the mobile cleaning robot to travel to the first location (e.g., the location of the region that needs to be cleaned).

Implementations of the system can include one or more of the following features. The at least one data processor can be configured to send a second instruction to the mobile cleaning robot to request the mobile cleaning robot to perform a cleaning function in the region at the first location.

The first information can include images of the environment, the second information can include one or more images of the region at the first location, and the third information can include one or more images of the mobile cleaning robot.

The storage device can store a neural network (e.g., a convolutional neural network) that has been trained using images of the mobile cleaning robot or similar mobile cleaning robots, or images derived from the images of the mobile cleaning robot or similar mobile cleaning robots. The at least one data processor can be configured to process, using the neural network, one or more images provided by the at least one camera, or one or more images derived from the one or more images of the mobile cleaning robot provided by the at least one camera, to identify the mobile cleaning robot in the one or more images.

The at least one data processor can be configured to identify a feature of the mobile cleaning robot in the one or more images, determine coordinates of the feature in the coordinate system, and assign the coordinates of the feature as the second set of coordinates of the mobile cleaning robot.

The at least one data processor can be configured to use fourth information provided by the at least one camera to determine an angle of orientation of the mobile cleaning robot, and send the angle of orientation of the mobile cleaning robot to the mobile cleaning robot.

The at least one data processor can be configured to use a neural network to process one or more images of the mobile cleaning robot provided by the at least one camera, or one or more images derived from the images of the mobile cleaning robot provided by the at least one camera, to determine the angle of orientation of the mobile cleaning robot.

The at least one data processor can be configured to process one or more images of the mobile cleaning robot to generate one or more top-view images of the mobile cleaning robot, and use the neural network to process the one or more top-view images of the mobile cleaning robot to determine the angle of orientation of the mobile cleaning robot.

The neural network can be trained using top-view images of the mobile cleaning robot or similar mobile cleaning robots.

The system can include the mobile cleaning robot, in which the mobile cleaning robot is configured to, upon receiving the first instruction, the first set of coordinates, the second set of coordinates, and the angle of orientation, travel from the second location to the first location.

The at least one data processor can be configured to process video frames provided by the at least one camera and identify feature points in the video frames; track the feature points across multiple video frames and estimate three-dimensional positions of the feature points; fit planes to the feature points and identify a plane that best matches the feature points; and establish the coordinate system based on the identified plane.

The feature points can substantially lie on the floor surface, and the identified plane can substantially lie on the floor surface.

The mobile computing device can include a user interface that is configured to provide images of the environment to a user and enable the user to identify the region at the first location in the images.

The at least one data processor can be configured to identify one or more feature points at or near the region identified by the user and determine the first set of coordinates based on position(s) of the one or more feature points at or near the region.

The storage device can store program code for one or more image detection modules and an augmented reality toolkit, and the at least one data processor can be configured to use the one or more image detection modules and the augmented reality toolkit to establish the coordinate system in the environment, determine the first set of coordinates of the region, and determine the second set of coordinates of the mobile cleaning robot.

The mobile computing device can include at least one motion sensor, and the at least one data processor can be configured to establish the coordinate system in the environment based on the first information provided by the at least one camera and information provided by the at least one motion sensor. The at least one data processor can be configured to determine the first set of coordinates of the region based on the second information provided by the at least one camera and information provided by the at least one motion sensor. The at least one data processor can be configured to determine the second set of coordinates of the mobile cleaning robot based on the third information provided by the at least one camera and information provided by the at least one motion sensor.

The coordinate system can include the coordinate system of a virtual space that corresponds to the environment.

In another general aspect, a system for enabling spot cleaning is provided. The system includes a mobile computing device having at least one camera configured to capture images of an environment. The mobile computing device includes a storage device storing processor-executable instructions, and at least one data processor communicatively coupled to the storage device. Upon execution of the processor-executable instructions by the at least one data processor, the at least one data processor is configured to establish, based at least in part on first information (e.g., images of the environment) provided by the at least one camera, a coordinate system corresponding to the environment. The at least one data processor is configured to determine, based at least in part on second information (e.g., one or more images of a region) provided by the at least one camera, a first set of coordinates of a region at a first location. The at least one data processor is configured to determine, based at least in part on third information (e.g., one or more images of an object) provided by the at least one camera, a second set of coordinates of an object in the environment, in which the location of the object is known to a mobile cleaning robot. The at least one data processor is configured to send information about the coordinates of the region and coordinates of the object, or relative position information about the region and the object, to the mobile cleaning robot, and send a first instruction to the mobile cleaning robot to request the mobile cleaning robot to travel to the first location.

Implementations of the system can include one or more of the following features. The system can include the mobile cleaning robot, in which the mobile cleaning robot can be configured to determine the position of the first location relative to the object, and travel to the first location based on information about the position of the object in a map maintained by the mobile cleaning robot, and information about the position of the first location relative to the object.

The first information can include images of the environment, the second information can include one or more images of the region at the first location, and the third information can include one or more images of the object.

The at least one data processor can be configured to process video frames provided by the at least one camera and identify feature points in the video frames; track the feature points across multiple video frames and estimate three-dimensional positions of the feature points; fit planes to the feature points and identify a plane that best matches the feature points; and establish the coordinate system based on the identified plane.

The feature points can substantially lie on the floor surface, and the identified plane can substantially lie on the floor surface.

The mobile computing device can include a user interface that is configured to provide images of the environment to a user and enable the user to identify the region at the first location in the images.

The at least one data processor can be configured to identify one or more feature points at or near the region identified by the user and determine the first set of coordinates based on positions of the one or more feature points at or near the region.

The storage device can store program code for image detection modules and an augmented reality toolkit, and the at least one data processor can be configured to use the image detection modules and the augmented reality toolkit to establish the coordinate system in the environment, determine the first set of coordinates of the region, and determine the second set of coordinates of the object.

The mobile computing device can include at least one motion sensor, and the at least one data processor can be configured to establish the coordinate system in the environment based on the first information provided by the at least one camera and information provided by the at least one motion sensor. The at least one data processor can be configured to determine the first set of coordinates of the region based on the second information provided by the at least one camera and information provided by the at least one motion sensor. The at least one data processor can be configured to determine the second set of coordinates of the object based on the third information provided by the at least one camera and information provided by the at least one motion sensor.

The coordinate system can include the coordinate system of a virtual space that corresponds to the environment.

In another general aspect, a method for spot cleaning using a mobile cleaning robot is provided. The method includes using a camera of a mobile computing device to capture images of an environment; establishing, using at least one data processor of the mobile computing device, a coordinate system corresponding to the environment based at least in part on first information derived from the images of the environment; determining, using the at least one data processor of the mobile computing device, a first set of coordinates of a region at a first location based at least in part on one or more images of the region; determining, using the at least one data processor of the mobile computing device, a second set of coordinates of a mobile cleaning robot at a second location based at least in part on one or more images of the mobile cleaning robot; sending the first set of coordinates and the second set of coordinates, or the coordinates of the first location relative to the second location, from the mobile computing device to the mobile cleaning robot; and sending an instruction from the mobile computing device to the mobile cleaning robot to request the mobile cleaning robot to travel to the first location.

Implementations of the method can include one or more of the following features. Determining the second set of coordinates of the mobile cleaning robot at the second location can include using a first neural network (e.g., a convolutional neural network) to process one or more images of the mobile cleaning robot to identify the mobile cleaning robot in the one or more images.

Determining the second set of coordinates of the mobile cleaning robot at the second location can include identifying a feature of the mobile cleaning robot in the one or more images, determine coordinates of the feature in the coordinate system, and assign the coordinates of the feature as the second set of coordinates of the mobile cleaning robot.

The first neural network can be trained using images of the mobile cleaning robot or similar mobile cleaning robots, or images derived from the images of the mobile cleaning robot or similar mobile cleaning robots.

The method can include determining, using the at least one data processor, an angle of orientation of the mobile cleaning robot based at least in part on one or more images of the mobile cleaning robot, and sending the angle of orientation of the mobile cleaning robot to the mobile cleaning robot.

The method can include using a second neural network to process the one or more images of the mobile cleaning robot, or one or more images derived from the one or more images of the mobile cleaning robot, to determine the angle of orientation of the mobile cleaning robot.

The method can include processing the one or more images of the mobile cleaning robot to generate one or more top-view images of the mobile cleaning robot, and using the second neural network to process the one or more top-view images of the mobile cleaning robot to determine the angle of orientation of the mobile cleaning robot.

The second neural network can be trained using images of the mobile cleaning robot or similar mobile cleaning robots, or images derived from the images of the mobile cleaning robot or similar mobile cleaning robots.

The method can include causing the mobile cleaning robot, based on the received first set of coordinates, second set of coordinates, and angle of orientation, to travel from the second location to the first location.

The method can include processing video frames of the environment and identifying feature points from the video frames; tracking the feature points across multiple video frames and estimating three-dimensional positions of the feature points; fitting planes to the feature points and identifying a plane that best matches the feature points; and establishing the coordinate system based on the identified plane.

The video frames can include video frames of a floor surface in the environment, the identified plane can substantially lies on the floor surface, and the coordinate system can include a Cartesian coordinate system having two axes that substantially lie on the identified plane.

The method can include showing, through a user interface, images of the environment to a user, and receiving an instruction from the user that identifies the region at the first location in the images.

The method can include identifying, using the at least one data processor, one or more feature points at or near the region identified by the user, and determining the first set of coordinates based on position(s) of the one or more feature points at or near the region.

The method can include sending an instruction from the mobile computing device to the mobile cleaning robot to request the mobile cleaning robot to follow the user as the user moves from a vicinity of the first location to a vicinity of the second location.

The method can include, at the mobile cleaning robot, capturing images of the user, tracking the user using image recognition, and following the user as the user moves from the vicinity of the first location to the vicinity of the second location.

The method can include using an augmented reality toolkit to establish the coordinate system in the environment, determine the first set of coordinates of the region, and determine the second set of coordinates of the mobile cleaning robot.

Establishing the coordinate system in the environment can include establishing the coordinate system in the environment based on information derived from the images of the environment and information provided by at least one motion sensor.

Determining the first set of coordinates of the region can include determining the first set of coordinates of the region based on one or more images of the region and information provided by at least one motion sensor.

Determining the second set of coordinates of the mobile cleaning robot can include determining the second set of coordinates of the mobile cleaning robot based on one or more images of robot and information provided by at least one motion sensor.

In another general aspect, a method for enabling spot cleaning is provided. The method includes using a mobile computing device having a camera to capture images of an environment; establishing, using at least one data processor of the mobile computing device, a coordinate system in the environment based at least in part on first information derived from the images of the environment; determining, using the at least one data processor of the mobile computing device, a first set of coordinates of a region at a first location based at least in part on one or more images of the region; determining, using the at least one data processor of the mobile computing device, a second set of coordinates of an object in the environment based at least in part on one or more images of the object, in which the location of the object is known to a mobile cleaning robot; sending information about coordinates of the region and coordinates of the object, or relative position information about the region and the object, to the mobile cleaning robot; and sending an instruction to the mobile cleaning robot to request the mobile cleaning robot to travel to the first location.

Implementations of the method can include one or more of the following features. The method can include causing the mobile cleaning robot to determine the position of the first location relative to the position of the object, and travel to the first location based on information about the position of the object in a map maintained by the mobile cleaning robot, and the information about the position of the first location relative to the object.

Determining the second set of coordinates of the object at the second location can include identifying a feature of the object in the image, determine coordinates of the feature in the coordinate system, and assign the coordinates of the feature as the second set of coordinates of the object.

The method can include processing video frames of the environment and identifying feature points from the video frames; tracking the feature points across multiple video frames and estimating three-dimensional positions of the feature points; fitting planes to the feature points and identifying a plane that best matches the feature points; and establishing the coordinate system based on the identified plane.

The video frames can include video frames of a floor surface in the environment, the identified plane can substantially lies on the floor surface, and the coordinate system can include a Cartesian coordinate system having two axes that substantially lie on the identified plane.

The method can include showing, through a user interface, images of the environment to a user, and receiving an instruction from the user that identifies the region at the first location in the images.

The method can include identifying, using the at least one data processor, one or more feature points at or near the region identified by the user, and determining the first set of coordinates based on position(s) of the one or more feature points at or near the region.

The method can include using an augmented reality toolkit to establish the coordinate system in the environment, determine the first set of coordinates of the region, and determine the second set of coordinates of the object.

Establishing the coordinate system in the environment can include establishing the coordinate system in the environment based on information derived from the images of the environment and information provided by at least one motion sensor.

Determining the first set of coordinates of the region can include determining the first set of coordinates of the region based on images of the region and information provided by at least one motion sensor.

Determining the second set of coordinates of the mobile cleaning robot can include determining the second set of coordinates of the object based on images of object and information provided by at least one motion sensor.

In another general aspect, a computer-readable medium storing a computer program for enabling spot cleaning is provided. The computer program includes instructions for causing a computer system to capture images of an environment; establish, based at least in part on the images of the environment, a coordinate system corresponding to the environment; capture one or more images of a region at a first location; determine, based at least in part on the one or more images of the region, a first set of coordinates of the region; capture one or more images of a mobile cleaning robot at a second location; determine, based at least in part on the one or more images of the mobile cleaning robot, a second set of coordinates of the mobile cleaning robot; send the first set of coordinates and the second set of coordinates to the mobile cleaning robot; and send a first instruction to the mobile cleaning robot to request the mobile cleaning robot to travel from the second location associated with the second set of coordinates to the first location associated with the first set of coordinates.

In another general aspect, a computer-readable medium storing a computer program for enabling spot cleaning is provided. The computer program includes instructions for causing a computer system to capture images of an environment; establish a coordinate system in the environment based at least in part on first information derived from the images of the environment; determine a first set of coordinates of a region at a first location based at least in part on one or more images of the region; determine a second set of coordinates of an object in the environment based at least in part on one or more images of the object, in which the location of the object is known to a mobile cleaning robot; send information about coordinates of the region and coordinates of the object, or relative position information about the region and the object, to the mobile cleaning robot; and send an instruction to the mobile cleaning robot to request the mobile cleaning robot to travel to the first location.

The aspects described above can be embodied as systems, methods, computer programs stored on one or more computer storage devices, each configured to perform the actions of the methods, or means for implementing the methods. A system of one or more computing devices can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

Other features and advantages of the description will become apparent from the following description, and from the claims.

Unless otherwise defined, the technical and scientific terms used herein have the same meaning as commonly understood by one of ordinary skill in the art to which this invention belongs.

DESCRIPTION OF DRAWINGS

FIGS. 16A to 16D are diagrams showing transformations of images of a mobile robot taken at inclined angles to top-view images of the mobile robot.

DESCRIPTION

Figure 1A:
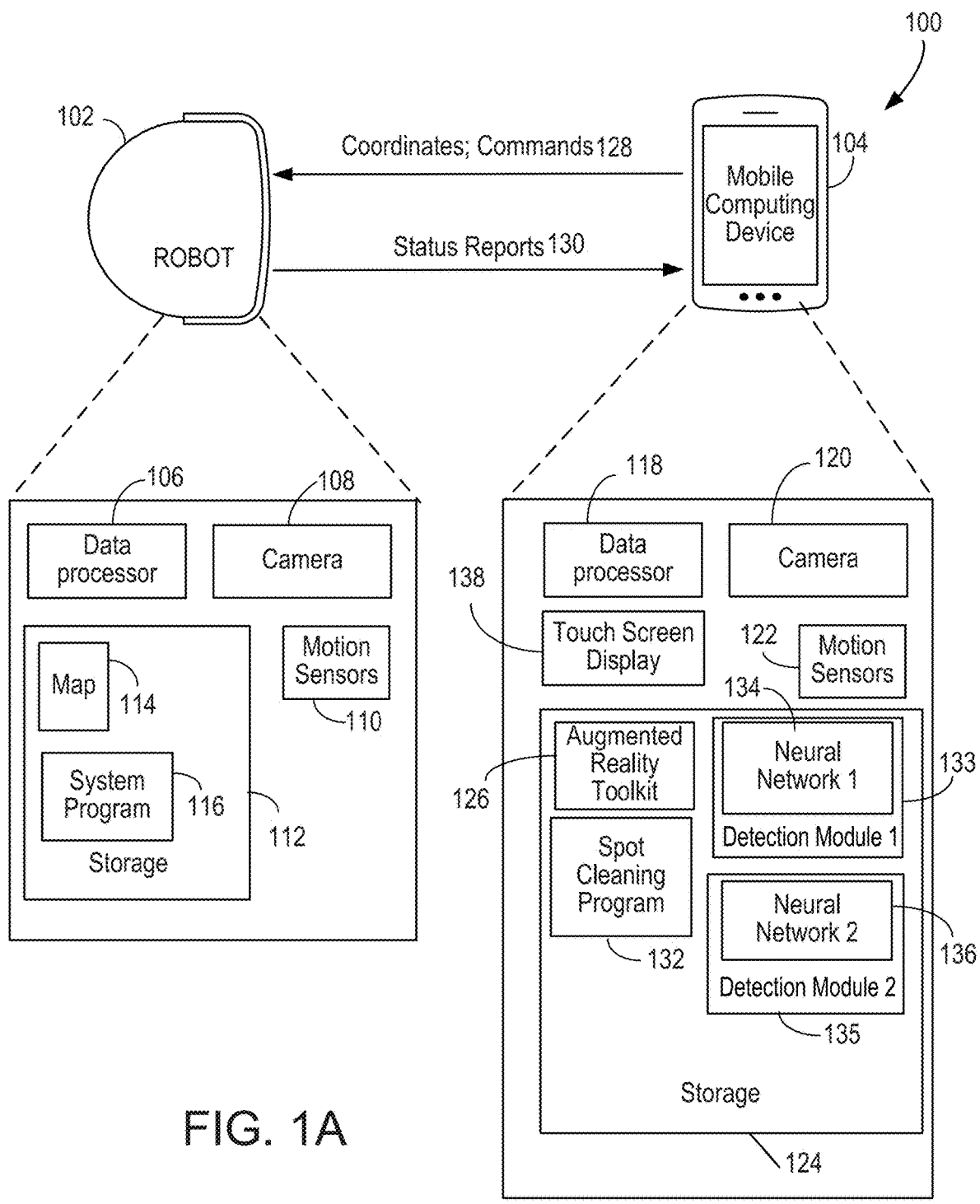
FIG. 1A is a block diagram of an example system that enables spot cleaning by a mobile robot.

In this document, we describe a novel mobile robot cleaning system for enabling a user to conveniently identify a particular spot or region that needs to be cleaned and have a mobile cleaning robot go clean the identified spot or region without requiring the user to provide complicated instructions. In some implementations, the mobile robot cleaning system provides a user interface to allow the user to conveniently identify the mobile cleaning robot and the spot or region that needs to be cleaned. The system establishes a coordinate system, determines the location of the mobile cleaning robot and the location of the spot or region in the coordinate system, and sends information about the position of the spot or region and the position of the mobile cleaning robot to the mobile cleaning robot. In some implementations, the system determines the position of the spot or region relative to the mobile cleaning robot, and sends information about the relative position of the spot or region to the mobile cleaning robot. This enables the mobile cleaning robot to navigate to the spot or region and perform a cleaning task.

In some implementations, the system includes a mobile computing device that has one or more cameras that can capture scene images of an environment surrounding the mobile computing device, and one or more motion sensors that can sense movements of the mobile computing device. The mobile computing device includes an augmented reality toolkit to provide an augmented reality experience to the user. The augmented reality toolkit can generate a virtual space and track a correspondence between the real-world space that the user inhabits and the virtual space having visual virtual content using a visual-inertial odometry technique, in which information from the motion sensors is combined with computer vision analysis of the scene images captured by the one or more cameras. When the virtual content is displayed together with a live camera image, the user experiences augmented reality with an illusion that the virtual content is part of the real world.

The mobile computing device uses the augmented reality tool to establish a coordinate system in a virtual space and track a correspondence between the real-world space and the virtual space. The mobile computing device uses the augmented reality tool to determine the coordinates of the spot or region that needs to be cleaned in the virtual space, determine the coordinates of the mobile cleaning robot in the virtual space, and determine the orientation angle of the mobile cleaning robot in the virtual space. Because of the correspondence between the virtual space and the real world, the mobile cleaning robot can determine the real-world position of the spot or region relative to the mobile cleaning robot based on the virtual-space position of the spot or region relative to the mobile cleaning robot. Likewise, the mobile cleaning robot can determine the orientation angle of the mobile cleaning robot relative to a reference direction in the real world based on the orientation angle of the mobile cleaning robot relative to a corresponding reference direction in the virtual space In some examples, the mobile computing device determines the position of the spot or region relative to the mobile cleaning robot based on a difference between the coordinates of the spot or region in the virtual space and the coordinates of the mobile cleaning robot in the virtual space. The mobile computing device sends to the mobile cleaning robot information about the relative position of the spot or region and information about the orientation angle of the mobile cleaning robot. Based on the information about the relative position of the spot or region and information about the orientation angle of the mobile cleaning robot, the mobile cleaning robot can navigate to the spot or region and clean the spot or region.

In some examples, the mobile computing device sends the virtual-space coordinates of the spot or region, the virtual-space coordinates of the mobile cleaning robot, and the orientation angle of the mobile cleaning robot relative to a reference direction in the virtual space to the mobile cleaning robot. Based on the received information, the mobile cleaning robot determines the relative coordinates of the spot or region and navigates to the spot or region.

For example, the mobile computing device uses the augmented reality tool to determine a virtual plane that is parallel to and lies on the floor surface. The virtual plane corresponds to the x-y plane in the coordinate system of the virtual space. The mobile computing device uses the augmented reality tool to determine that the spot that needs to be cleaned is at coordinates (x1, y1, 0) in the virtual space, the mobile cleaning robot is at coordinates (x2, y2, 0) in the virtual space, and the orientation angle of the mobile cleaning robot is θ degrees relative to the +x axis. The mobile computing device sends relevant information to the mobile cleaning robot. The mobile cleaning robot turns θ degrees clockwise, moves a distance of (x1−x2) in the +x direction, and moves a distance of (y1−y2) in the +y direction to reach the spot, assuming there is no obstacle in the path. Alternatively, the mobile cleaning robot turns $$\theta - \tan^{-1}\frac{y1-y2}{x1-x2}$$

degrees clockwise and moves a distance of $\sqrt{(y1-y2)^2+(x1-x2)^2}$ to reach the spot, assuming there is no obstacle in the path. The above are just examples, it is understood that once the mobile cleaning robot knows the starting coordinates, the target coordinates, and its starting orientation angle, the mobile cleaning robot will be able to navigate the environment using a suitable path that avoids obstacles in the environment.

In some implementations, the mobile computing device provides a user interface, such as a touch screen display, to enable the user to easily identify the spot or region that needs to be cleaned and identify the mobile cleaning robot. For example, the user can point the camera of the mobile computing device towards the spot or region, and an image of a scene that includes the spot or region is shown on the touch screen display. The user provides a touch input by touching the spot in the image on the touch screen display to identify the spot that needs to be cleaned. The augmented reality tool performs an image analysis to determine a first point in the real world that corresponds to the spot in the image identified by the user, and determines the coordinates of the first point in the virtual space coordinate system. Then the user moves the mobile computing device to a vicinity of the mobile cleaning robot. As the user moves from a vicinity of the spot that needs to be clean to the vicinity of the mobile cleaning robot, the augmented reality system continues to analyze the images captured by the camera and the motion sensing data provided by the motion sensors, and uses visual-inertial odometry techniques to determine the position and orientation of the mobile computing device in the real world.

The user points the camera of the mobile computing device towards the mobile cleaning robot, and an image of the mobile cleaning robot is shown on the touch screen display. In some implementations, the system analyzes the scene images captured by the camera (e.g., using a deep machine learning module having, e.g., a neural network that has been trained to recognize objects) and automatically recognizes the mobile cleaning robot without further input from the user. The augmented reality tool performs an image analysis to determine a second point in the real world that corresponds to a point, e.g., the center, of the mobile cleaning robot in the image, and determines the coordinates of the second point in the coordinate system of the virtual space. The system can send the coordinates of the first point and the coordinates of the second point to the mobile cleaning robot, and the mobile cleaning robot can determine the position of the first point relative to the second point. Alternatively, the system can determine the position of the first point relative to the second point based on differences between the coordinates of the first point and the coordinates of the second point, and send the relative position information to the mobile cleaning robot.

In some implementations, the system provides a user interface to enable the user to manually rotate the mobile cleaning robot to change the orientation angle of the mobile cleaning robot so that the mobile cleaning robot is aligned with a certain direction, e.g., the +x axis or the +y axis. In some implementations, the system analyzes the scene images captured by the camera and automatically recognizes the orientation angle of the mobile cleaning robot without further input from the user. The mobile computing device sends to the mobile cleaning robot information about the relative position of the spot (or the coordinates of the mobile cleaning robot and the coordinates of the spot) and information about the orientation angle of the mobile cleaning robot. Based on the information about the relative position of the spot (or the coordinates of the mobile cleaning robot and the coordinates of the spot) and information about the orientation angle of the mobile cleaning robot, the mobile cleaning robot navigates to the spot to perform a cleaning task.

In some implementations, the system includes a first image detection module having a first neural network (e.g., a convolutional neural network) that is configured to recognize the mobile cleaning robot. The first neural network is trained using several images of the mobile cleaning robot or other mobile cleaning robots of the same model. The training images include images of the mobile cleaning robot taken from various distances relative to the mobile cleaning robot, various viewing angles relative to the mobile cleaning robot, and under various lighting conditions. This allows the trained neural network to be able to recognize the mobile cleaning robot under various lighting conditions, and under various circumstances in which the user can hold the camera of the mobile computing device at an arbitrary distance (within a certain range) and at an arbitrary viewing angle relative to the mobile cleaning robot.

In some implementations, the system includes a second image detection module having a second neural network that is configured to recognize the orientation angle of the mobile cleaning robot. The second neural network is trained using several images of the mobile cleaning robot or other mobile cleaning robots of the same model, in which the mobile cleaning robot is oriented at various angles. The training images include images of the mobile cleaning robot taken from various distances relative to the mobile cleaning robot, various viewing angles relative to the mobile cleaning robot, and under various lighting conditions. This allows the trained neural network to be able to recognize the orientation angle of the mobile cleaning robot under various lighting conditions, and under various circumstances in which the user can hold the camera of the mobile computing device at an arbitrary distance (within a certain range) and at an arbitrary viewing angle relative to the mobile cleaning robot.

Referring to FIG. 1A, in some implementations, a mobile robot cleaning system 100 includes a mobile cleaning robot 102 and a mobile computing device 104. The mobile cleaning robot 102 includes, e.g., one or more data processors 106, one or more cameras 108, and one or more motion sensors 110. The mobile cleaning robot 102 includes a storage device 112 that stores a map 114 used for navigation, and program instructions or program code 116 that can be executed by the one or more data processors 106 cause the one or more data processors 106 to perform various analyses and computations.

The mobile computing device 104 can be, e.g., a mobile phone, a tablet computer, or a wearable computing device, such as smart glasses. The mobile computing device 104 includes one or more data processors 118, one or more cameras 120, one or more motion sensors 122, and a touch screen display 138. Each camera 120 includes one or more image sensors that are sensitive to visible light and optionally, infrared light. The mobile computing device 104 includes a storage device 124 storing program instructions for an augmented reality toolkit 126 and program instructions for a spot cleaning program 132. The storage device 124 can store one or more image detection or recognition modules. For example, the image detection or recognition module can include a neural network, such as a convolutional neural network. In this example, the storage device 124 stores a first image detection module 133 that includes a first neural network 134 for recognizing the mobile cleaning robot 102, and a second image detection module 135 that includes a second neural network 136 for recognizing the orientation angle of the mobile cleaning robot 102.

Each of the mobile computing device 104 and the mobile cleaning robot 102 has a wireless communication module, enabling the mobile computing device 104 to communicate with the mobile cleaning robot 102. For example, the mobile computing device 104 can send coordinate information and commands 128 to the mobile cleaning robot 102. The mobile cleaning robot 102 can send status reports 130 to the mobile computing device 104.

The spot cleaning program 132 manages the operations for spot cleaning, and manages the processing of information provided by various input devices and sensors, such as images provided by the camera 120, sensor data provided by the motion sensors 122, touch input data provided by the touch screen display 138. The spot cleaning program 132 invokes the augmented reality toolkit 126, the first image detection system 133, and the second image detection system 135 to process the information provided by the various input devices and sensors.

For example, when the mobile cleaning robot 102 is used in a home environment, the one or more camera 120 can capture scene images in the home. The augmented reality toolkit 126 can provide an augmented reality experience to the user by displaying virtual content together with a live camera image of objects in the home. The augmented reality toolkit 126 can be developed by a developer of the mobile robot cleaning system 100. In some examples, the developer of the mobile robot cleaning system 100 can leverage functionalities of sophisticated augmented reality software developed by other entities. For example, the augmented reality toolkit 126 can be developed by the manufacturer of the mobile computing device 104. The augmented reality toolkit 126 can be bundled with the mobile computing device 104, or downloaded from the web site of the developer of the toolkit 126.

The augmented reality toolkit 126 can have various tools, such as:
- A tool for using a camera of a mobile computing device to track the device's orientation and position, and detect real-world flat surfaces.
- A tool for providing information about the position and orientation of a real-world flat surface detected in a world-tracking augmented-reality session.
- A tool that provides information about a real-world surface found by examining a point in the device camera view of an augmented-reality session.
- A tool that provides information about a real-world position and orientation that can be used for placing objects in an augmented-reality scene.
- A tool that provides information about a video image and position tracking information captured as part of an augmented-reality session.
- A tool that provides information about the camera position and imaging characteristics for a captured video frame in an augmented-reality session.
- A tool that provides estimated scene lighting information associated with a captured video frame in an augmented-reality session.

The augmented reality toolkit 126 can have various application programming interfaces (API) that allows the spot cleaning program 132 to access the tools and functionalities of the augmented reality toolkit 126. Examples of the augmented reality toolkit 126 include Apple ARToolKit, or ARKit, available from Apple Inc., Cupertino, Calif.; DAQRI ARToolKit, available from DAQRI, Los Angeles, Calif.; Vuforia SDK, available from PTC Inc., Needham, Mass.; Wikitude SDK, available from Wikitude GmbH, Salzburg, Austria; and ARCore, available from Google LLC, Mountain View, Calif.

For example, a first API can be provided for accessing the augmented reality toolkit 126 to analyze images captured by the camera 120 and identify flat surfaces in the home. When the user points the camera 120 toward the floor in the home, the spot cleaning program 132 can use the API to access the augmented reality toolkit 126 to identify a plane that substantially lies on, or coincides with, the floor surface and establish a Cartesian coordinate system using the identified plane as the x-y plane.

In this document, when a plane is said to substantially lie on or coincide with the floor surface, it is understood that the plane is determined to lie on or coincide with the floor surface within a margin of error. The camera 120 may have limited resolution, the lens of the camera 120 may have distortion, the motion sensors 122 may have small errors within a specified tolerance, and the lighting condition of the environment where the images are taken may not be ideal, so there may be some error in the determination of the location of the plane in the virtual space that coincides with the floor surface. The augmented reality toolkit 126 is configured to generate a best estimate of the location of the floor surface based on the images provided by the camera 120 and the sensor data provided by the motion sensors 122, and establish a reference plane that coincides with the estimated location of the floor surface.

Similarly, when a first point in the virtual space is said to substantially coincide with a second point in the real world, it is understood that the first point is determined to coincide with the second point within a margin of error. It is understood that the coordinates of the spot to be cleaned, the coordinates of the mobile cleaning robot, and the angle of orientation of the mobile cleaning robot are estimate values. The margin of error for the estimated values may depend on several factors, such as the resolution of the camera 120, the distortion of the camera optical system, the accuracy of the motion sensors 122, and the lighting condition of the environment in which the images are captured by the camera 120.

Figure 1B:
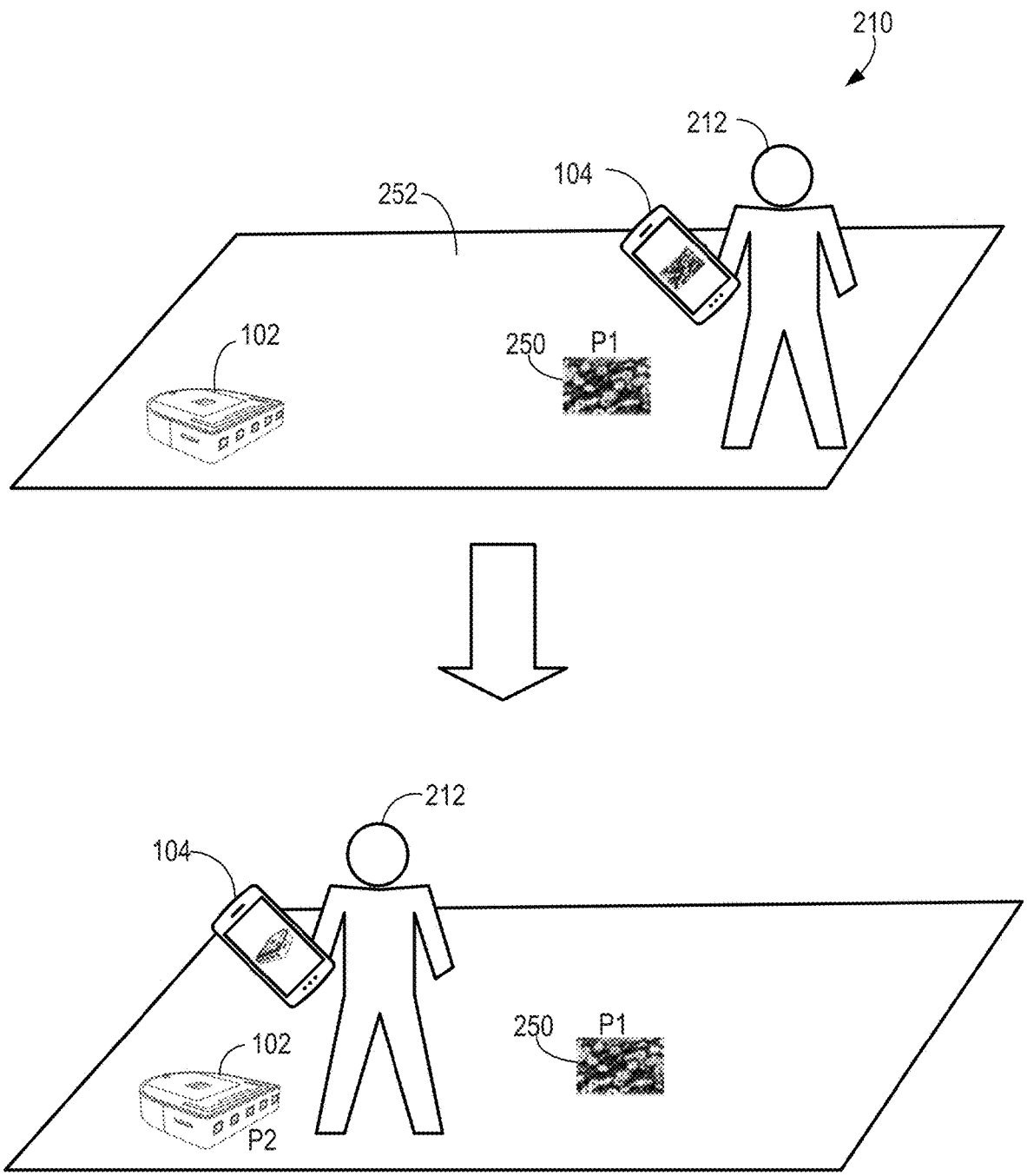
FIG. 1B is a diagram showing a process for identifying the position of a spot and the position of a mobile robot.

A second API can be provided for accessing the augmented reality toolkit 126 to determine a first point in the virtual space that corresponds to a second point in an image. For example, referring to FIG. 1B, the user 212 points the camera 120 of the mobile computing device 104 at a pile of debris 250 at a location P1 on the floor 252 and provides a touch input on the touch screen display 138 to identify a point in the image showing where the debris 250 is located. The spot cleaning program 132 calls the augmented reality toolkit 126 to determine the coordinates of a point in the virtual space that corresponds to the location P1 of the debris 250. The user can identify multiple spots that need to be cleaned. For each spot identified by the user, the spot cleaning program 132 determines the coordinates of the point in the virtual space that corresponds to the spot that need to be cleaned.

Next, the user 212 walks to a vicinity of a location P2 where the mobile cleaning robot 102 is located, points the camera 120 of the mobile computing device 104 at the mobile cleaning robot 102, and instructs the spot cleaning program to recognize the mobile cleaning robot 102. Referring back to FIG. 1A, the spot cleaning program 132 receives one or more images captured by the camera 120 and sends the one or more images to the first image detection module 133. The first image detection module 133 processes the one or more images to have a format suitable for input to the first neural network 134, and sends the processed one or more images to the first neural network 134. The first neural network 134 recognizes the mobile cleaning robot 102 in one of the images and identifies a third point in the image that corresponds to a point, e.g., the center, of the mobile cleaning robot 102.

The spot cleaning program 132 sends the one or more images captured by the camera 120 to the second image detection module 135. The second image detection module 135 processes the one or more images to have a format suitable for input to the second neural network 136, such as transforming the one or more images of the mobile cleaning robot 102 captured by the camera 120 to one or more top-view images of the mobile cleaning robot 102 having an image size suitable for the input of the second neural network 136, and sends the processed one or more images to the second neural network 136. The second neural network 136 recognizes the orientation angle of the mobile cleaning robot 102.

The spot cleaning program 132 uses the second API to access the augmented reality toolkit 126 to identify a fourth point in the virtual space that corresponds to the third point in the image. The spot cleaning program 132 accesses the augmented reality toolkit 126 to determine the coordinates of the fourth point in the virtual space, in which in this example the fourth point corresponds to the center of the mobile cleaning robot 102.

In this document, the coordinates of the mobile cleaning robot 102 refer to the coordinates of a particular feature or point on the mobile cleaning robot 102, such as the center of the mobile cleaning robot 102, the center of the top surface of the mobile cleaning robot 102, or the front center edge of the mobile cleaning robot 102, that is pre-specified by the system. When the spot cleaning program 132 determines the coordinates of the mobile cleaning robot 102, the spot cleaning program 132 uses image processing to identify the particular feature or point on the mobile cleaning robot 102, and calls the augmented reality toolkit 126 to determine the coordinates of the particular feature or point on the mobile cleaning robot 102.

The user provides an input command that indicates the user wishes to start the spot cleaning process. The spot cleaning program 132 sends to the mobile cleaning robot 102 the coordinates of the one or more spots that need to cleaned, the coordinates of the mobile cleaning robot 102, and the orientation angle of the mobile cleaning robot 102. The spot cleaning program 132 also sends a command 128 requesting the mobile cleaning robot 102 to go clean the spots that need to be cleaned.

The mobile cleaning robot 102 upon receiving the command 128, determines a path from its current location to the location where the debris is located. The mobile cleaning robot 102 first rotates itself, if necessary, such that it has the proper heading. The mobile cleaning robot 102 then travels to the location of the debris and cleans up the debris.

In some implementations, the spot cleaning program 132 provides a user interface that guides the user through the steps of identifying the spots or regions that need to be cleaned, identifying the mobile cleaning robot, and instructing the mobile cleaning robot to go clean the spots or regions that need to be cleaned. For example, when the spot cleaning program 132 is started, the touch screen display 138 shows four selection buttons labeled "Initialize," "ID spot clean location," "ID cleaning robot," and "Start cleaning." When the user selects the "Initialize" button, the spot cleaning program 132 establishes the coordinate system in the virtual space. When the user selects the "ID spot clean location" button, a live image captured by the camera 120 is shown on the display 138, and the user can identify one or more spots or regions to be cleaned. When the user selects the "ID cleaning robot" button, a live image captured by the camera 120 is shown on the display 138, the first neural network 134 recognizes the mobile cleaning robot 102 based on the images captured by the camera 120, and the second neural network 136 recognizes the orientation angle of the mobile cleaning robot 102 based on the images captured by the camera 120. When the user selects the "Start cleaning" button, the mobile cleaning robot 102 navigates to the debris location or locations cleans up the debris.

In some implementations, the mobile cleaning robot 102 has a "Spot cleaning" mode in which the mobile cleaning robot 102 determines a region that covers a spot to be cleaned, and cleans the region including the spot. The region can have a shape of, e.g., a square, a rectangle, or a circle.

After the mobile cleaning robot 102 completes the cleaning task, the mobile cleaning robot 102 sends a status report 130 to the mobile computing device 104 indicating that the cleaning task has been completed. Alternatively, the mobile cleaning robot 102 may send a status report 130 indicating that a condition prevented the mobile cleaning robot 102 from completing the cleaning task and request assistance from the user.

In the example above, the augmented reality toolkit 126 determines the Cartesian coordinate system such that the x-y plane lies on the floor surface. In this example, the mobile cleaning robot 102 is configured to clean the floor area, so it is convenient to have the x-y plane coincided with the floor surface. However, the coordinate system can be arbitrarily determined, and the x-y plane in the virtual space does not necessarily have to lie on the floor surface. The mobile cleaning robot 102 is configured to be able to navigate from its current location to the location that needs spot cleaning based on the position data provided by the mobile computing device 104.

Figure 2A:
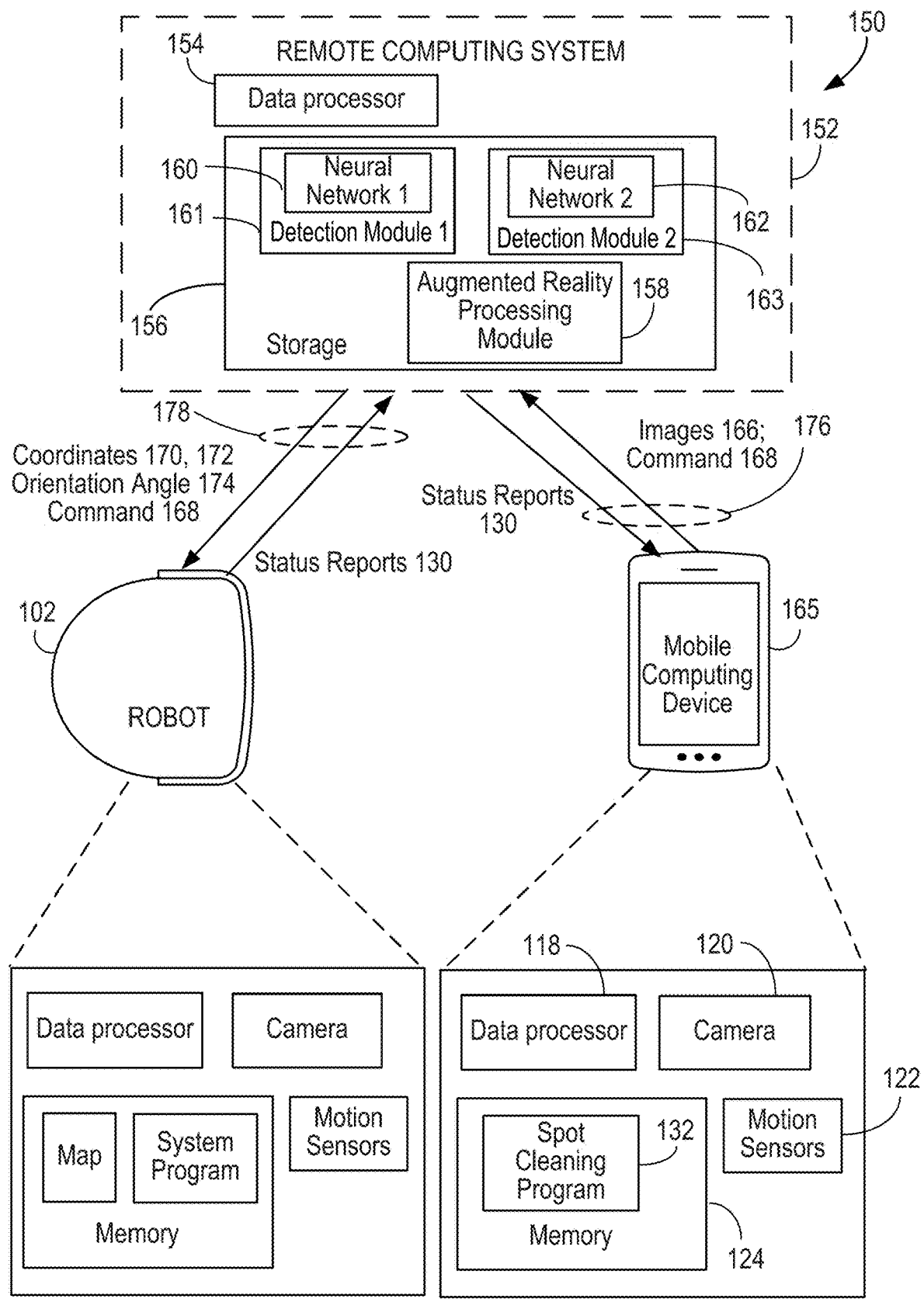
FIGS. 2A, 2B, 3A, and 3B are block diagrams of example systems that enable spot cleaning by mobile robots.

Referring to FIG. 2A, in some implementations, a mobile robot cleaning system 150 includes a remote computing system 152 that implements augmented reality functions so that a user can use a simple mobile computing device 165 that does not have augmented reality capabilities and still be able to instruct the mobile cleaning robot 102 to perform spot cleaning at specification locations. In this example, the mobile computing device 165 communicates with the remote computing system 152 through a communication link 176, and the remote computing system 152 communicates with the mobile cleaning robot 102 through a communication link 178. The communication link 176 has sufficient bandwidth to support streaming of video or a sequence of images from the mobile computing device 165 to the remote computing system 152.

For example, the mobile computing device 165 includes one or more data processors 118, one or more cameras 120, one or more motion sensors 122, and a storage device 124 storing a spot cleaning program 132. The remote computing system 152 can be, e.g., a computing device located in the home of the user, or one or more cloud server computers that are accessed through a network such as the Internet. The remote computing system 152 includes one or more data processors 154 and a storage device 156 storing an augmented reality processing module 158, a first image detection module 162 having a first neural network 160 configured to recognize the mobile cleaning robot 102, and a second image detection module 163 having a second neural network 162 configured to recognize an orientation angle of the mobile cleaning robot 102.

After starting the spot cleaning program 132, the user instructs the spot cleaning program 132 to initialize the spot cleaning system. The user points the camera 120 towards the floor, and the mobile computing device 165 sends images 166 of the floor captured by the camera 120 to the remote computing system 152. The augmented reality processing module 158 processes the images 166, identifies the floor surface, determines a plane in a virtual space such that the plane lies on, or coincides with, the floor surface, and determines a Cartesian coordinate system for the virtual space in which the x-y plane lies on, or coincides with, the floor surface.

The user points the camera 120 towards the spot that needs to be cleaned and provides a touch input that identifies a point on the image corresponding to the spot. The mobile computing device 165 sends the image that includes the spot to the remote computing system 152. The augmented reality processing module 158 determines the coordinates of a first point in the virtual space, in which the first point corresponds to the location of the spot. The user can identify multiple spots that need to be cleaned. For each spot identified by the user, the augmented reality processing module 158 determines the coordinates of the point in the virtual space that correspond to the spot that need to be cleaned.

The user points the camera 120 at the mobile cleaning robot 102, and the mobile computing device 165 sends an image that includes the mobile cleaning robot 102 to the remoted computing system 152. The first image detection module 161 processes the image to have a format suitable for input to the first neural network 160. The first neural network 160 recognizes the mobile cleaning robot 102 in the image and identifies a point in the image that corresponds to a particular feature, such as the center, of the mobile cleaning robot 102. The augmented reality processing module 158 identifies a second point in the virtual space that corresponds to the point in the image corresponding to the center of the mobile cleaning robot 102 and determines the coordinates of the second point in the virtual space. The second image detection module 163 processes the image to have a format suitable for input to the second neural network 160, e.g., transforming the image of the mobile cleaning robot 102 provided by the camera 120 to a top-view image of the mobile cleaning robot 102. The second neural network 162 recognizes the orientation angle of the mobile cleaning robot 102.

The user provides an input command that indicates the user wishes to start the spot cleaning process. The mobile computing device 165 sends the command 168 to the remote computing system 152. The remote computing system 152 sends to the mobile cleaning robot 102 the coordinates 170 of the mobile cleaning robot 102, the coordinates 172 of the spot, and the orientation angle 174 of the mobile cleaning robot 102 in the virtual space, and the command 168 requesting the mobile cleaning robot 102 to go clean the spot that needs to be cleaned.

The mobile cleaning robot 102 upon receiving the command 168 from the remote computing device 152, determines a path from its current location to the location that needs to be cleaned. The mobile cleaning robot 102 first rotates itself, if necessary, such that it has the proper heading. The mobile cleaning robot 102 then travels to the location that needs to be cleaned and removes the debris. After the mobile cleaning robot 102 completes the cleaning task, the mobile cleaning robot 102 sends a status report 130 to the remote computing system 152 indicating that the cleaning task has been completed. Alternatively, the mobile cleaning robot 102 may send a status report 130 indicating that a condition prevented the mobile cleaning robot 102 from completing the cleaning task and request assistance from the user. The remote computing system 152 forwards the status reports 130 to the mobile computing device 165.

Figure 2B:
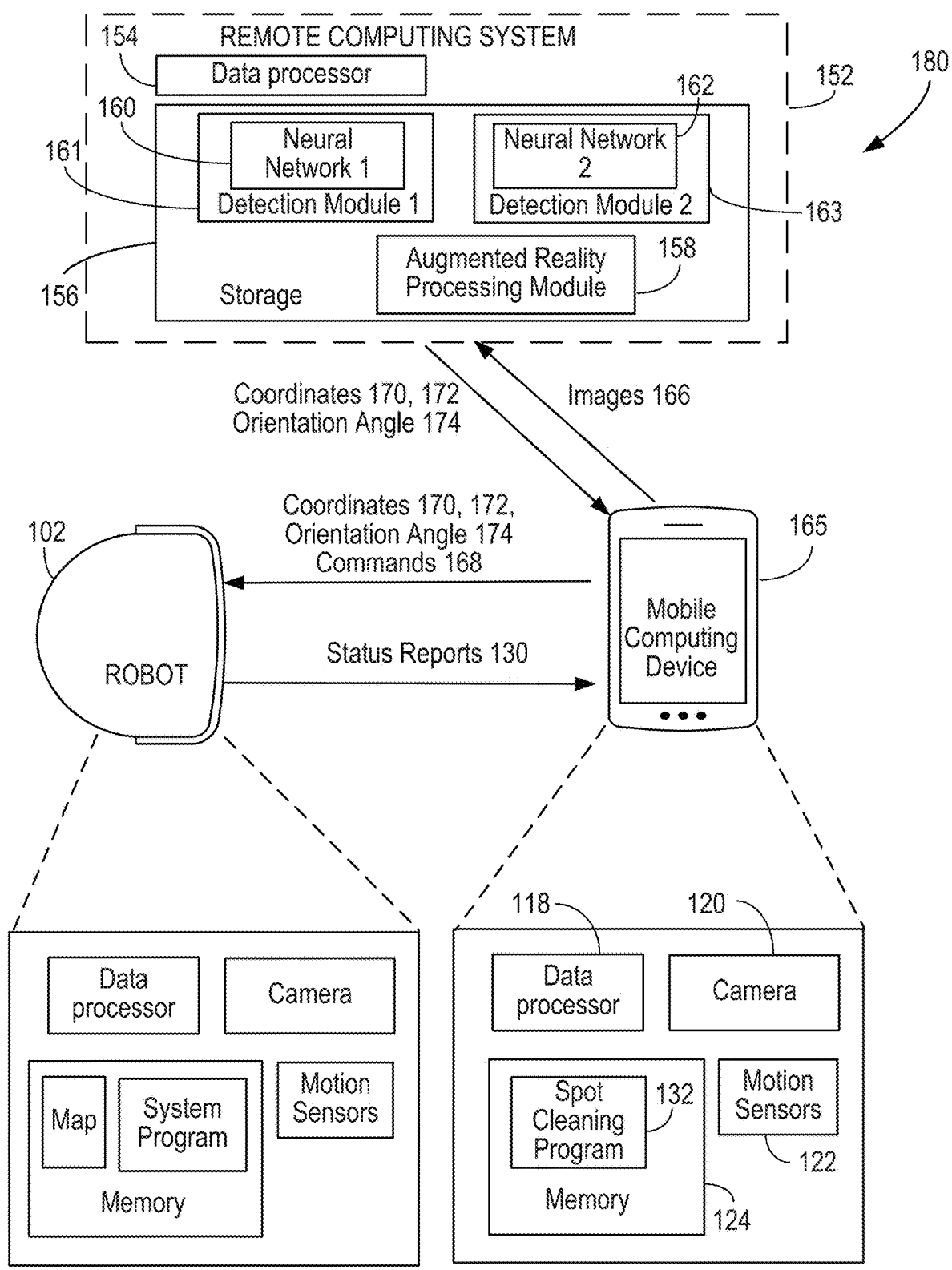

Referring to FIG. 2B, in some implementations, a mobile robot cleaning system 180 includes a remote computing system 152 that implements augmented reality functions similar to the example shown in FIG. 2A. In the example of FIG. 2B, the mobile computing device 165 communicates directly with the mobile cleaning robot 102. The mobile computing device 165 sends the images 166 to the remote computing device 152, and the remote computing device 152 returns the coordinates 170 of the spot that needs to be cleaned, the coordinates 172 of the mobile cleaning robot 102, and the orientation angle 174 of the mobile cleaning robot 102 to the mobile computing device 165. The mobile computing device 165 sends the coordinates 170 and 172 and the orientation angle 174 to the mobile cleaning robot 102, and a command 168 requesting the mobile cleaning robot 102 to go clean the spot that needs to be cleaned. The mobile cleaning robot 102 sends a status report 130 to the mobile computing device 165.

Figure 3A:
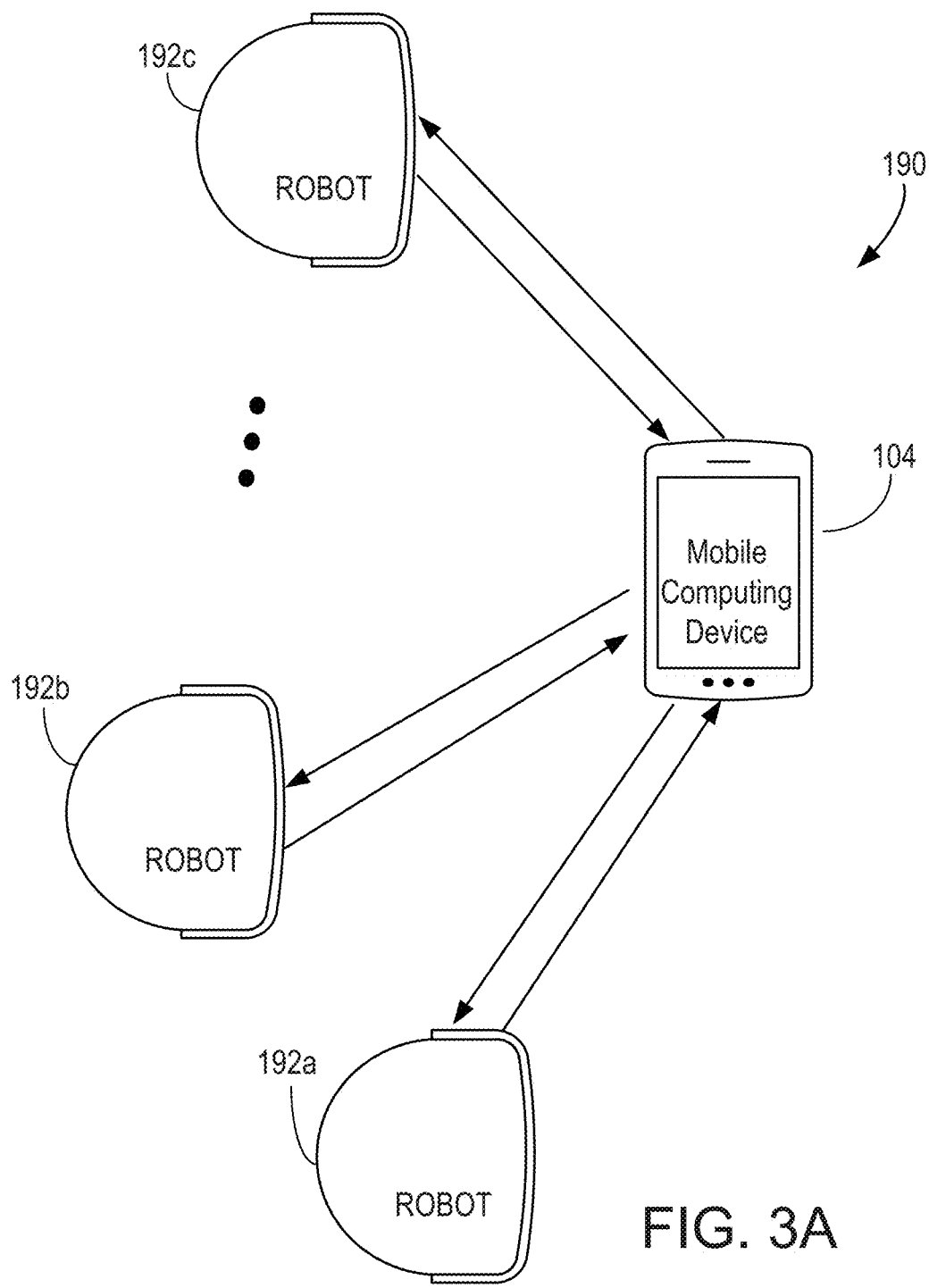

Referring to FIG. 3A, in some implementations, a mobile robot cleaning system 190 includes multiple mobile cleaning robots, e.g., 192a, 192b, and 192c, collectively referenced as 192. The mobile computing device 104 coordinates with the mobile cleaning robots 192 to perform spot cleaning at multiple locations. For example, the mobile computing device 104 captures images of multiple spots that need to be cleaned, and determines the coordinates of those spots in the virtual space. The mobile computing device 104 captures images of the mobile cleaning robots 192 and determines the coordinates of the mobile cleaning robots 192 and their orientation angles in the virtual space.

The spot cleaning program 132 determines which mobile cleaning robot or robots 192 to use to perform the spot cleaning tasks. For example, the spot cleaning program 132 can request the first mobile cleaning robot 192a to go clean the spots. The first mobile cleaning robot 192a, after cleaning the first spot, may report that its debris bin is full. The spot cleaning program 132 can request the second mobile cleaning robot 192b to go clean the remaining spots.

For example, the mobile cleaning robots 192 may be in various locations in the home, and the spot cleaning program 132 can identify the mobile cleaning robot 192 that is closest to the spots and request that mobile cleaning robot to go clean the spots. The spot cleaning program 132 may determine that the first mobile cleaning robot 192a is closest to the first spot, and the second mobile cleaning robot 192b is closest to the second spot. In this example, the spot cleaning program 132 requests the first mobile cleaning robot 192a to go clean the first spot, and requests the second mobile cleaning robot 192b to go clean the second spot.

Figure 3B:
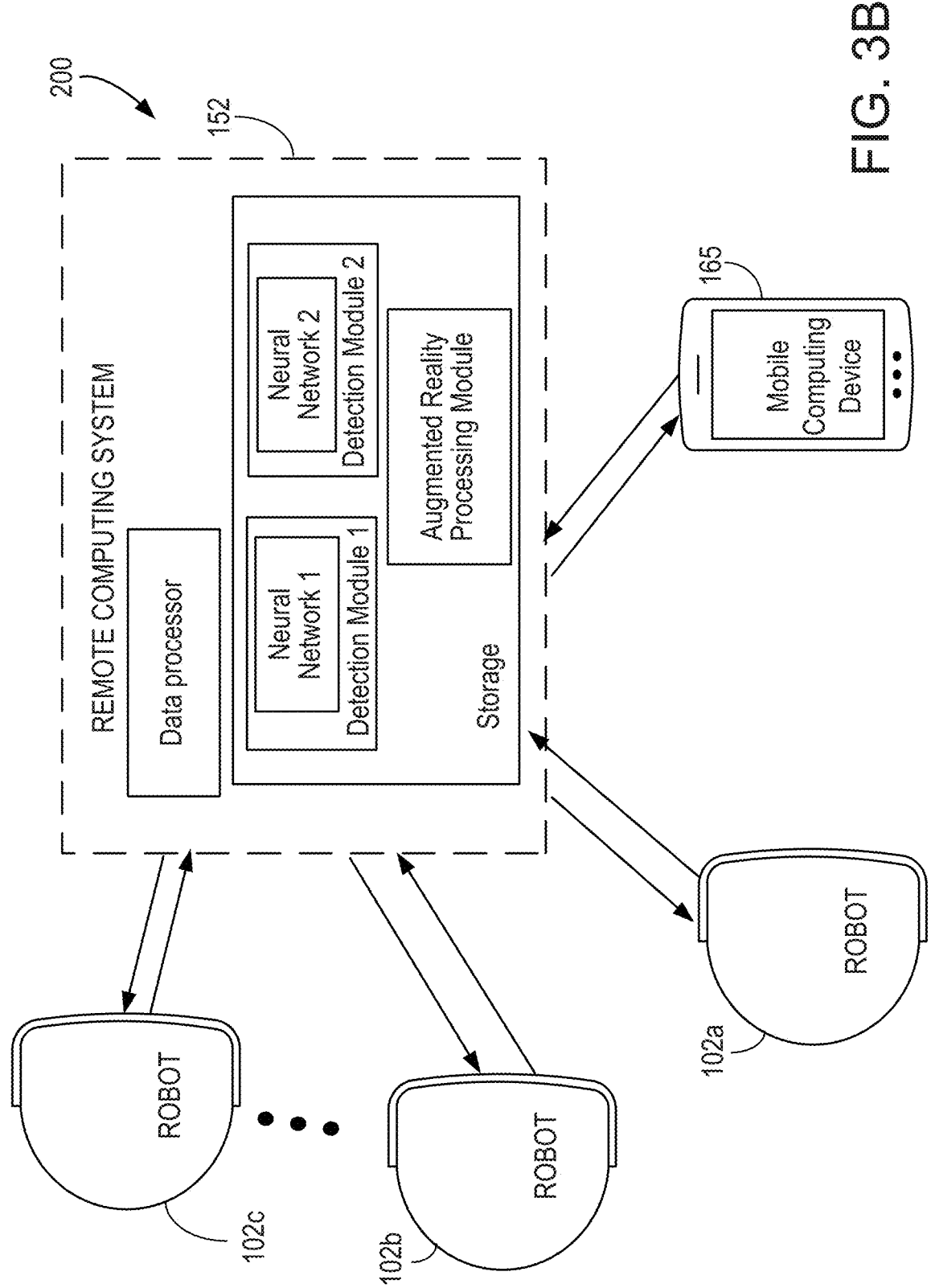

Referring to FIG. 3B, in some implementations, a mobile robot cleaning system 200 can include multiple mobile cleaning robots, e.g., 192a, 192b, and 192c, collectively referenced as 192. The system 200 includes a mobile computing device 165 that captures images of the dirt spots and the mobile cleaning robots 192, and sends the images to a remote computing system 152 that implements augmented reality functions similar to the example in FIG. 2A. In the example of FIG. 3B, the remote computing system 152 coordinates with the mobile cleaning robots 192 to perform spot cleaning at multiple locations in a manner similar to the way that the mobile computing device 104 of FIG. 3A coordinates with the mobile cleaning robots 192.

Figure 4:
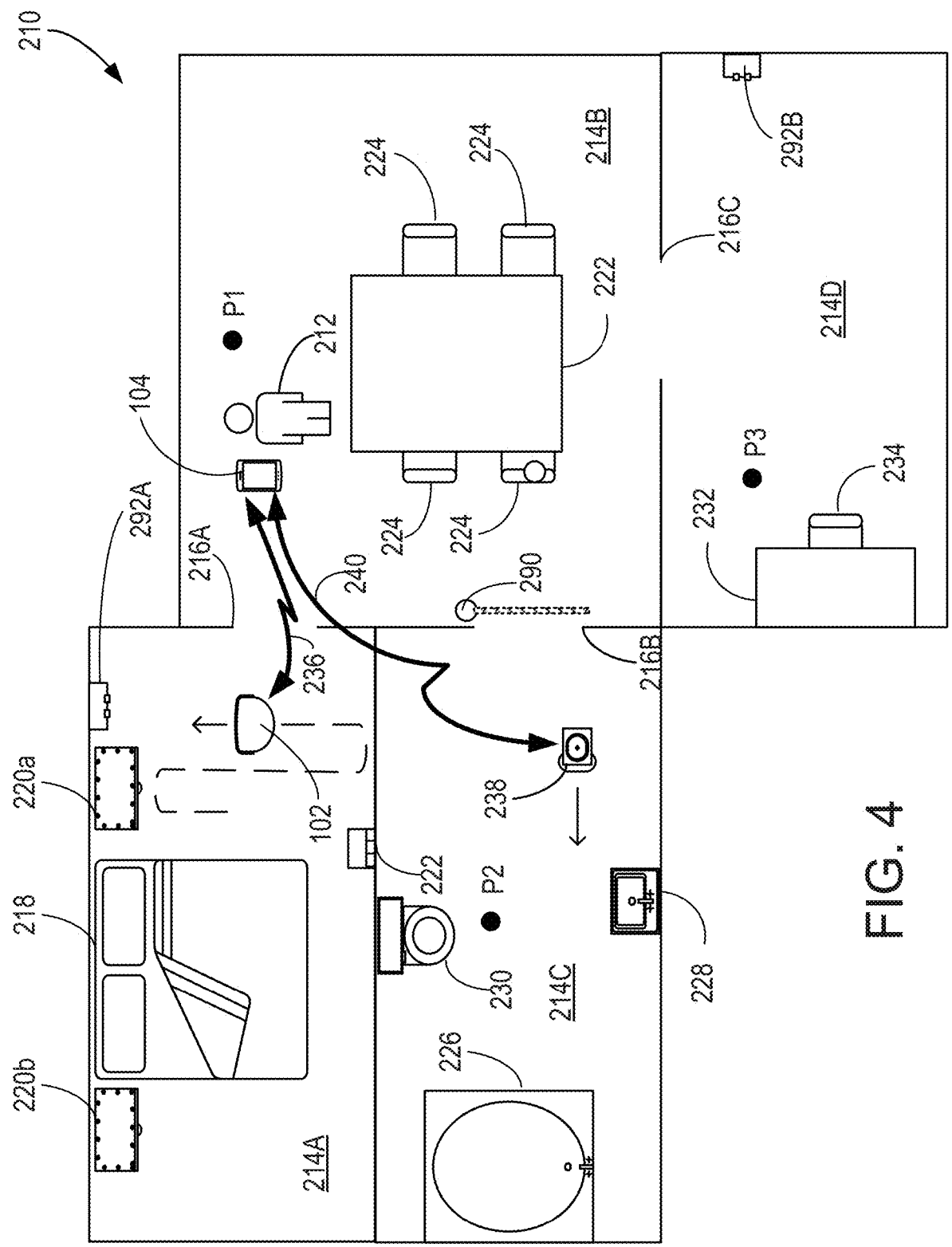
FIGS. 4, 5A, and 5B are schematic views of example environments in which the systems for enabling spot cleaning can be used.

FIG. 4 shows a schematic view of an example of an environment in which the systems 100 (FIG. 1) and 190 (FIG. 3A) can be used. The mobile cleaning robot 102 can operate within one or more enclosure spaces or within an environment including one or more enclosure spaces. The environment includes, for example, a home environment, a living space, a work environment, or other environments. The enclosure spaces correspond to, for example, rooms within the environment. In the exemplary environment shown in FIG. 4, the environment includes a home 210 where a user 212 and the mobile cleaning robot 102 are located. The user 212 operates a mobile computing device 104, which can be, e.g., a mobile phone or a tablet computer. The home 210 includes rooms 214A, 214B, 214C, and 214D. In the example shown in FIG. 4, the mobile cleaning robot 102 is located within the room 214A, and the user 212 is located within the room 214B. The room 214A is adjacent to and connected to the room 214B by a doorway 216A, the room 214B is adjacent to and connected to the room 214C by a doorway 216B, and the room 214B is adjacent to and connected to the room 214D by a doorway 216C.

In this example, the room 214A is a bedroom that includes a bed 218 and end tables 220a, 220b. The room 214B is a dining room that includes a dining table 222 and dining chairs 224. The room 214C is a bathroom that includes a tub 226, a sink 228, and a toilet 230. The room 214D is a home office that includes a desk 232 and a chair 234.

In the example shown in FIG. 4, the mobile cleaning robot 102 autonomously navigates through the room 214A to perform a cleaning mission, such as cleaning a floor surface of the room 214A. The mobile cleaning robot 102 navigates around obstacles (e.g., the bed 218 and end tables 220a, 220b) positioned in the room 214A while completing its mission. As the mobile cleaning robot 102 moves about the home 210 during the mission, the mobile cleaning robot 102 uses its sensors to generate a map of the home 210 and localizes the mobile cleaning robot 102 within the map. The mobile cleaning robot 102 includes sensors that generate signals indicative of a status of the mobile cleaning robot 102, such as a status of the components of the mobile cleaning robot 102 or a status of the mission or operation being performed by the mobile cleaning robot 102.

In some implementations, a mobile computing device 104 enables the user 212 to provide inputs on the mobile computing device 104. The mobile computing device 104 can include user input elements such as, for example, one or more of a touchscreen display, buttons, a microphone, a mouse pad, a trackball, a keyboard, or other devices that respond to inputs provided by the user 212. The mobile computing device 104 alternatively or additionally includes immersive media (e.g., virtual reality) with which the user 212 interacts to provide a user input. The mobile computing device 104 in these examples can be, for example a virtual reality headset or a head-mounted display. The user can provide inputs corresponding to commands for the mobile cleaning robot 102. In some implementations, a wireless link 236 is established between the mobile computing device 104 and the mobile cleaning robot 102 to enable the mobile computing device 104 to transmit a wireless command signal to the mobile cleaning robot 102. The user 212 provides the user input indicative of the command signal to the mobile computing device 104, and the mobile computing device 104 transmits the command signal corresponding to the user input. Various type of wireless networks (e.g., Bluetooth, radio frequency, optical based, etc.) and network architectures (e.g., mesh networks) may be employed to establish the communication link 236.

Other devices also can be wirelessly linked to the mobile cleaning robot 102. In the example of FIG. 4, the home 210 includes linked devices 292A and 292B. In some implementations, each of the linked devices 292A and 292B includes, e.g., sensors suitable for performing one or more of monitoring the home 210, monitoring occupants of the home 210, and monitoring operations of the mobile cleaning robot 102. These sensors can include, for example, one or more of imaging sensors, occupancy sensors, and environmental sensors.

The imaging sensors for the linked devices 292A, 292B can include one or more of visible light cameras, infrared cameras, and sensors employing other portions of the electromagnetic spectrum. Occupancy sensors for the linked devices 292A, 292B include one or more of, for example, a passive or active transmissive or reflective infrared sensor, a time-of-flight or triangulating range sensor using light, sonar, or radio frequency, a microphone to recognize sounds or sound pressure characteristic of occupancy, an airflow sensor, a camera, a radio receiver or transceiver to monitor frequencies and/or Wi-Fi frequencies for sufficiently strong receive signal strength, a light sensor capable of detecting ambient light including natural lighting, artificial lighting, and light emitted from a mobile computing device (e.g., the mobile computing device 104), and/or other appropriate sensors to detect the presence of the user 212 or other occupants within the home 210. The occupancy sensors alternatively or additionally detect motion of the user 212 or motion of the autonomous mobile cleaning robot 102. If the occupancy sensors are sufficiently sensitive to the motion of the autonomous mobile cleaning robot 102, the occupancy sensors of the linked devices 292A, 292B generate signals indicative of the motion of the mobile cleaning robot 102. Environmental sensors for the linked devices 292A, 292B can include, e.g., an electronic thermometer, a barometer, a humidity or moisture sensor, a gas detector, or an airborne particulate counter.

In the example shown in FIG. 4, a second mobile cleaning robot 238 is located in the room 214C. The second mobile cleaning robot 238, similar to the mobile cleaning robot 102, performs a mission, e.g., a cleaning mission, within the room 214C. In some examples, the mobile computing device 104 is wirelessly connected to the multiple robotic devices, including the mobile cleaning robot 102 and the second mobile cleaning robot 238, thus enabling the user 212 to interact with the mobile computing device 104 to control and monitor multiple robotic devices 102, 238. In some examples, the controller for each of the mobile cleaning robot 102, the linked devices 292A, 292B, the second mobile cleaning robot 238, and other devices may initiate and maintain wireless links directly with one another, for example, to initiate and maintain a wireless link between the mobile cleaning robot 102 and one of the linked devices 292A, 292B. Wireless links also may be formed with other remote electronic devices, such as a mobile phone, a tablet, a laptop, another mobile computing device, one or more environmental control devices, or other types of electronic devices. In certain implementations, the wireless links permit communication with one or more devices including, but not limited to smart light bulbs, thermostats, garage door openers, door locks, remote controls, televisions, security systems, security cameras, smoke detectors, video game consoles, other robotic systems, or other communication enabled sensing and/or actuation devices or appliances.

The wireless links may utilize various communication schemes and protocols, such as, for example, Bluetooth classic, Wi-Fi, Bluetooth-low-energy, also known as BLE, 802.15.4, Worldwide Interoperability for Microwave Access (WiMAX), an infrared channel, or a satellite band. In some examples, the wireless links include any cellular network standards used to communicate among mobile computing devices, including, but not limited to, standards that qualify as 1G, 2G, 3G, or 4G. The network standards, if utilized, qualify as, for example, one or more generations of mobile telecommunication standards by fulfilling specifications or standards such as the specifications maintained by International Telecommunication Union. The 3G standards, if utilized, correspond to, for example, the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA.

The following describes an example in which the user 212 instructions the mobile cleaning robot 102 to clean spots located in three different rooms. For example, the user 212 walks around the home 210 and identifies three spots or regions that need cleaning, including a spot P1 in the room 214B, a spot P2 in the room 214C, and a spot P3 in the room 214D. The user 212 operates the mobile computing device 104 to take pictures of the spots P1, P2, and P3. The user 212 walks to the room 214A and takes a picture of the mobile cleaning robot 102. The user 212 instructs, through the communication link 236, the mobile cleaning robot 102 to clean the spots P1, P2, and P3.

The spot cleaning program 132 determines that the second mobile cleaning robot 238 is closer to the spot P2, and sends an instruction through a communication link 240 to the second mobile cleaning robot 238 to request the second mobile cleaning robot 238 to clean the spot P2. In this example, because there are two mobile cleaning robots 102 and 238 in the home 210, the spot cleaning program 132 determines which mobile cleaning robot to use to clean the spot P3 using a number of criteria, such as the availability of the mobile cleaning robots, the battery conditions of the mobile cleaning robots, the distances between the mobile cleaning robots and the spot to be cleaned, and the remaining capacities of the debris bins of the mobile cleaning robots.

For example, the mobile cleaning robot 102 may report that it has finished cleaning the spot P1 while the mobile cleaning robot 238 is still cleaning the spot P2. The spot cleaning program 132 may request the mobile cleaning robot 102 to clean the spot P3. For example, the root 102 may finish cleaning the spot P1 earlier, but reports that it has a low battery. The spot cleaning program 132 may decide to wait until the mobile cleaning robot 238 finishes cleaning the spot P2 and request the mobile cleaning robot 238 to go clean the spot P3.

For example, the mobile cleaning robot 102 may be in the middle of a cleaning task in the room 214A when it was summoned to clean the spot P1. The spot cleaning program 132 may determine that it would be better to let the mobile cleaning robot 102, after it finishes cleaning the spot P1, return to the room 214A to finish the previous cleaning task, instead of going to the room 214D to clean spot P3 and then return to the room 214A to finish the remaining cleaning task. In this example, the spot cleaning program 132 sends a command to request the mobile cleaning robot 238 to go clean the spot P3 after it finishes cleaning the spot P2.

Figure 5A:
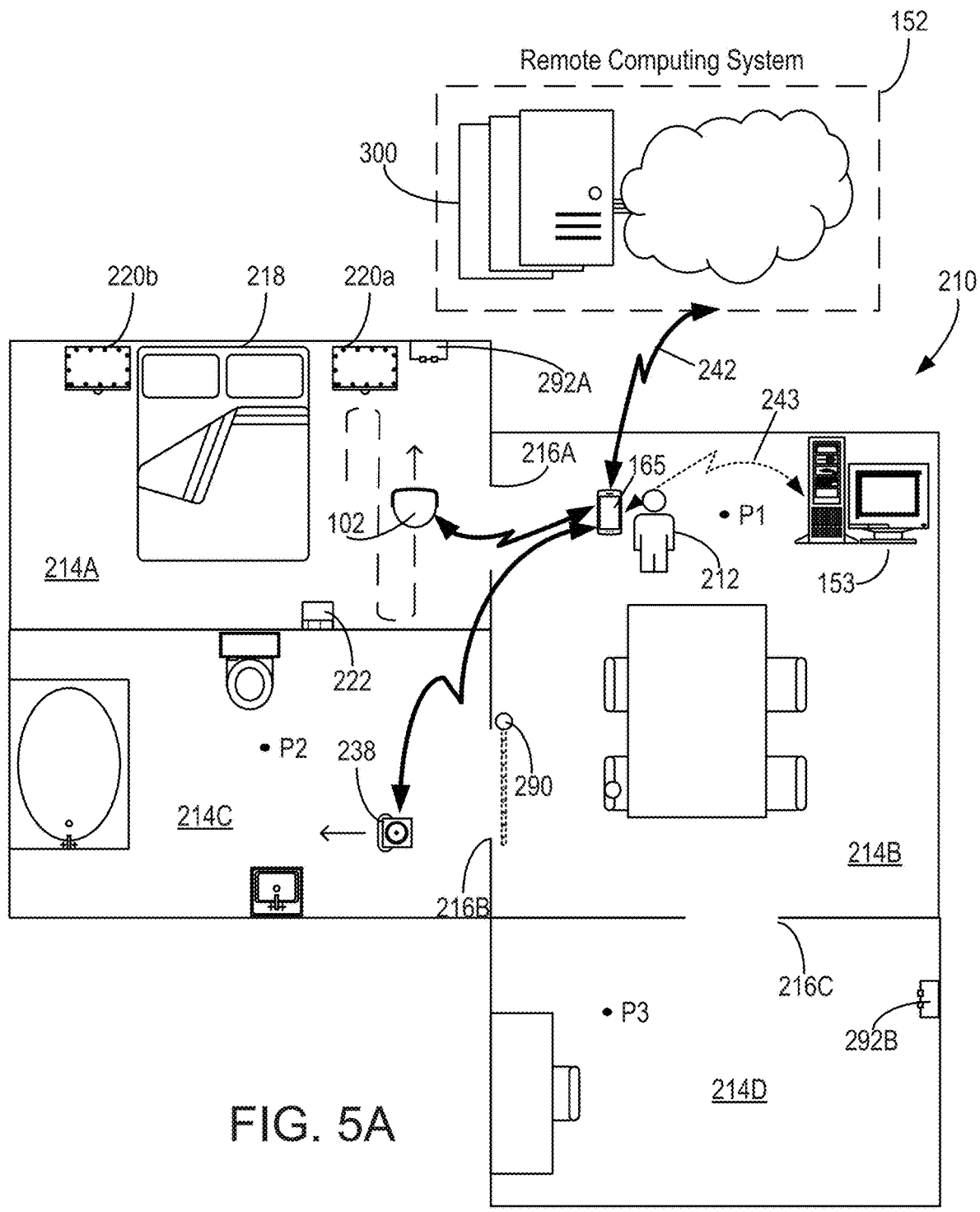

FIG. 5A shows a schematic view of an example of an environment in which the system 180 (FIG. 2B) can be used. In this example, the environment includes a home 210 similar to that of the example shown in FIG. 4. A mobile computing device 165 communicates with a remote computing system 152 through a communication link 242, in which the remote computing system 152 has an augmented reality processing module (e.g., 158) and image detection modules (e.g., 161, 163). The remote computing system 152 can be, e.g., a cloud computing system that is accessed through the Internet. The mobile computing device 165 sends images of the spots P1, P2, P3 to be cleaned and the images of the mobile cleaning robots 102, 238 to the remote computing system 152. The image detection modules and the augmented reality processing module of the remote computing system 152 determine the coordinates of the spots P1, P2, P3 that need to be cleaned, the coordinates of the mobile cleaning robots 102, 238, and the orientation angles of the mobile cleaning robots 102, 238. The communication link 242 has sufficient bandwidth to support streaming of video or a sequence of images from the mobile computing device 165 to the remote computing system 152. The remote computing system 152 sends the coordinates of the spots P1, P2, P3 that need to be cleaned, the coordinates of the mobile cleaning robots 102, 238, and the orientation angles of the mobile cleaning robots 102, 238 to the mobile computing device 165. The mobile computing device 165 sends information about the coordinates and orientation angles to the mobile cleaning robots 102, 238, and sends commands to the mobile cleaning robots 102, 238 to request the mobile cleaning robots 102, 238 to go clean the spots P1, P2, P3.

In some implementations, a home server computer 153 can be provided inside the user's home, in which the home server computer 153 has image detection modules (e.g., 161, 163) and an augmented reality processing module (e.g., 158). In this example, the mobile computing device 165 communicates with the home server computer 153 through a communication link 243. The mobile computing device 165 sends images of the spots P1, P2, P3 to be cleaned and the images of the mobile cleaning robots 102, 238 to the home server computer 153, and the image detection modules and the augmented reality processing module of the home server computer 153 determine the coordinates of the spots P1, P2, P3 that need to be cleaned, the coordinates of the mobile cleaning robots 102, 238, and the orientation angles of the mobile cleaning robots 102, 238.

The home server computer 153 sends the coordinates of the spots P1, P2, P3 that need to be cleaned, the coordinates of the mobile cleaning robots 102, 238, and the orientation angles of the mobile cleaning robots 102, 238 to the mobile computing device 165. The mobile computing device 165 sends information about the coordinates and orientation angles to the mobile cleaning robots 102, 238, and sends commands to the mobile cleaning robots 102, 238 to request the mobile cleaning robots 102, 238 to go clean the spots P1, P2, P3.

Figure 5B:
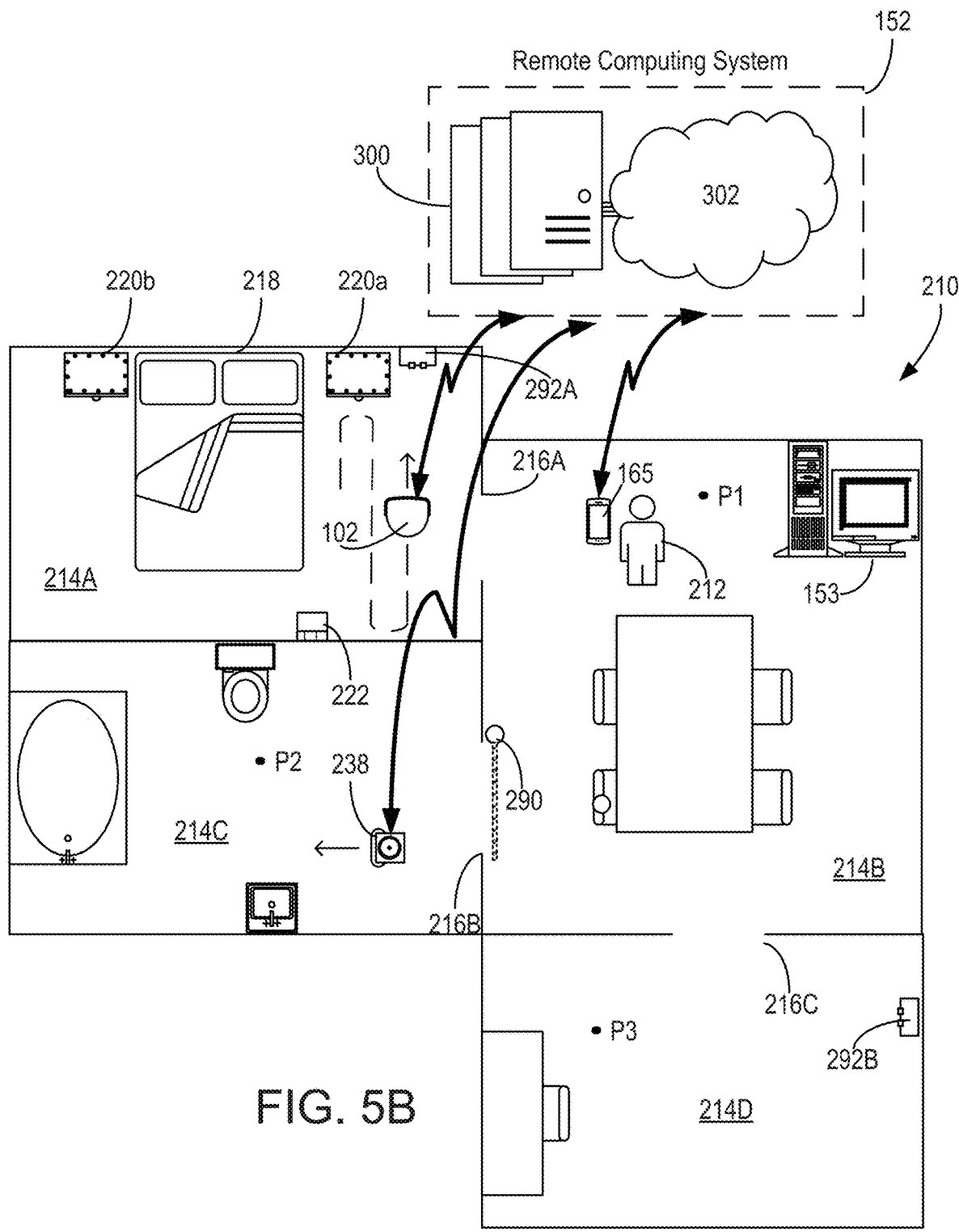

FIG. 5B shows a schematic view of an example of an environment in which the systems 150 (FIG. 2A) and 200 (FIG. 3B) can be used. In this example, the environment includes a home 210 similar to that of the example shown in FIG. 4. The mobile computing device 165 sends images of the spots P1, P2, P3 to be cleaned and the images of the mobile cleaning robots 102, 238 to the remote computing system 152, which has the image detection modules (e.g., 161, 163) and the augmented reality processing module (e.g., 158), and can determine the coordinates of the spots P1, P2, P3 that need to be cleaned, the coordinates of the mobile cleaning robots 102, 238, and the orientation angles of the mobile cleaning robots 102, 238. The mobile computing device 165 sends a command to the remote computing system 152 to request the mobile cleaning robots 102, 238 to go clean the spots P1, P2, P3. The remote computing system 152 sends information about the coordinates and orientation angles to the mobile cleaning robots 102, 238, and sends the commands to the mobile cleaning robots 102, 238 to request the mobile cleaning robots 102, 238 to go clean the spots P1, P2, P3. In the example of FIG. 5B, the remote computing system 152 is a cloud server computer.

In some examples, a home server computer 153 can be provided inside the user's home, in which the home server computer 153 has image detection modules (e.g., 161, 163) and an augmented reality processing module (e.g., 158). In this example, the mobile computing device 165 sends images of the spots P1, P2, P3 to be cleaned and the images of the mobile cleaning robots 102, 238 to the home server computer 153, and the image detection modules and augmented reality processing module of the home server computer 153 determine the coordinates of the spots P1, P2, P3 that need to be cleaned, the coordinates of the mobile cleaning robots 102, 238, and the orientation angles of the mobile cleaning robots 102, 238. The mobile computing device 165 sends a command to the home server computer 153 to request the mobile cleaning robots 102, 238 to go clean the spots P1, P2, P3. The home server computer 153 sends information about the coordinates and orientation angles to the mobile cleaning robots 102, 238, and sends the commands to the mobile cleaning robots 102, 238 to request the mobile cleaning robots 102, 238 to go clean the spots P1, P2, P3.

Other devices also can be wirelessly linked to the remote computing system 152. For example, the linked devices 292A, 292B transmits images generated by the imaging sensors to the remote computing system 152. The linked devices 292A, 292B transmit sensor signals from the combination of imaging sensors, the occupancy sensors, the environmental sensors, and other sensors present in the linked devices 292A, 292B to the remote computing system 152. These signals serve as input data for the remote computing system 152 to control or monitor operations of the mobile cleaning robot 102.

In some examples, the remote computing system 152 is connected to multiple robotic devices, including the mobile cleaning robot 102 and the second mobile cleaning robot 238, thus enabling the user 212 to interact with the mobile computing device 104 to control and monitor multiple robotic cleaning devices 102, 238 through the remote computing system 152. The controllers for each of the mobile cleaning robot 102, the linked devices 292A, 292B, the second mobile cleaning robot 238, and other devices may initiate and maintain wireless links for communication with the remote computing system 152.

Figure 6:
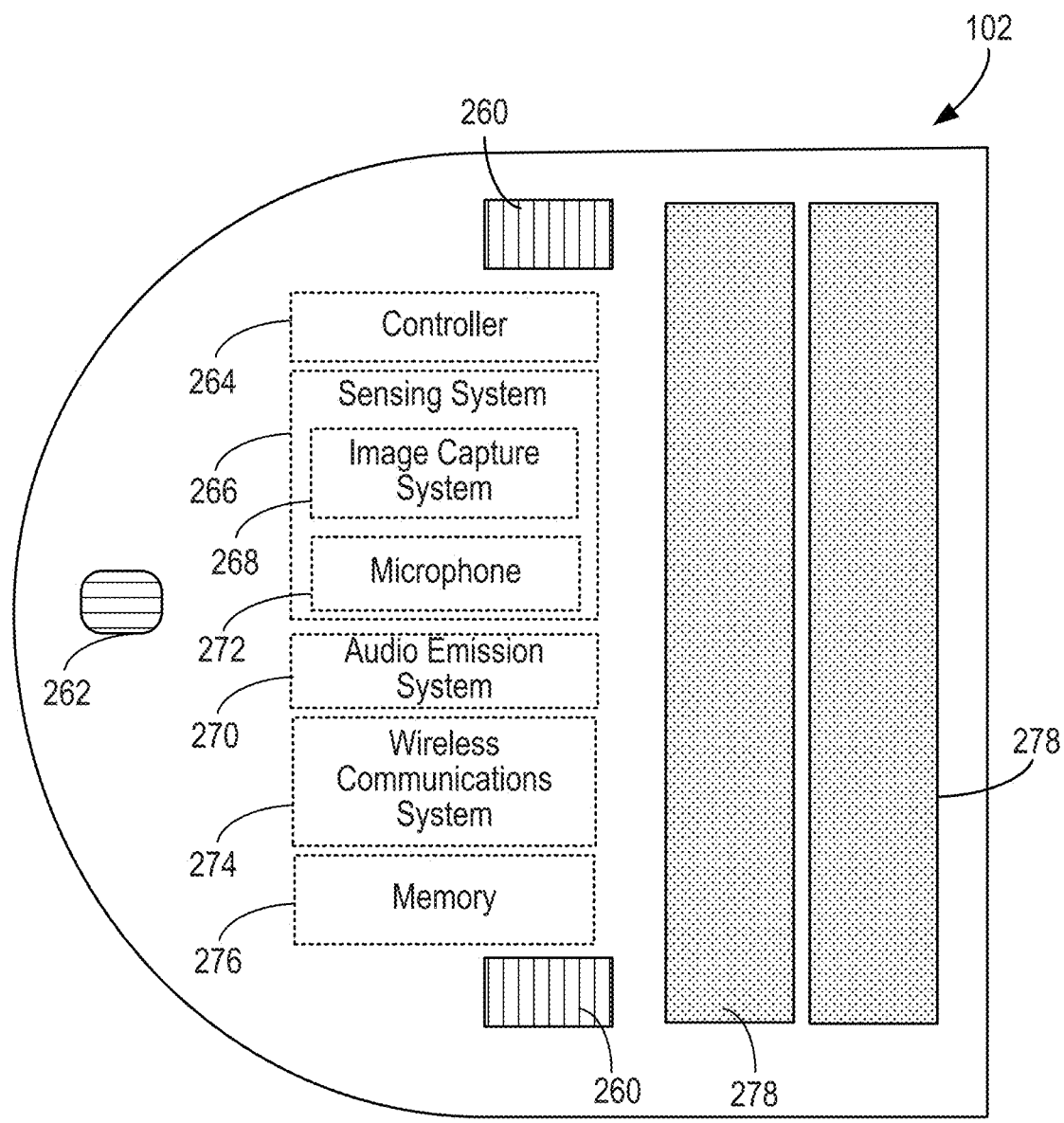
FIG. 6 is a schematic bottom view of an example mobile robot.

The following describes examples of mobile cleaning robots. The mobile cleaning robots 102, 238 autonomously navigate about the environment, e.g., the home 210, using a drive system and a suite of sensors. FIG. 6 shows a schematic bottom view of an example of the mobile cleaning robot 102 of FIG. 1. While FIG. 6 is described with respect to the mobile cleaning robot 102, the mobile cleaning robot of FIG. 6 additionally or alternatively corresponds to the second mobile cleaning robot 238. The mobile cleaning robot 102 includes a drive system including drive wheels 260. In some examples, a caster wheel 262 supports the mobile cleaning robot 102 above the floor surface. The mobile cleaning robot 102 further includes a controller 264 operable with one or more motors connected to the drive wheels 260. The controller 264 of the mobile cleaning robot 102 selectively activates the motors to drive the drive wheels 260 and navigate the mobile cleaning robot 102 across a floor surface.

The controller 264 is also operable with a sensing system 266. The sensing system 266 includes sensors usable by the controller 264 to navigate about the home 210. The sensing system 266, for example, has sensors to generate signals for detecting obstacles within the home 210 and for generating the map of the home 210. The sensing system 266 can include obstacle detection sensors, such as a time-of-flight sensor to detect distances to obstacles, cliff detection sensors to detect a drop-off (e.g., a staircase), bump sensors associated with a bumper mounted on the mobile cleaning robot 102, and contact sensors. The controller 264 operates the drive system for the mobile cleaning robot 102 to move around obstacles when the obstacle detection sensors detect the obstacles.

The controller 264 uses signals from its sensors system to generate a map of the home 210 by tracking and updating positions and orientations of the mobile cleaning robot 102 over time. These mapping sensors include, for example, simultaneous localization and mapping (SLAM) sensors, dead reckoning sensors, and obstacle detection and avoidance (ODOA) sensors. The controller 264 constructs a two-dimensional map of the floor surface of the home 210, determines the robot pose on the map and determines positions of portions of the home 210 that the mobile cleaning robot 102 can traverse (e.g., unoccupied, traversable floor). Using signals from the dead reckoning sensors, the contact sensors, and the non-contact obstacle detection sensors, the controller 264 indicates floor areas that the mobile cleaning robot 102 cannot traverse because of obstacles on the floor surface or above the floor surface. In one example, the controller 264 constructs a map of walls and obstacles as it transits, generating an occupancy grid of traversable and occupied space. In some implementations, the map uses a Cartesian coordinate system or a polar coordinate system. In some examples, the map is a topological map, a representational map, or a probabilistic map.

In some examples, using simultaneous localization and mapping (SLAM) techniques, the controller 264 determines a pose of the mobile cleaning robot 102 within a two-dimensional map of the home 210. The SLAM sensors include, for example, one or more cameras for visual identification of features and landmarks used in calculating robot pose on a map. The mobile cleaning robot 102 includes additional sensors that generate signals to enable the controller 264 to estimate the position and/or orientation of the mobile cleaning robot 102 as the mobile cleaning robot 102 moves about the home 210. These sensors, alone or in combination with the SLAM sensors, determine the pose of the mobile cleaning robot 102 on the robot map built by the transiting mobile cleaning robot 102. In some implementations, the controller 264 uses signals from the additional sensors to validate or adjust pose determined by the SLAM sensors. In some implementations, the additional sensors include odometers, accelerometers, gyroscopes, inertial measurement units, and/or other sensors that generate signals indicative of a distance travelled, an amount of rotation, a velocity, or an acceleration of the mobile cleaning robot 102. For example, the mobile cleaning robot 102 includes a directional sensor, such as a gyroscope, that generates signals indicative of an amount that the mobile cleaning robot 102 has rotated from a heading. In some implementations, the sensing system 266 includes a dead reckoning sensor, such as an IR wheel encoder, to generate signals indicative of the rotation of the drive wheels 260, and the controller 264 uses the detected rotation to estimate the distance travelled by the mobile cleaning robot 102. In some implementations, the sensing system 266 includes, for example, a laser scanner or a time-of-flight sensor that generates sensor readings for determining distances to the observed obstacles and objects within the environment. Alternatively or additionally, the sensing system 266 includes an optical mouse sensor facing the floor surface to determine a distance the mobile cleaning robot 102 has drifted laterally across the floor surface relative to a heading.

In some implementations the mobile cleaning robot 102 employs visual simultaneous localization and mapping (VSLAM) to build its map and determine a current pose on the map. The sensing system 266 includes one or more localization sensors, e.g., a camera 268 (image capture system) that generate signals for the controller 264 to determine the mobile cleaning robot's location and orientation relative to features detected in the environment. In some implementations, the mobile cleaning robot 102 includes a visible light camera 268 under the top surface of the robot body and angled in an upward direction, e.g., angled in a range between 30 degrees and 80 degrees from the floor surface about which the mobile cleaning robot 102 navigates. The camera 268 is aimed at locations on the wall and ceiling having a high concentration of static elements, such as window frames, pictures frames, doorway frames and other objects with visible, detectable features such as lines, corners and edges. For example, when the camera 268 is angled upward, a center of a viewing cone of the camera 268 is angled upward such that the center of the viewing cone is aimed at the locations on the wall and ceiling. Using the images captured by the camera 268, the controller 264 determines the robot pose on a map the mobile cleaning robot 102 builds as it navigates about rooms or enclosure spaces, e.g., a series of adjoined rooms 214A, 214B, 214C, 214D (collectively referred to as enclosure spaces or rooms 214).

The localization sensors, in some examples, include sensors on the mobile cleaning robot 102 capable of generating signals in response to detection of walls and objects in the environment that occupy non-traversable floor space. In addition to VSLAM cameras, these localization sensors include, for example, contact sensors such as bump sensors, and non-contact time of flight sensors, such as lasers, volumetric point cloud sensors, point line sensors (e.g., a time of flight line sensor such as those made by PIXART), IR proximity sensors, light detection and ranging (LIDAR) sensors, and acoustic sensors. The localization sensors generate signals from which unique signatures, patterns, or features are extracted, particularly distinguishing non-traversable floor from traversable floor, or traversable floor space added to the expanding robot map as it is traversed by the mobile cleaning robot 102. When the controller 264 determines that these features have been detected, the controller 264 determines the pose of the mobile cleaning robot 102 on the map of the home 210 using the location and orientation of the mobile cleaning robot 102 relative to these detected features. The controller 264 localizes the mobile cleaning robot 102 within the home 210, in particular by determining a current pose of the mobile cleaning robot 102 with reference to the features corresponding to objects within the home 210. The extracted features indicate the room where the mobile cleaning robot 102 is located.

Referring back to FIG. 4, the extracted features form unique identifiers for each of the rooms 214A, 214B, 214C, and 214D. In some implementations, the mobile cleaning robot 102 uses the extracted features to determine which of the rooms 214A, 214B, 214C, and 214D it is currently located in response to detecting a specific feature or features associated with a room identifier. In some implementations, the mobile cleaning robot 102 recognizes pre-identified rooms through object recognition. The mobile cleaning robot 102, for example, uses its camera 268 to capture images of objects associated with each room 214 (e.g., a stove, a dishwasher, or a refrigerator). A user 212 communicates to the mobile cleaning robot 102 a particular room identifier (e.g., kitchen) associated with those recognizable objects. During a cleaning mission, when the mobile cleaning robot 102 recognizes one or more of these objects, it communicates its location to the user by causing emission of an audible alert, e.g., by requesting that the mobile computing device 104 produce an audible alert, or causing a visual alert to issue, e.g., by displaying a text notification on the mobile computing device 104 indicating the associated stored room identifier.

In some implementations, the map is persistent and stored in the remote computing system 152 or the home server computer 153 for access by one or more mobile cleaning robots 102, 238. In each subsequent run or cleaning session, the mobile cleaning robot 102 updates the persistent map according to changing conditions within the home 210, such as moved furniture. The persistent map accumulates information about the environment over time. In some examples, the mobile cleaning robot 102 discovers connected devices in the home 210 through standard protocols and localizes them on the map. This includes positions of connected lights and speakers, vents, door and window sensors, and other connected devices in the home 210. The mobile cleaning robot 102 roams the home 210 and uses radio frequency (RF) signatures, visual recognition, received signal strength and other methods to recognize connected devices in the home 210 and automatically places them on the robot map of the home 210. For example, the mobile cleaning robot 102 explores the home 210 and recognizes a NEST® thermostat on the wall in the living room, a connected SAMSUNG™ fridge in the kitchen, and Philips™ HUE BLOOM lights in the family room and the bedroom. The mobile cleaning robot 102 puts the recognized connected devices on the map and enables the user 212 to take advantage of this spatial knowledge of the connected devices.

The sensing system 266 generates signals indicative of operations of the mobile cleaning robot 102. In some examples, the sensing system 266 includes a stall sensor unit integrated with the drive system that generates signals indicative of a stall condition of the mobile cleaning robot 102 in which the mobile cleaning robot 102 is unable to move along the floor surface within the home 210. The stall sensor unit generates a signal to indicate a change in current delivered to a motor of the drive system. The change in current can be indicative of a stasis condition for the mobile cleaning robot 102, in which the mobile cleaning robot 102 is unable to move substantially from its current pose. The stall sensor unit alternatively or additionally includes optical sensors that generate signals indicative of whether a wheel, e.g., the caster wheel 262 or one of the drive wheels 260, is moving when power is being delivered to motors of the drive wheels 260. The stall sensor unit, in some examples, is a mouse sensor for tracking and detecting motion, or lack thereof, by comparing successive images for change. In some implementations, the mobile cleaning robot 102 relies on an accelerometer to generate a signal indicative of an acceleration of the mobile cleaning robot 102. The controller 264, upon detection of the absence of movement of the wheel, determines that the mobile cleaning robot 102 is in a stall condition.

Figure 7:
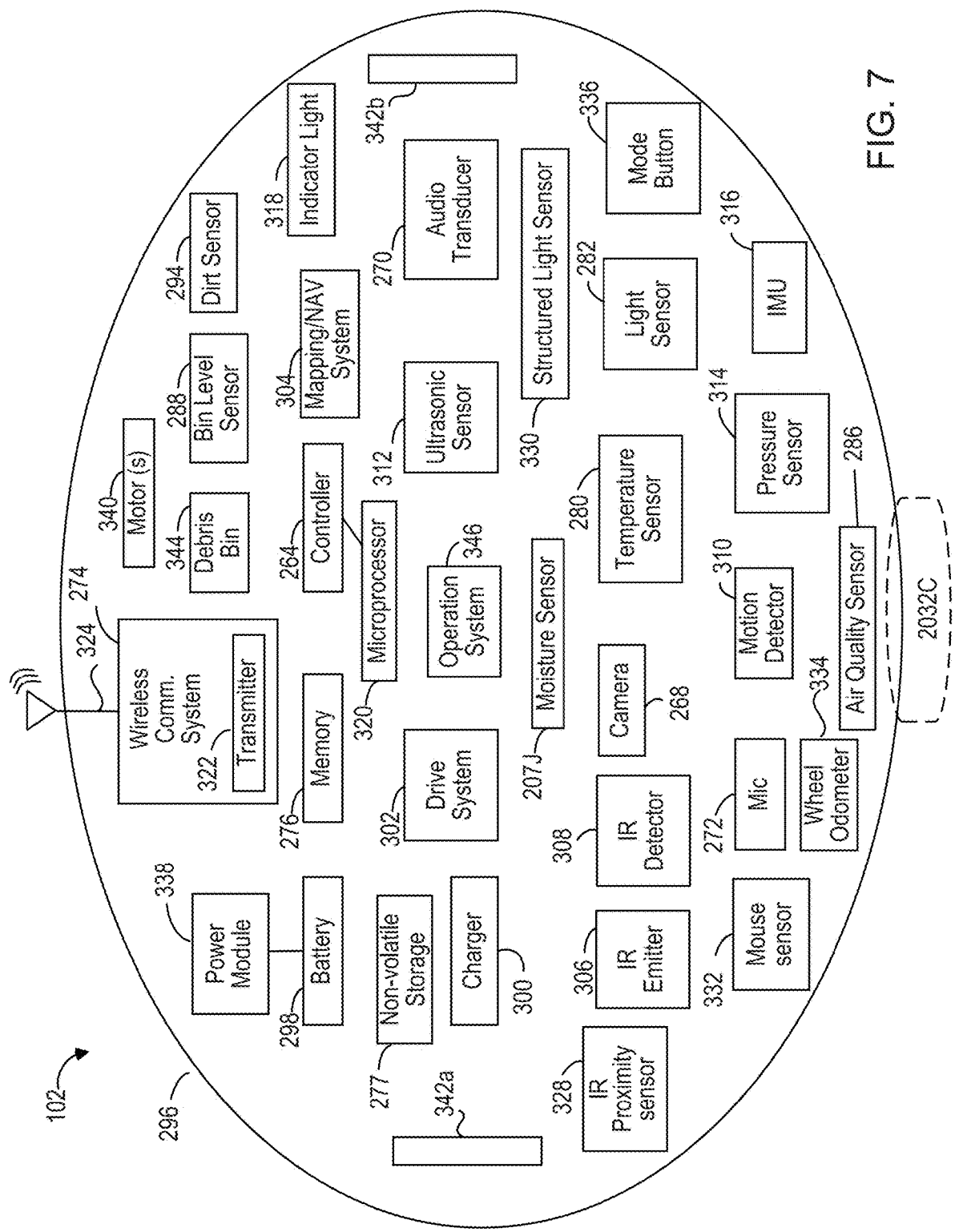
FIG. 7 is a schematic view of examples of sensors mounted on a mobile robot.

In some implementations, the mobile cleaning robot 102 includes other sensors as depicted in the schematic diagram of FIG. 7. The sensing system 266, in some examples, includes a microphone 272 that receives audible signals from the environment of the mobile cleaning robot 102. In some examples, the sensing system 266 includes environmental sensors, such as a temperature sensor 280, an ambient light sensor 282, an air moisture content sensor 284, a gas composition, air quality sensor 286, or sensors that sense other characteristics of the environment. The sensing system 266 also includes condition sensors indicative of conditions of the mobile cleaning robot 102 or of components of the mobile cleaning robot 102. These sensors include, for instance, battery charge state sensors to detect an amount of charge or a capacity for charge on a power source of the mobile cleaning robot 102, component life sensors such as wheel tread sensors to detect a serviceability of a component or an amount of remaining life of a component.

The mobile cleaning robot 102 further includes an audio emission system 270 that allows the mobile cleaning robot 102 to emit audible signals. The controller 264 causes emission of the audible signals, for example, to notify the user 212 of a status of the mobile cleaning robot 102, e.g., a status of components of the mobile cleaning robot 102, a status of operations of the mobile cleaning robot 102, or a status of a mission performed by the mobile cleaning robot 102.

The mobile cleaning robot 102 further includes a wireless communication system 274 that allows the mobile cleaning robot 102 to communicate with the remote computing system 152, as shown in FIGS. 2A, 3B, and 5B. Using the wireless communication system 274, the controller 264 transmits data to the remote computing system 152. In some examples, the data includes the signals generated by the sensors of the sensing system 266. In some implementations of the mobile cleaning robot 102 that includes the image capture system 268, the captured images can be transmitted directly to the remote computing system 152. In some examples, the mobile cleaning robot 102 collects information and constructs a map of the home 210 and the controller 264 transmits the map to the remote computing system 152. If the controller 264 includes condition sensors, the controller 264 also transmits information indicative of the condition of the mobile cleaning robot 102 to the remote computing system 152.

As described with respect to FIGS. 4, 5A, and 5B, during its navigation about the home 210, the mobile cleaning robot 102 performs operations and completes missions within the home 210. The performed operations depend on the type of the mobile cleaning robot 102. In addition to depicting basic components that may be present in many types of mobile cleaning robots for the implementations described herein, FIG. 6 depicts components specific to a vacuum cleaning robot, which corresponds to one of many types of mobile robots that may benefit from the processes described herein. Other mobile robots may include floor washing robots, home monitoring robots, robotic lawnmowers, mopping robots, companion robots, or sweeping robots. These robots may each benefit from the processes and systems described in this document.

In some examples, the mobile cleaning robot 102 is a vacuum cleaning robot that includes a cleaning system to ingest debris on a floor surface. The cleaning system includes, for example, rotatable rollers or brushes 278 that agitate debris from the floor surface into a debris bin (not shown) mounted on the mobile cleaning robot 102. The cleaning system includes an air mover that, upon activation, moves air, and thereby debris on the floor surface, towards the debris bin. As the mobile cleaning robot 102 navigates about its environment during a cleaning mission, the mobile cleaning robot 102 activates its cleaning system to ingest debris, thereby cleaning the floor surface.

In some examples, if the mobile cleaning robot 102 is a vacuum cleaning robot, the robot 102 includes a removable debris bin 344, and the sensing system 266 includes a debris bin level sensor 288 that detects an amount of debris ingested into the removable debris bin 344. The sensing system 266 includes one or more debris sensors or dirt sensors 294 that detect when the vacuum cleaning robot ingests debris, or detects a rate of debris ingestion. In some examples, the mobile cleaning robot 102 includes a filter for debris, the sensing system 266 also includes a filter sensor to detect whether the filter requires cleaning.

The exemplary mobile cleaning robot 102 includes a chassis 296, a battery 298, a battery charger 300, a power module 338 powered by the battery 298, one or more motors 340 powered by the power module 338, a drive system 302 driven by the motors 340, a mapping/navigation system 304, an infrared (IR) emitter 306, an infrared radiation detector 308, a motion detector (e.g., a passive IR photodiode) 310, an ultrasonic sensor 312, a pressure sensor 314, an inertial measurement unit (IMU) 316, and an indicator light 318. The controller 264 may include any suitably configured processor 320 (e.g., microprocessor) or processors. The microprocessor 320 is in communication with the controller 264, memory 276, the various sensors, and the drive system 302. In some implementations, the camera 268 is an imaging device that gathers 2D images, panoramic views, video and/or 3D models. The sensors described above are not exhaustive of the types of sensors that may be provided on the robot 102 and certain of the sensors may be omitted depending on the environmental parameters to be detected by the robot 102.

The wireless communication system 274 includes a wireless communication transmitter or module 322 (e.g., a Wi-Fi module) and an associated antenna 324 to enable wireless communication between the robot 102 and the mobile computing device 104, the remote computing system 152, a hub (such as a Google OnHub® Wi-Fi access point), a network router, and/or a private network.

In some implementations, the mobile cleaning robot 102 includes sensors for Obstacle Detection and Obstacle Avoidance ("ODOA") during transit through the home 210. These sensors include a mechanical bumper switch sensor 326 that is triggered on contact with a stationary obstacle and non-contact sensors such as ultrasonic sensors 312, infrared emitter/detector proximity sensors 328, and structured light sensors 330 such as those made by PixArt.

The mapping/navigation system 304 enables the robot 102 to perform autonomous navigation and mapping of the home 210. The mobile cleaning robot 102 includes sensors for autonomous navigation such as the camera 268 for Visual Simultaneous Localization and Mapping ("VSLAM"), a mouse sensor 332, the IMU 316 with a 3 axis accelerometer and a 3 axis gyroscope, and/or wheel odometers 334 to determine or register the position of the robot 102 relative to the space 210 (i.e., to localize the robot 102 in the space 210). The robot 102 can localize the locations of readings collected by its onboard sensors. Any suitable technique and components may be used to localize and register the robot 102, such as machine vision (e.g., using the camera 268 and Feature Recognition or Class Recognition software), light beacons, or radio frequency received signal strength indicator (RSSI) technology.

The robot 102 can include a mode button 336 that enables the user to select one of several operation modes, such as various cleaning modes. The robot 102 includes driven locomotive members 342a, 342b in contact with a floor surface and supporting the robot chassis 296. The driven locomotive members 342a, 342b are commandable by the controller 264 to cause the mobile cleaning robot 102 to traverse the floor surface within the home 210. The microprocessor 320, in some examples, navigate the mobile cleaning robot 102 to or through one or more mapped locations within the home 210. The robot 102 include an operating system 346 that manages various operations of the robot 102.

The controller 264 accesses a memory 276 that stores information collected by sensors and routines executable by the controller 264 to cause the mobile cleaning robot 102 to perform operations within the home 210. Routines include navigational routines, for example, to navigate the mobile cleaning robot 102 about the home 210. The controller 264 initiates operations of the mobile cleaning robot 102 in response to signals from, for example, the sensing system 266 or wireless command signals transmitted to the controller 264 through the wireless communication system 274. If the mobile cleaning robot 102 includes user input devices, such as manually operable buttons, the input devices can be operated by the user 212 to cause the controller 264 to initiate one or more operations of the mobile cleaning robot 102. The manually operable buttons, for example, correspond to push buttons or button icons on a touchscreen display. In some examples, the memory 276 also stores deterministic patterns of movement that the controller 264 implements to navigate the mobile cleaning robot 102 through the home 210. The patterns include, for example, a straight motion pattern, a vine pattern, a cornrow pattern, a spiral pattern, a zigzag pattern, or other patterns including combinations of patterns. The memory 260 also stores the data collected by the sensors of the sensing system 266, including any of the dead reckoning sensors, the localization sensors, the condition sensors, or other sensors of the sensing system 266. If the controller 264 constructs the map of the home 210, the controller 264 optionally stores the map in a non-volatile storage device 277 for reuse on a subsequent cleaning mission.

The operations available to the mobile cleaning robot 102 depend on the type of the mobile cleaning robot 102. For example, if the mobile cleaning robot 102 is a vacuum cleaning robot, the memory 276 includes routines for performing floor cleaning operations. When the vacuum cleaning robot receives a command to begin a cleaning mission, the vacuum cleaning robot performs floor cleaning operations by autonomously navigating about its environment and ingesting debris from the floor surface. The floor cleaning operations include a room cleaning operation in which the controller 264 navigates the vacuum cleaning robot in a pattern, e.g., a cornrow pattern, a spiral pattern, or other appropriate movement pattern, to cover the floor surface of a room or multiple rooms.

In some examples, the floor cleaning operations include a spot cleaning operation in which the vacuum cleaning robot, upon receiving a command to perform the spot cleaning operation, restricts its cleaning operation to a localized area. The localized area may include a greater amount of detected debris, as detected by the debris sensors. As part of the spot cleaning operation, the controller 264 additionally or alternatively increases power delivered to the air mover of the vacuum cleaning robot to cause debris to be more easily ingested by the vacuum cleaning robot. To perform the spot cleaning operation, the controller 264 controls the drive system such that the vacuum cleaning robot moves in a predefined pattern, e.g., a spiral pattern, within the localized area. The initiation of any of the floor cleaning operations may occur in response to sensor signals. If the vacuum cleaning robot includes a debris sensor, the controller 264 can control the vacuum cleaning robot to perform the spot cleaning operation in response to detection of the debris by the debris sensor.

In the examples of FIGS. 1A to 5B, the user 212 may initiate a spot cleaning operation upon identifying one or more spots that need to be cleaned. The mobile computing device 104, 165 can send the spot cleaning operation command to the mobile cleaning robot 102 directly or through the remote computing system 152.

In some implementations, the mobile cleaning robot 102 communicates or otherwise interacts with other devices in its environment. The mobile cleaning robot 102, for example, includes a rechargeable battery that can be recharged at a station electrically connectable with the battery. In some examples, the battery is a removable battery that is inserted in the station, while in other examples, the mobile cleaning robot 102 docks at the station, thereby enabling the station to recharge the battery. As depicted in FIG. 4, a docking station 222 is located in the room 214A. The docking station 222 includes a charger operative to charge the battery of the mobile cleaning robot 102 when the mobile cleaning robot 102 is docked at the docking station 222, e.g., physically and/or electrically connected to the docking station 222. If the mobile cleaning robot 102 is a vacuum cleaning robot, the docking station 222 additionally or alternatively serves as an evacuation station including a motorized receptacle to empty debris from the debris bin of the vacuum cleaning robot.

In another example depicted in FIG. 4, a transmitting unit 290 located proximate the doorway 216B transmits an axially-directed confinement beam that spans at least a length of the doorway 216B. The transmitting unit 290 is positioned so that the emitted confinement beam separates the room 214C from the room 214B. In some examples, the sensing system 266 includes an omnidirectional detector that detects the emitted confinement beam. In response to detection of the confinement beam, the controller 264 navigates the mobile cleaning robot 102 to avoid crossing the confinement beam, thereby maintaining autonomous navigation of the mobile cleaning robot 102 in the room 214C or outside of the room 214C. The mobile cleaning robot 102, for examples, moves away from the confinement beam when the omnidirectional detector detects the confinement beam. If the second mobile cleaning robot 238 includes such an omnidirectional detector, the transmitting unit 290 restricts the second mobile cleaning robot 238 such that the second mobile cleaning robot 238 autonomously navigates within the room 214C without moving across the confinement beam and hence the doorway 216B.

In some examples, one or more transmitting units emit signals into the environment that are detectable by localization sensors on the mobile cleaning robot 102. The signals are, for example, optical or acoustic signals that remain stationary within the home 210. For example, if the transmitting unit transmits a narrowly directed acoustic signal into the home 210 while the mobile cleaning robot 102 navigates through the home 210, the controller 264 localizes to the acoustic signal when an acoustic receiver on the mobile cleaning robot 102 receives it. The acoustic signal can be directed towards a wall surface such that the acoustic receiver detects a reflected acoustic signal, or the acoustic signal can be directed towards a floor surface so that the acoustic receivers receives a direct emission of the acoustic signal. The transmitting unit transmits one or more of these signals into the home 210, and the mobile cleaning robot 102 uses each of these signals as localizing features. In some examples, the transmitting unit emits a narrowly focused optical beam into the home 210 that the sensing system 266 detects and the controller 264 uses to localize the mobile cleaning robot 102 within the home 210.

The wireless communication system for the mobile cleaning robot 102 enables transmission of data between the mobile cleaning robot 102 and the remote computing system 152, or between the mobile cleaning robot 102 and the mobile computing device 104, 165 as shown in FIGS. 1A and 2A to 3B. The remote computing system 152 can be configured to include computing resources remote from the environment of the mobile cleaning robot 102, e.g., remote from the home 210. For example, as shown in FIG. 5B, the remote computing system 152 can include one or more servers 300 that establish communication links with each of the mobile cleaning robots 102, 238. The one or more servers 300, in some examples, are connected to a network of one or more remotely located servers (a "cloud" computing network 302). The remote computing system 152 includes, for example, a portion of a network-accessible computing platform implemented as a computing infrastructure of processors, storage, software, and databases maintained and accessible through a communication network. The remote computing system does not require the user 212 to be knowledgeable of the physical location and configuration of the system, nor does the remote computing system require the user 212 to be knowledgeable of the routines executed by the remote computing system 152 or services delivered by the remote computing system 152. The remote computing system 152 can include one or more databases to store mobile robot identification data and associated user data.

The dead reckoning and/or localization sensors for the mobile cleaning robot 102 can include sensors that generate signals from which features can be extracted to localize the mobile cleaning robot 102. The dead reckoning and/or localization sensors alternatively or additionally include sensors remote from the mobile cleaning robot 102, e.g., sensors on linked devices 292A, 292B.

The mobile cleaning robot 102 can emit signals detectable by remote dead reckoning sensors such that changes in the relative position and/or orientation of the mobile cleaning robot 102 while the mobile cleaning robot 102 navigates about the environment are estimated using outputs from these sensors.

Linked devices 292A, 292B (e.g., network connected devices) can generate information that, in some implementations, accessed by the remote computing system 152 and the mobile cleaning robot 102 to improve the accuracies of the robot map. The linked devices 292A, 292B include sensors that detect features in the home 210, such as an acoustic sensor, an image capture system, or other sensor generating signals from which features can be extracted. In some instances, the linked devices 292A, 292B transmit the information derived from the sensor signals to the remote computing system 152. The remote computing system 152 correlates the information relating to these features with features on the robot map.

In some implementations, the linked devices 292A, 292B generate their own maps of portions of the home 210 that are compared to the robot map. The linked devices 292A, 292B, for example, include cameras, optical sensors, ranging sensors, acoustic sensors, or other sensors that generate signals to be used to form a map of an environment of the linked devices 292A, 292B. In some examples, the linked devices 292A, 292B cooperate with one another to form maps.

The linked devices 292A, 292B also may emit signals received by sensors on the mobile cleaning robot 102. The mobile cleaning robot 102 uses signals generated by its sensors in response to the signals from the linked devices 292A, 292B to triangulate the position of the mobile cleaning robot 102. The emitted signals can be, for example, optical signals, acoustic signals, wireless signals, and other detectable signals whose intensities change as they propagate through the environment.

In some implementations, during operations of the mobile cleaning robot 102, the sensing system for the mobile cleaning robot 102 detects an error status associated with the mobile cleaning robot 102. The remote computing system 152 may receive indication of the error status and send a message to the user 212 and suggest the user 212 to correct the basis of the error status.

Operations for each of the processes described in this document can be executed in a distributed manner. For example, the remote computing system 152, the mobile cleaning robot 102, and the remote computing device 104, 165 may execute one or more of the operations in concert with one another. Operations described as executed by one of the remote computing system 152, the mobile cleaning robot 102, and the mobile computing device 104, 165 can in some implementations, be executed at least in part by two or more of the remote computing system 152, the mobile cleaning robot 102, and the mobile computing device 104, 165.

Figure 8A:
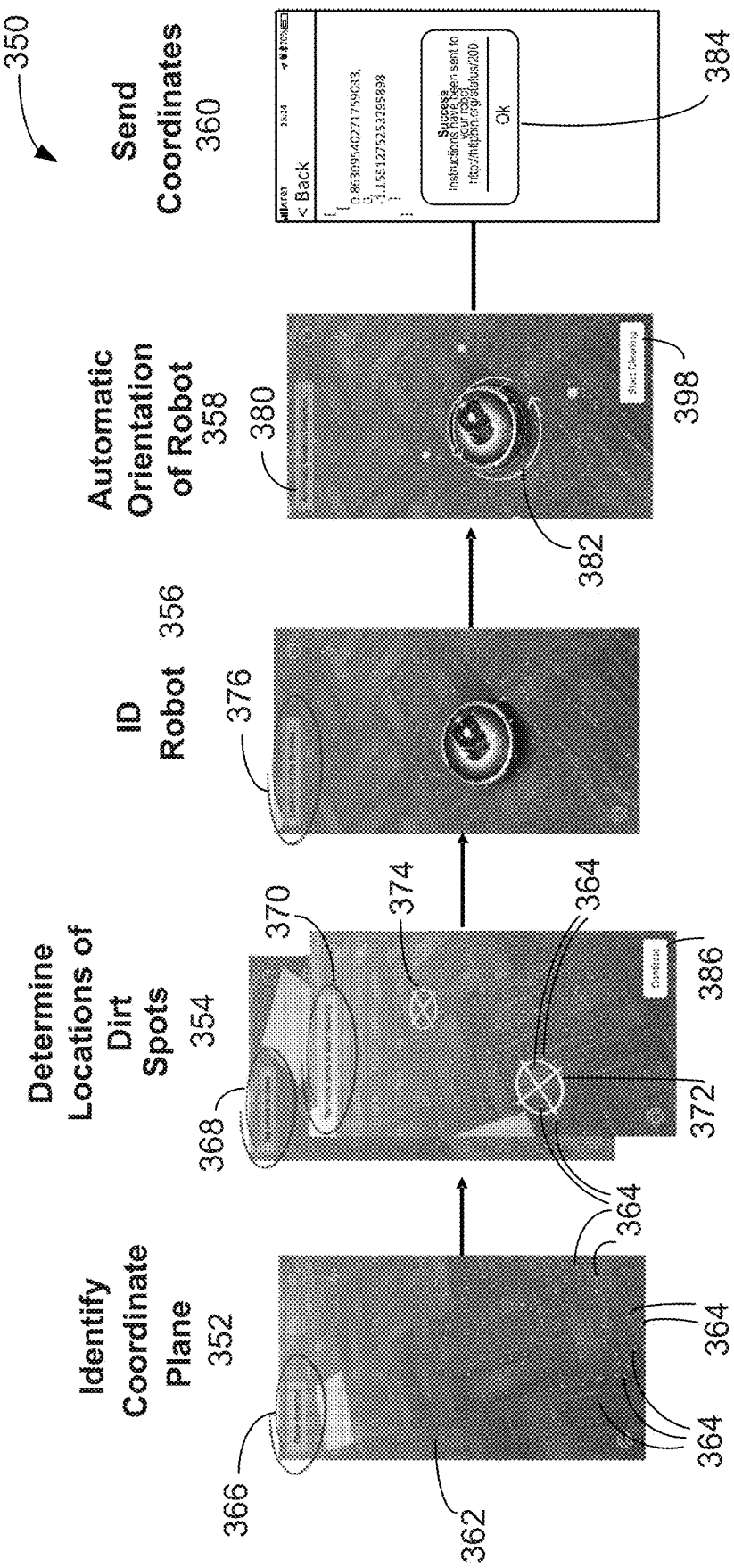
FIG. 8A is a diagram showing exemplary steps for instructing a robot to move to a user-identified location.

The following describes exemplary processes for performing spot cleaning by the mobile cleaning robot 102. Referring to FIG. 8A, in some implementations, a spot cleaning process 350 uses an augmented reality tool and image detection modules to establish a coordinate system in the home 210, detect the robot 102, determine the coordinates of the robot 102 within the coordinate system, and determine the orientation angle of the robot 102 relative to the axes of the coordinate system. In this example, the image detection modules include convolutional neural networks, but other image detection modules can also be used.

In some implementations, the process 350 includes identifying 352 a coordinate plane. The user 212 executes the spot cleaning program 132 on the mobile computing device 104 and points the camera 120 (FIG. 1) at the floor 362. The camera 120 captures images of the floor 362, and the images are shown in a user interface on the touch screen display of the mobile computing device 104. The spot cleaning program 132 uses the augmented reality toolkit 126 to analyze the images of the floor 362, identify feature points 364 on the floor 362, and establish a reference plane in a virtual space, in which the reference plane lies on, or coincides with, the floor surface. The augmented reality toolkit 126 establishes a Cartesian coordinate system in which the x-y plane lies on, or coincides with, the reference plane, such that the x-y plane of the coordinate system in the virtual space coincides with the floor surface. The spot cleaning program 132 shows a message 366 in the user interface indicating to the user 212 that the reference plane has been detected.

The augmented reality toolkit 126 establishes the reference plane by processing the video frames provided by the camera 120 to identify feature points in the video frames, and tracking the feature points across multiple video frames. The augmented reality toolkit 126 estimates three-dimensional positions of the feature points using information obtained from analyzing the images and sensor data from the motion sensors 122. The augmented reality toolkit 126 fits planes to the feature points, identifies a plane that best matches the feature points, and establishes the coordinate system based on the identified plane.

The process 350 includes determining 354 the locations of the dirt spots or regions that need to be cleaned. The spot cleaning program 132 shows a message 368 in the user interface prompting the user 212 to indicate the locations of the spots that need to be cleaned. The user 212 points the camera 120 at a spot that needs to be cleaned and taps on the spot in the image. The spot cleaning program 132 calls an API of the augmented reality toolkit 126 to determine the coordinates of the spot identified by the user 212. During the augmented reality session, the augmented reality toolkit 126 tracks the position and orientation of the mobile computing device 104, 165 using visual-inertial odometry, described in more detail below. Given the information about the position and orientation of the mobile computing device 104, 165, the augmented reality toolkit 126 is able to determine the coordinates of a point in the image captured by the camera 120 using "hit-testing," described in more detail below. In some examples, the augmented reality toolkit 126 determines the coordinates of the spot based on information about the position and orientation of the mobile computing device 104, 165, and information about the positions of identifiable feature points 364 at or near the spot.

After the augmented reality toolkit 126 determines the coordinates of the spot tapped by the user 212, the spot cleaning program 132 overlays a marker 372 on the image to indicate the location of the spot. The spot cleaning program 132 shows a message 370 to prompt the user 212 to tap more spots that need to be cleaned. The user 212 taps a second spot, and a marker 374 is shown to indicate the location of the second spot. The user 212 then taps a "Continue" button 386 in the user interface to go to the next step.

When the user 212 moves the mobile computing device 104 in the home 210, the augmented reality toolkit 126 continuously analyzes the images captured by the camera 120 and the sensor data provided by the motion sensors 122 to determine the coordinates and orientation of the mobile computer device 104 in the virtual space coordinate system using visual-inertial odometry. When the user 212 points the camera 120 at the dirt spots at locations 372, 374, the augmented reality toolkit 126 is able to determine the coordinates of the markers 372, 374 in the virtual space using a technique referred to as "hit-testing." The augmented reality toolkit 126 searches for real-world objects or surfaces detected through the augmented reality session's processing of the camera image. A two-dimensional point in the view's coordinate system can refer to any point along a three-dimensional line that starts at the device camera and extends in a direction determined by the device orientation and camera projection. The hit-testing method searches along that line and returns the objects that intersect the line from the camera. By using the hit-testing method, the augmented reality toolkit 126 can determine the coordinates of the dirt spots (indicated by markers 372, 374) in the virtual space.

The process 350 includes identifying 356 the mobile cleaning robot 102 and determining coordinates of the robot 102. The user 212 walks over to the vicinity of the robot 102 and points the camera 120 at the robot 102. The spot cleaning program 132 uses the first detection module 133 to process the images and automatically detect the mobile cleaning robot 102 in the images. As will be described in more detail later in this document, the first neural network 134 has been trained to detect the robot 102 under various viewing angles, viewing distances, and lighting conditions. The spot cleaning program 132 uses image processing to identify one or more features on the robot 102, determines the coordinates of the one or more features, and uses the coordinates of the one or more features to represent the coordinates of the robot 102.

For example, the spot cleaning program 132 can identify a first spot at the center of the top surface of the robot 102, and use the coordinates of the first spot to represent the coordinates of the robot 102. As another example, the spot cleaning program 132 can identify a second spot at the center front edge of the top surface of the robot 102, and use the coordinates of the second spot to represent the coordinates of the robot 102.

The spot cleaning program 132 shows a message "Locating robot" 376 in the user interface on the display while the first detection module 133 is processing the images.

In some implementations, instead of using the first detection module 133 to automatically identify the robot 102, the user 212 can tap on the robot 102 shown on the display to identify the robot 102. The spot cleaning program 132 uses image processing to identify a point in the image that corresponds to the center of the top portion of the robot 102, and uses the augmented reality toolkit 126 to determine the coordinates of that point in the virtual space, similar to the method for determining the coordinates of the dirt spot. In this example, the coordinates of the center of the top portion of the robot 102 represent the coordinates of the robot 102.

After the first neural network 134 identifies the robot 102, the spot cleaning program 132 uses the augmented reality toolkit 126 to overlay an outline of a virtual robot 378 (in this example, the virtual robot is shown in white lines) on the robot 102 in the image. The virtual robot outline 378 is tilted and oriented to match the perspective view of the real robot 102 in the image. The front direction of the virtual robot outline 378 matches that of the real robot 102 in the image. This provides visual confirmation to the user 212 that the robot 102 has been correctly identified.

The process 350 includes automatic orientation 358 of the robot 102. The purpose of this step is to let the robot 102 know its orientation in the virtual space. The spot cleaning program 132 shows a message 380 in the user interface and rotation marks 382 around the robot 102 to indicate that automatic rotation detection is being performed. The spot cleaning program 132 uses the second detection module 135 to determine the orientation angle of the robot 132. As will be discussed in more detail later in this document, the second neural network 136 has been trained to identify the orientation angle of the robot 102 based on top-view images of robots that look the same or similar to the robot 102, in which the robots are oriented at various angles relative to a reference direction.

The spot cleaning program 132 rotates the image of the robot 132 (e.g., along an axis that passes the center of the robot 102 and is perpendicular to a line extending from a center of the image sensor of the camera 120 to a center of the robot 102) to generate a top-view image of the mobile cleaning robot 102. The top-view image is provided as input to the second neural network 136, which identifies the angle of orientation of the mobile cleaning robot 102 relative to a reference direction. For example, the reference direction can be the x-axis or y-axis in the coordinate system of the virtual space.

Figure 8B:
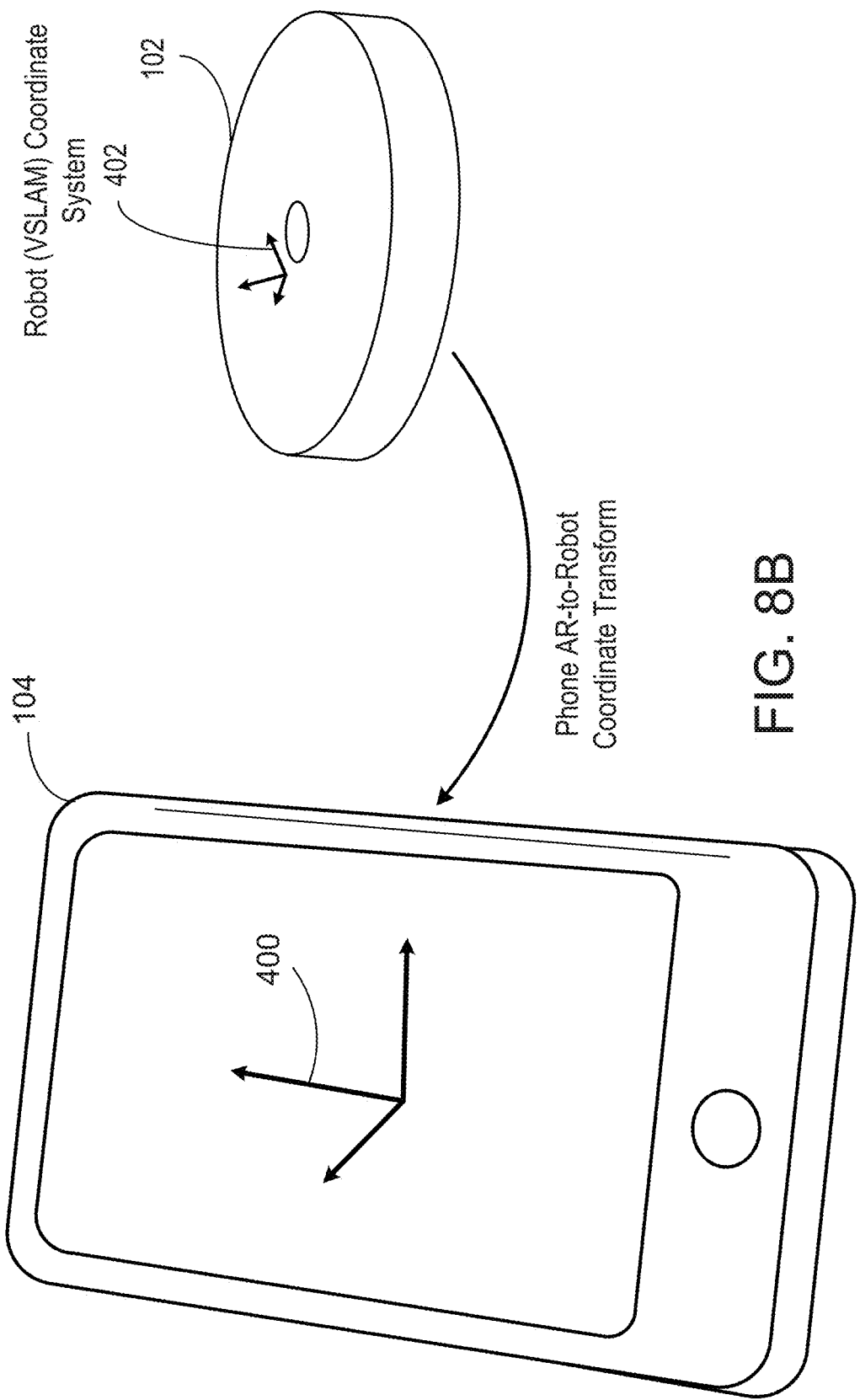
FIG. 8B is a diagram showing a mobile computing device sharing a coordinate system with a mobile robot.

Referring to FIG. 8B, the augmented reality toolkit 126 executing on the mobile computing device 104 establishes a coordinate system 400 (referred to as the "virtual space coordinate system") in step 352 of the process 350. The robot 102 employs visual simultaneous localization (VS-LAM) to establish a coordinate system (referred to as the "robot coordinate system") to build a map and determine its current pose on the map. The purpose of step 356 and 358 in the process 350 is to enable a transformation between the virtual space coordinate system and the robot coordinate system. Once the robot 102 knows its own coordinates and orientation in the virtual space, it will be able to convert the coordinates of any point in the virtual space coordinate system to coordinates in the robot coordinate system.

Figure 8C:
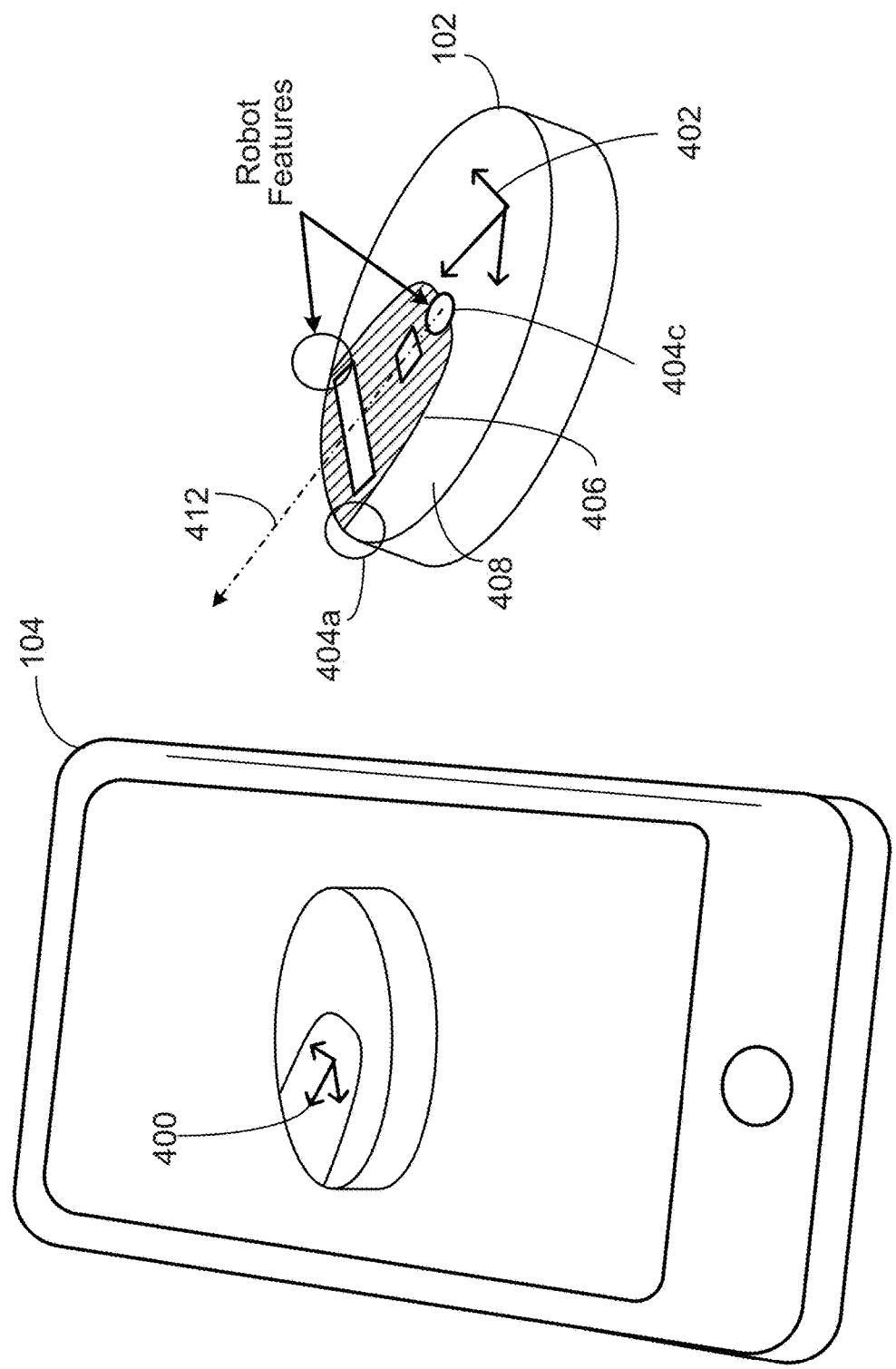
FIG. 8C is a diagram showing a mobile computing device determining an orientation angle of a mobile robot.

Referring to FIG. 8C, the step 358 in the process 350 enables the robot 102 to determine the rotation angle between the robot coordinate system 402 and the virtual space coordinate system 400, which also enables the robot 102 to determine its own orientation angle relative to a reference direction in the virtual space. The top-side of the robot 102 has asymmetrical features, such as 404a, 404b, and 404c that can be used to determine the orientation angle of the robot 102. In this example, the top faceplate of the robot 102 has a darker region 406 extending from near a center of the robot to the front side of the robot, in contrast to a lighter region 408 that surrounds the darker region 406. The features 404a and 404b represent the locations where the darker region 406 meets the lighter region 408 at the front edge of the robot 102. The feature 404c represents the point at the middle of the rear edge of the darker region 406. An axis 412 extending from the feature 404c to a midpoint 410 of the front edge of the robot 102 between the features 404a and 404b points toward the front of the robot 102. The step 358 attempts to find the angle between the axis 412 and a reference direction in the virtual space. For example, the reference direction can be the x-axis or the y-axis of the virtual space coordinate system 400.

Referring back to FIG. 8A, after the second neural network 136 completes identifying the orientation angle of the robot 102, the user 212 taps on a "Start Cleaning" button 398 in the user interface overlaid on the bottom of the image to start the cleaning mission.

The process 350 includes sending 360 from the mobile computing device 104 to the mobile cleaning robot 102 an instruction to request the robot 102 to go clean the dirt spots. The instruction includes the coordinates of the dirt spots (represented by coordinates of the marks 372, 374), the coordinates and orientation angle of the mobile cleaning robot 102, and a request that the robot 102 travel from its current location to the dirt spots. The spot cleaning program 132 shows a message 384 in the user interface on the display 138 indicating that an instruction for spot cleaning has been sent to the robot 102.

Figure 9A:
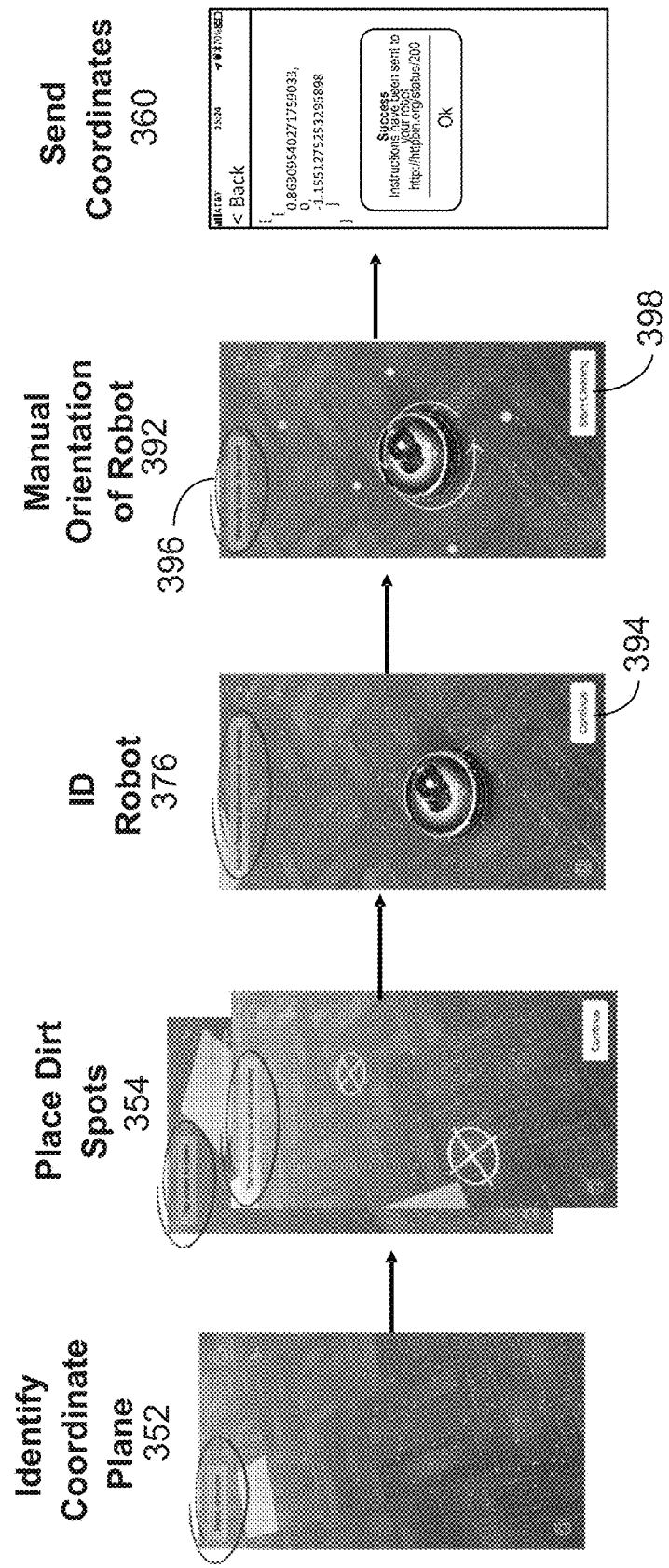
FIG. 9A is a diagram showing exemplary steps for instructing a mobile robot to move to a user-identified location.

Referring to FIG. 9A, in some implementations, a spot cleaning process 390 is similar to the process 350 except that the user 212 manually determines the orientation angle of the mobile cleaning robot 102. The process 390 includes identifying 352 a coordinate plane, determining 354 the locations of the dirt spots, and identifying 356 the robot in the images, similar to the corresponding steps in the process 350.

After the first neural network 134 successfully identifies the robot 102 in step 356, the user 212 taps on the "Continue" button 394 in the user interface overlaid on the bottom of the image shown on the display 138. The process 390 includes manually orienting 392 the robot 102. The spot cleaning program 132 shows a message 396 in the user interface prompting the user 212 to manually orient the robot 102.

Figure 9B:
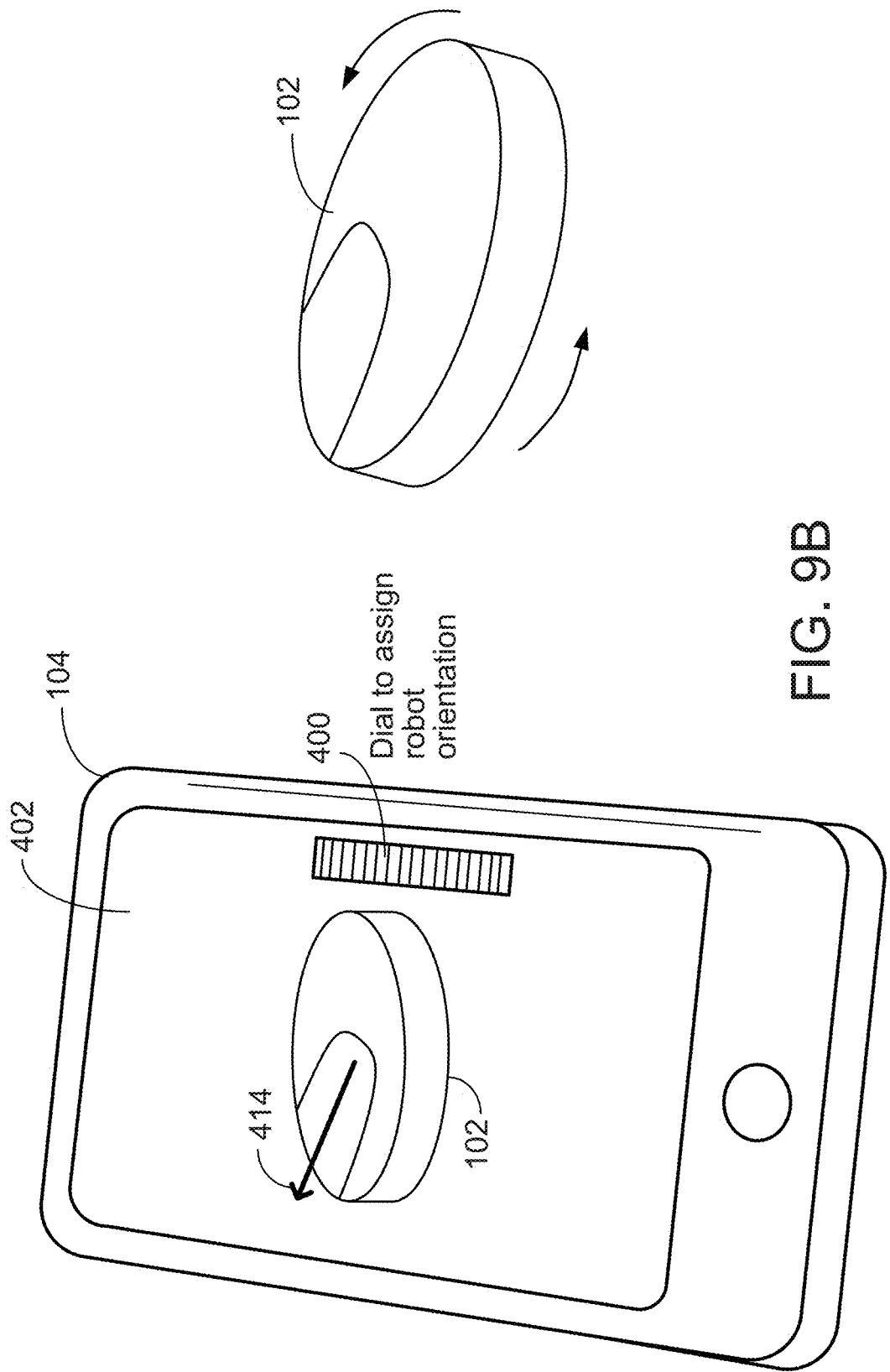
FIG. 9B is a diagram showing an example user interface for manually assigning the orientation of a mobile robot.

Referring to FIG. 9B, the spot cleaning program 132 provides a user interface that shows an image 402 that includes a view of the robot 102, and a slide dial 400 overlaid on the image 402. As the user slides the dial 400 up or down, the robot 102 rotates counter-clockwise or clockwise accordingly. The user interface shows a reference direction 404 overlaid on the robot 102 in the image 402. The dial 400 enables the user 212 to manually adjust the orientation angle of the robot 102 such that the front of the robot 102 is aligned with a reference direction 414 shown in the user interface overlaid on the robot 102 in the image 402.

Referring back to FIG. 9A, after the user 212 finishes aligning the robot 102 with the reference direction 414, the user 212 taps on the "Start Cleaning" button 398 in the user interface to start the cleaning mission.

Figure 10:
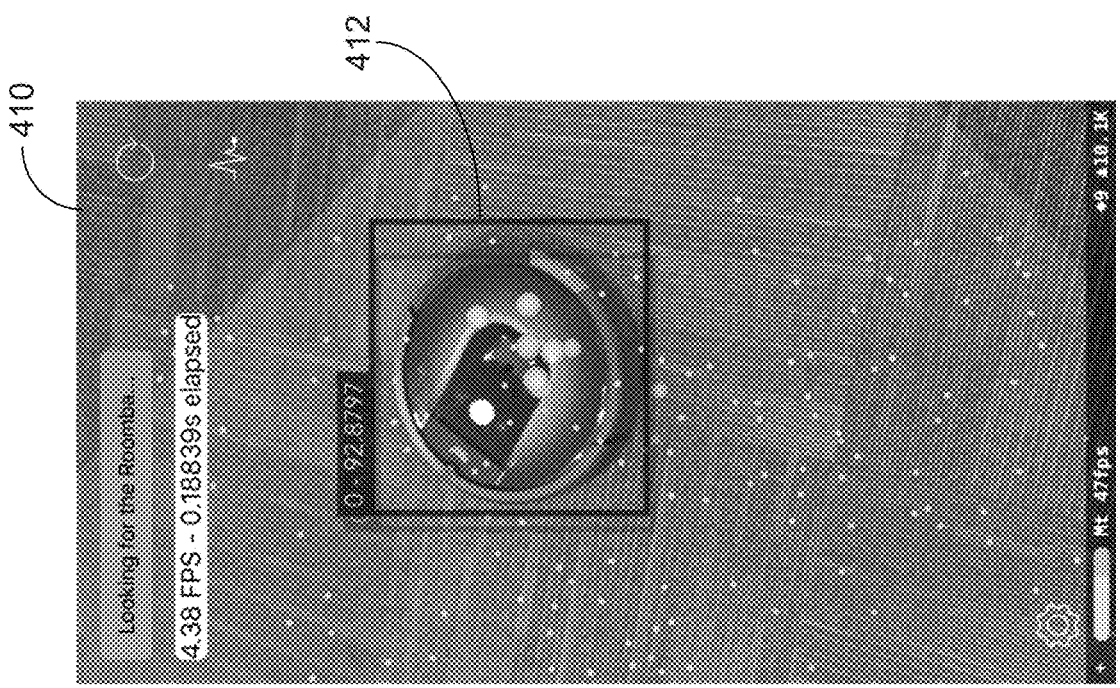
FIG. 10 is a screenshot of an example user interface showing an image of a mobile robot as the position of the mobile robot is being detected.

FIG. 10 shows a screenshot 410 of a user interface showing an image of a mobile cleaning robot 102 on the floor as the position of the robot is being detected. A bounding box 412 is shown overlaid on the image, in which the size and location of bounding box 412 is adjusted to find a smallest bounding box that encloses the robot 102. The location of the bounding box 412 is used to determine the position of the robot 102.

Figure 11:
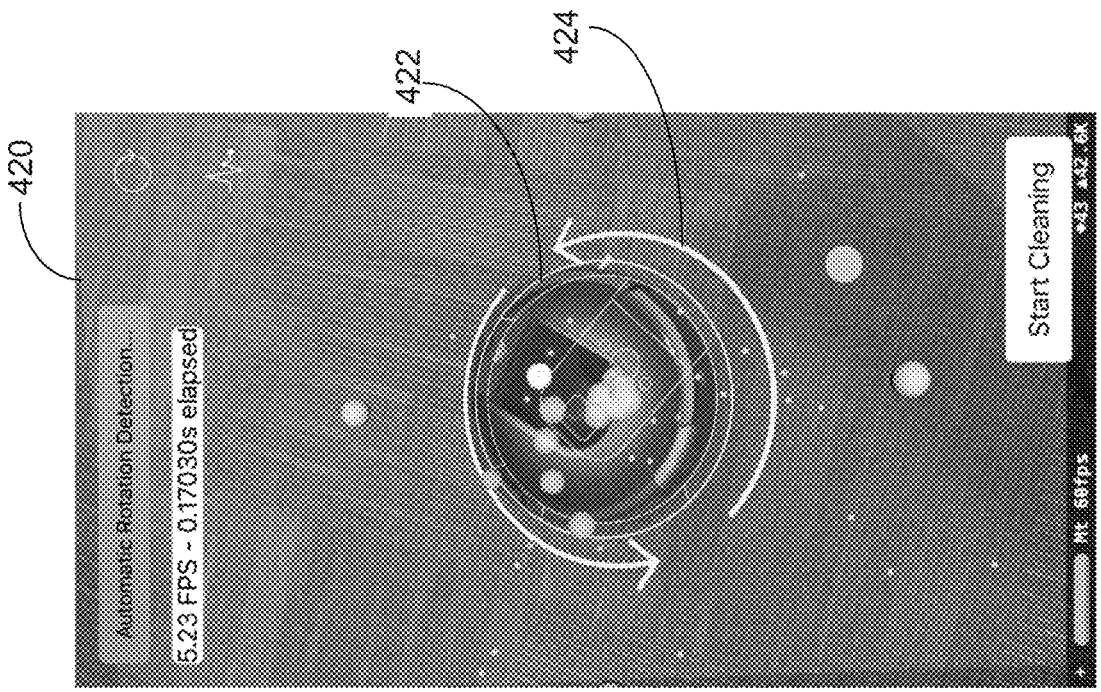
FIG. 11 is a screenshot of an example user interface showing an image of a mobile robot as the angle of orientation of the mobile robot is detected.

FIG. 11 shows a screenshot 420 of a user interface showing an image of a mobile cleaning robot 102 as the angle of orientation of the robot 102 is being detected. An outline of a virtual robot 422 is overlaid on the image of the robot 102. Initially, the front of the virtual robot 422 faces a reference direction. In this example, the virtual robot 422 needs to be rotated in the counter-clockwise direction 424 in order to align with the real robot 102.

The detection module 133 can use any of a variety of image detection systems that are capable of recognizing objects, e.g., mobile cleaning robots. The first neural network 136 can use any of a variety of neural network architectures, in particular deep neural networks having several hidden layers between input and output layers. The detection module 133 does not necessarily have to use a neural network. Other technologies that provide image recognition capabilities can also be used. The first neural network 136 can be, e.g., a convolutional neural network. The following lists some of the image detection architectures that can be used for the first detection module 133. These are merely examples and should not be construed to limit the scope of the invention.

For example, suitable image detection systems include YOLO (You Only Look Once) detection system described in the article "You Only Look Once: Unified, Real-Time Object Detection" by Joseph Redmon, Santosh Divvala, Ross Girshick, and Ali Farhadi, available at the web address "https://arxiv.org/pdf/1506.02640v5.pdf". Additional information about the YOLO detection system can be found at the web address "http://pjreddie.com/yolo". An image detection system can be based on the Fast YOLO architecture, which uses fewer convolutional layers (e.g., 9 layers instead of 24) and fewer filters in the layers, resulting in a faster recognition speed. The image detection system can be based on YOLOv2, described in the article "YOLO9000: Better, Faster, Stronger," by Joseph Redmon and Ali Farhadi, available at "https://arxiv.org/pdf/1612.08242v1.pdf". The image detection system can be based on, e.g., YOLOv2 544×544, YOLOv2 608×608, or Tiny YOLO models. The image detection system can use deformable parts models (DPM) that use a sliding window approach to object detection. The image detection system can use R-CNN and its variants that use region proposals instead of sliding windows to find objects in images. The image detection system can use Fast and Faster R-CNN, which focuses on speeding up the R-CNN framework by sharing computation and using neural networks to propose regions instead of selective search. The image detection system can use Deep MultiBox, in which a convolutional neural network is trained to predict regions of interest. The image detection system can use OverFeat, in which a convolutional neural network is trained to perform localization and the localizer is adapted to perform detection. The image detection system can use MultiGrasp, which uses grasp detection. The various image detection architectures described above are merely examples, other image detection architectures can also be used.

Figure 12:
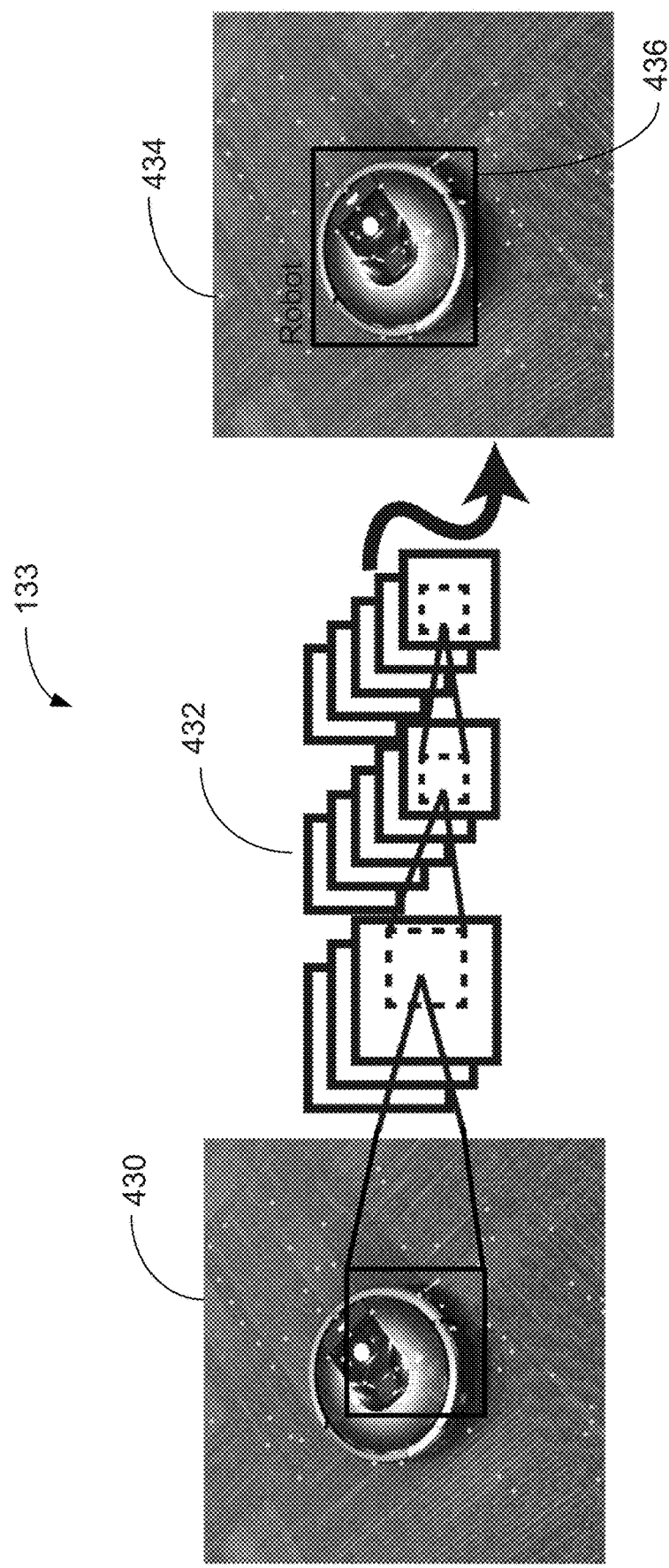
FIGS. 12 to 15 are diagrams of example neural networks for detecting a mobile robot based on images that include the mobile robot.

FIG. 12 shows an example image detection module 1200 that can recognize mobile cleaning robots. The image detection module 1200 can be used for the image detection module 133. It is understood that the detailed example for the image detection module 1200 is merely for illustrative purposes and does not limit the scope of the invention. The image detection module 1200 is based on the YOLO detection system. The image detection module 1200 resizes an input image 430 (e.g., to an image size suitable for subsequent processing by a neural network), applies a convolutional neural network 432 on the image to simultaneously predict multiple bounding boxes and class probabilities for those boxes, and applies thresholds to the resulting detections based on the model's confidence. In the example of FIG. 12, the input image has only one object, i.e., a mobile cleaning robot, and the neural network 432 predicts one bounding box 436 for the robot. The output of the image detection module 1200 is the output image 434, in which the robot is shown inside the bounding box 436. The neural network 432 is trained on full images that include views of mobile cleaning robots and directly optimizes detection performance.

The image detection module 1200 uses information from the entire image when making predictions. The neural network 432 sees the entire image that includes view(s) of robot(s) during training and test time so it implicitly encodes contextual information about classes of mobile cleaning robots and their appearances. The image detection module 1200 learns generalizable representations of objects, e.g., the robot 102 and other types of mobile cleaning robots. The image detection module 1200 uses a convolutional neural network that uses features from the entire image to predict each bounding box. The neural network predicts bounding boxes across classes for an image simultaneously. The neural network reasons globally about the full image and the various objects in the image.

The image detection module 1200 enables end-to-end training and real time speeds while maintaining high average precision. The image detection module 1200 divides the input image into a grid. If the center of an object falls in a grid cell, the grid cell is responsible for detecting the object. Each grid cell predicts bounding boxes and confidence scores for the boxes. The confidence scores reflect how confident the model is that the box contains an object (e.g., a mobile cleaning robot) and also how accurate the object in the box is what is predicted by the grid cell. If no object exists in the cell, the confidence scores should be zero, otherwise the confidence score is equal to the intersection over union (IOU) between the predicted box and the ground truth.

Each bounding box includes five predictions: x, y, w, h, and confidence. The (x; y) coordinates represent the center of the box relative to the bounds of the grid cell. The width and height are predicted relative to the whole image. The confidence prediction represents the IOU between the predicted box and any ground truth box.

Each grid cell also predicts conditional class probabilities. These probabilities are conditioned on the grid cell containing an object. One set of class probabilities is predicted per grid cell.

At test time, the conditional class probabilities are multiplied by the individual box confidence predictions, which provides class-specific confidence scores for each box. These scores encode both the probability of the class appearing in the box and how well the predicted box fits the object (e.g., the mobile cleaning robot).

Figure 13:
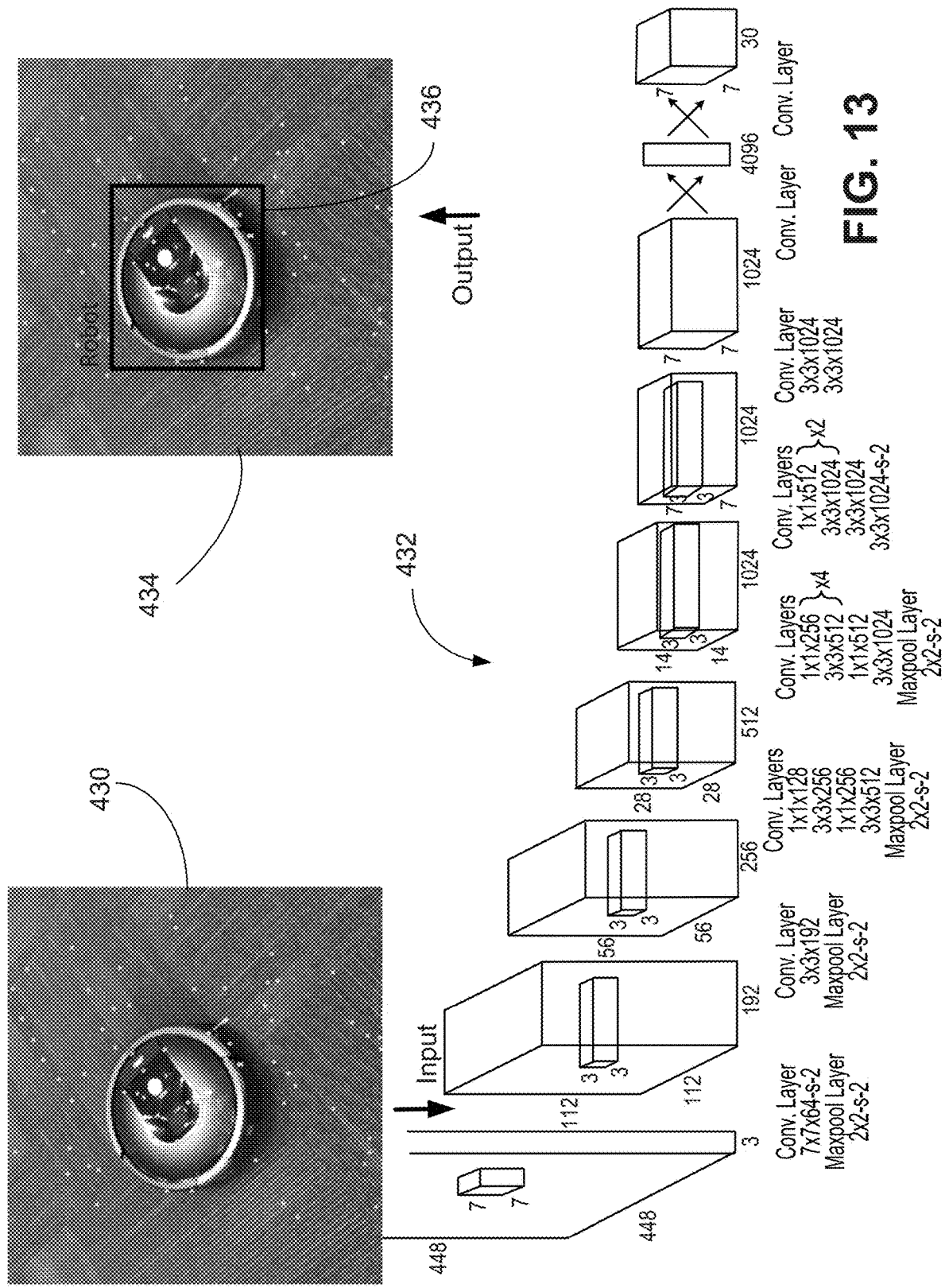

FIG. 13 is a diagram of an exemplary multi-layer convolutional neural network 432. The configuration of the network 432 shown in the figure is merely an example, the parameters of the network 432 can vary depending on application. For example, the number of layers and the input image sizes can be different for different applications. The neural network 432 can be trained as follows. Starting at the input layer, the patterns of the training data are forward propagated through the network to generate an output. Based on the network's output, an error is calculated using a cost function, in which the training process attempts to minimize the error. The error is back-propagated, the derivative of the error with respect to each weight in the network is calculated, and the network is updated. After the neural network 432 has been trained, a new image (e.g., 430) including one or more objects (e.g., mobile cleaning robots) is provided as input to the network and forward propagated to calculate the network output, and a threshold function is applied to obtain the predicted class labels (e.g., robot model 1, robot model 2, etc.). The output image 434 includes the object(s) bound by bounding box(es) having the predicted label(s).

The following describes the neural network 432 in more detail. The object detection is processed as a single regression from image pixels to bounding box coordinates and class probabilities. In general, the input image is divided into a grid, and for each grid cell, bounding boxes are generated and class probabilities for the bounding boxes are determined. The initial convolutional layers of the network extract features from the image while the fully connected layers predict the output probabilities and coordinates. The network has several (e.g., 24) convolutional layers followed by a number of (e.g., 2) fully connected layers. The convolutional layers are pre-trained using images that include views of various models of mobile cleaning robots. For each model of robot, several images were captured from various viewing angles, various viewing distances, and under various lighting conditions. The images include robots placed on various types of flooring materials and patterns, and various types of carpet materials and patterns. The images include robots placed near various objects, such as chairs, tables, cabinets, refrigerators, or stairs. The training images cover a wide variety of situations in which a robot may be found in a typical home.

The final layer predicts both class probabilities and bounding box coordinates. The bounding box width and height are normalized by the image width and height so that they fall between 0 and 1. The bounding box x and y coordinates are parameterized to be offsets of a particular grid cell location so they are also bounded between 0 and 1. A linear activation function is used for the final layer and the other layers use a leaky rectified linear activation. The output of the model is optimized for sum-squared error in the output. The loss from bounding box coordinate predictions is increased, and the loss from confidence predictions for boxes that don't contain objects is decreased. Sum-squared error equally weights errors in large boxes and small boxes. The error metric reflects that small deviations in large boxes matter less than in small boxes. The square root of the bounding box width and height is predicted. The neural network predicts multiple bounding boxes per grid cell. At training time, one bounding box predictor is responsible for each object. One predictor is assigned to be "responsible" for predicting an object based on which prediction has the highest current intersection over union (IOU) with the ground truth. This leads to specialization between the bounding box predictors. Each predictor gets better at predicting certain sizes, aspect ratios, or classes of object, improving overall recall. The loss function penalizes classification error if an object is present in the grid cell. It also penalizes bounding box coordinate error if the predictor is "responsible" for the ground truth box (i.e., has the highest IOU of any predictor in the grid cell).

The architecture of the image detection module 1200 described above is just an example, the image detection module can be modified in several ways. For example, the number of convolutional layers can be changed.

Figure 14:
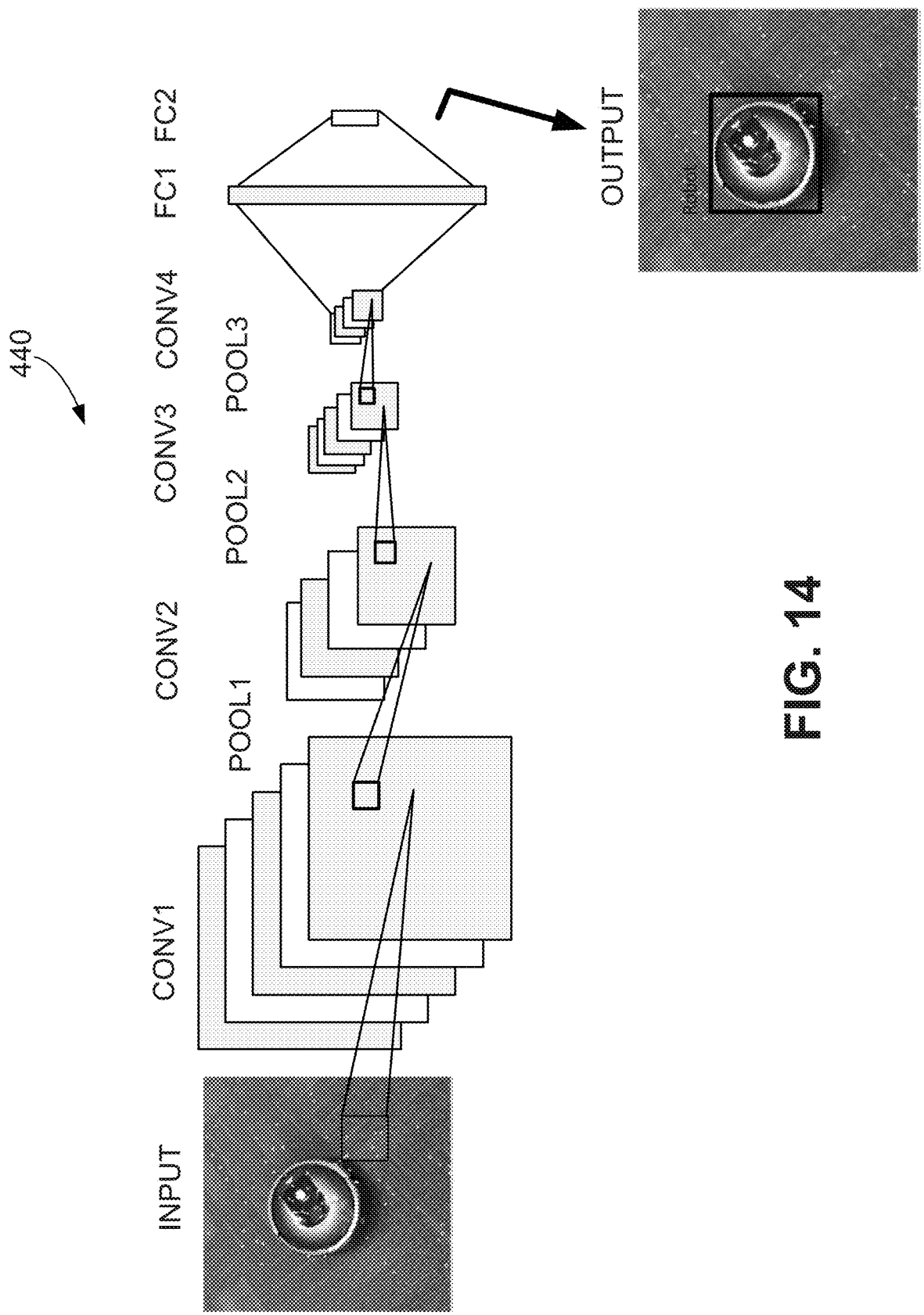

FIG. 14 shows an example architecture of a convolutional neural network 440 that can be used in the first detection network 133. In this example, the neural network includes four convolutional layers, three average-pooling layers, and two fully connected layers.

Figure 15:
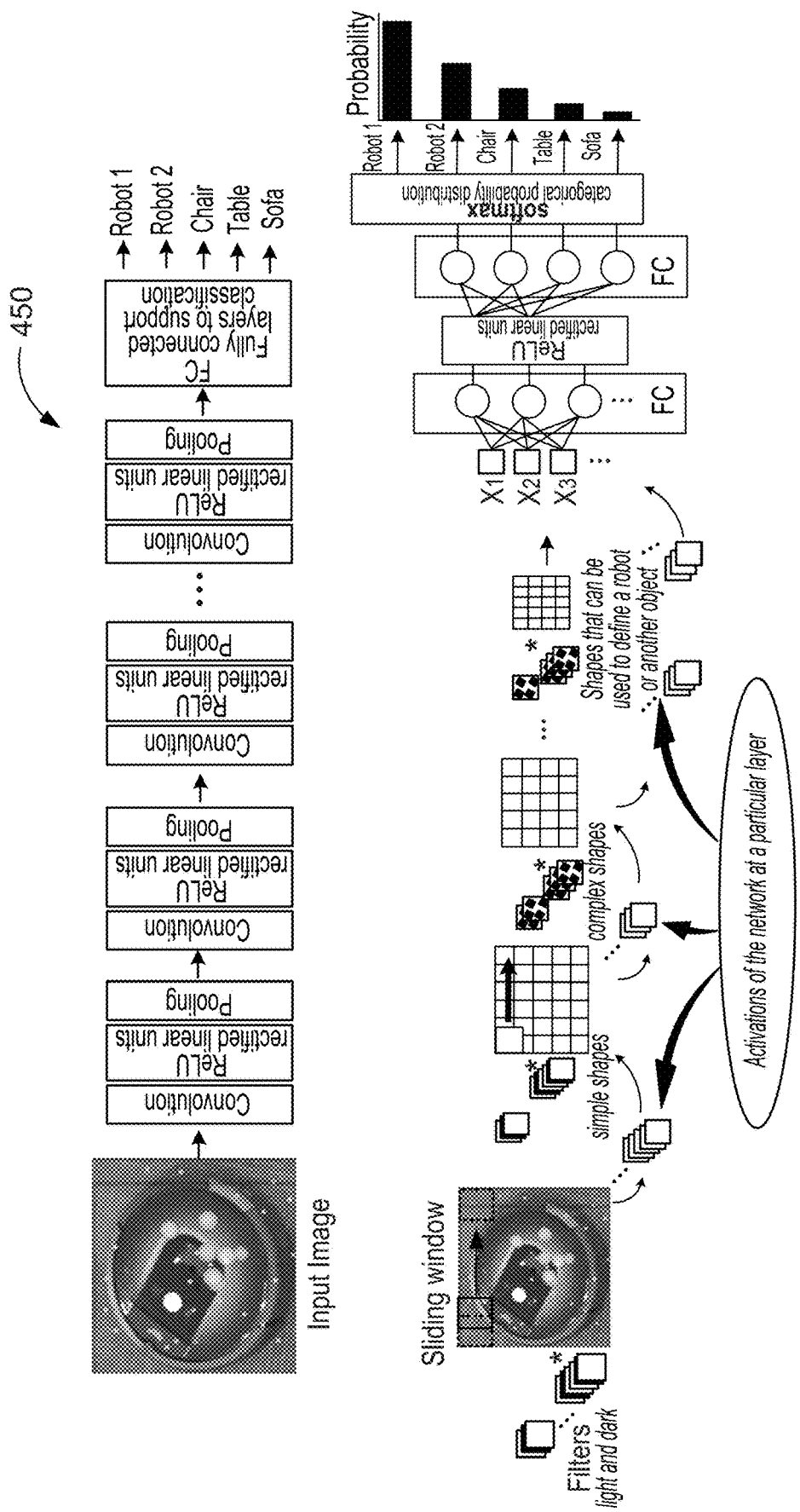

FIG. 15 shows another example architecture of a convolutional neural network 450 that can be used in the first detection network 133. In this example, every feature map output is the result of applying a filter to the image, and the new feature map becomes the next input. The neural network includes several convolutional layers, average-pooling layers, and fully connected layers.

The following describes operations of the second image detection module 135. The second image detection module 135 processes images of the robot 102 captured by the camera 120 to generate top-view images of the robot 102, and sends the top-view images of the robot 102 as input to the second convolutional neural network 136. Referring to FIGS. 16A to 16D, images 460, 462, 464, and 466 include views of a mobile cleaning robot 102, in which the images are captured from different viewing angles.

Referring to FIG. 16A, the second image detection module 135 analyzes the image 460, identifies the robot 102, and generates a top-view image 468 of the robot as shown in the inset. Referring to FIG. 16B, the second image detection module 135 analyzes the image 462, identifies the robot 102, and generates a top-view image 470 of the robot as shown in the inset. Referring to FIG. 16C, the second image detection module 135 analyzes the image 464, identifies the robot 102, and generates a top-view image 472 of the robot as shown in the inset. Referring to FIG. 16D, the second image detection module 135 analyzes the image 466, identifies the robot 102, and generates a top-view image 474 of the robot as shown in the inset. In the top-view images 468, 470, 472, and 474, the robot is oriented relative to a reference direction. Thus, even though the views of the robot in the images 460, 462, 464, and 464 are shown from different viewing angles, the top-views of the robot 102 in the top-view images 468, 470, 472, and 474 have the same orientation angle. By using the top-view image of the robot 102 as input to the second neural network 136, variations in the image of the robot 102 caused by the different view angles are removed, this makes it easier for the second neural network 136 to identify the orientation angle of the robot 102.

The second detection module 135 can use any of a variety of image detection systems that are capable of recognizing objects, such as recognizing mobile cleaning robots. The second neural network 136 can use any of a variety of neural network architectures, in particular deep neural networks having several hidden layers between input and output layers. The detection module 135 does not necessarily have to use a neural network. Other technologies that provide image recognition capabilities can also be used. The second neural network 136 can be, e.g., a convolutional neural network.

Figure 17:
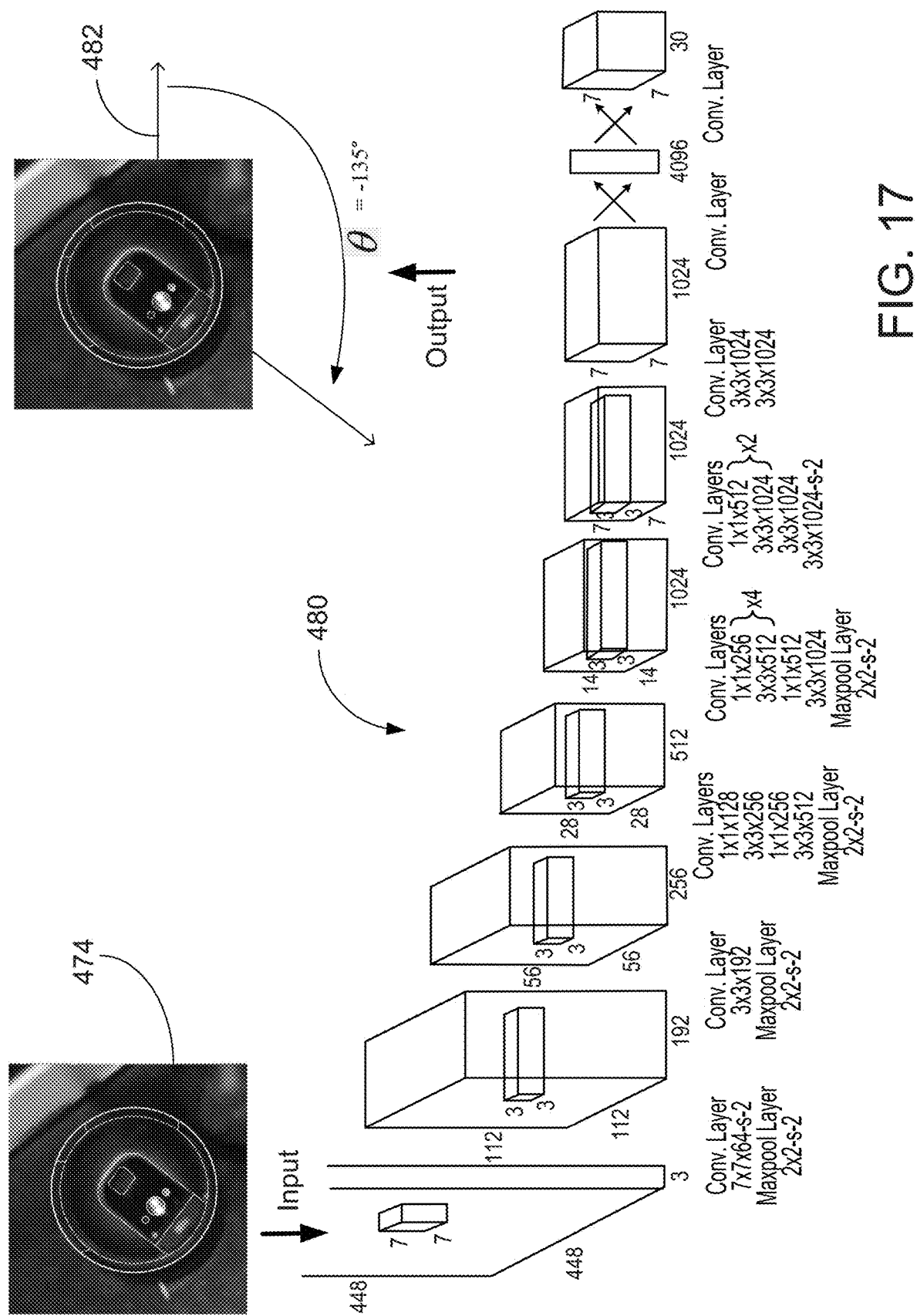
FIGS. 17 to 19 are diagrams of example neural networks for detecting the angle of orientation of a mobile robot.

Referring to FIG. 17, a convolutional neural network 480 that is based on the YOLO detection system described above can be used for the second neural network 136 in the second image detection module 135. The neural network 480 is merely an example and does not limit the scope of the invention. A top-view image 474 is provided as input to the neural network 480, which provides as output the angle of orientation $\theta$ of the robot 102 relative to a reference direction 482. In the example shown in FIG. 17, $\theta=-135°$. The neural network 480 is trained to identify various classes of robots, in which the different classes correspond to robots having different orientation angles. For example, a robot having an orientation angle of 1° relative to the reference angle belongs to a first class, a robot having an orientation angle of 2° relative to the reference angle belongs to a second class, a robot having an orientation angle of 3° relative to the reference angle belongs to a third class, etc. This allows the neural network to determine the orientation angle of the robot with a resolution of 1°. The neural network 480 can be trained to recognize fewer classes with a coarser resolution, or trained to recognize a larger number of classes to provide a higher resolution.

Figure 18:
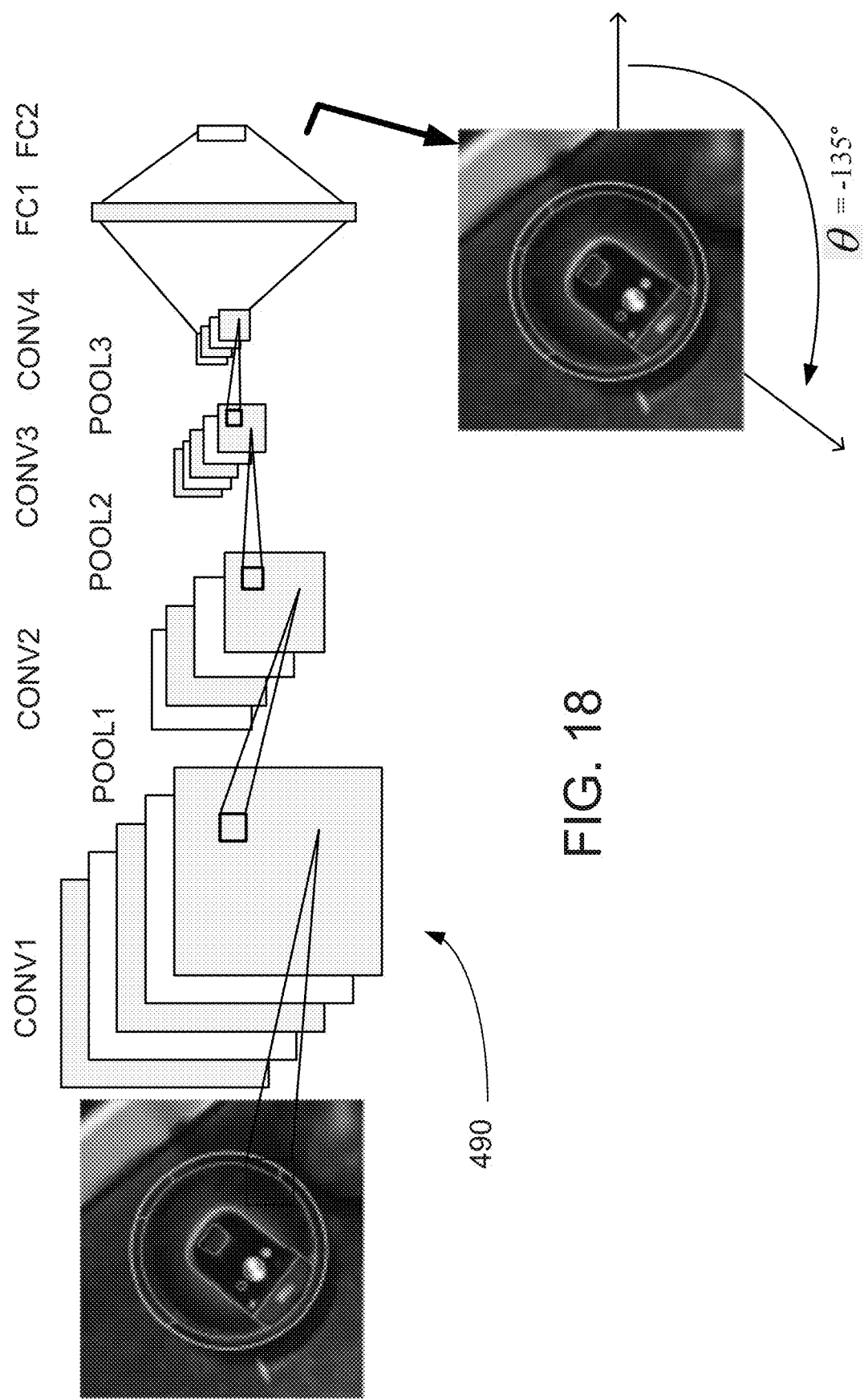
Figure 19:
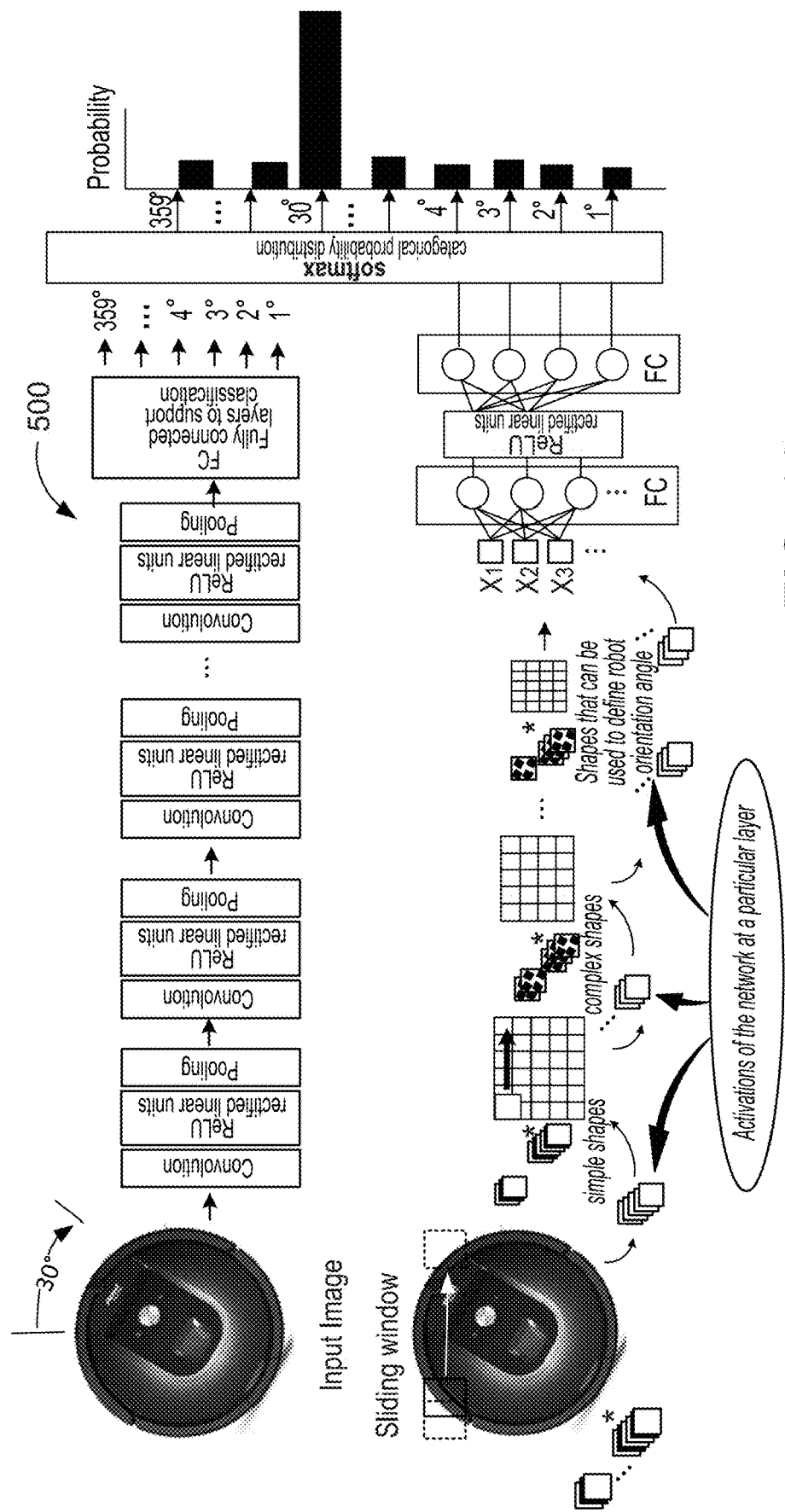

The various detection modules that can be used for the first detection module 133 can also be used for the second detection module 135. FIG. 18 shows an example architecture of a convolutional neural network 490 that can be used in the second detection network 135. The structure of the neural network 490 is similar to that of the neural network 440 in FIG. 14. FIG. 19 shows another example architecture of a convolutional neural network 500 that can be used in the second detection network 135. The structure of the neural network 500 is similar to that of the neural network 450 in FIG. 15.

As discussed above, the second neural network 136 can be based on any of a variety of neural network architectures. In a non-limiting example, the second neural network 136 can be based on a class of efficient models called MobileNets, described in "MobileNets: Efficient Convolutional Neural Networks for Mobile Vision Applications," by Andrew G. Howard, Menglong Zhu, Bo Chen, Dmitry Kalenichenko, Weijun Wang, Tobias Weyand, Marco Andreetto, and Hartwig Adam, available at the web address "https://arxiv.org/abs/1704.04861". In some implementations, the second neural network 136 is a regression neural network based on MobileNets with the top layers replaced with regression layers.

The following describes a MobileNets neural network 480 in more detail. It is understood that the discussion about the MobileNets is merely for purpose of illustration, and does not limit the scope of the claims. The neural network 480 can be based on a streamlined architecture that uses depthwise separable convolutions to build light weight deep neural networks. The depthwise separable convolutions is a form of factorized convolutions that factorize a standard convolution into a depthwise convolution and a 1×1 convolution called a pointwise convolution. The depthwise convolution applies a single filter to each input channel. The pointwise convolution then applies a 1×1 convolution to combine the outputs of the depthwise convolution. A standard convolution both filters and combines inputs into a new set of outputs in one step. The depthwise separable convolution splits this into two layers, a separate layer for filtering and a separate layer for combining. This factorization has the effect of reducing computation and model size. The standard convolution operation has the effect of filtering features based on the convolutional kernels and combining features in order to produce a new representation. The filtering and combination steps can be split into two steps via the use of factorized convolutions, or depthwise separable convolutions, for substantial reduction in computational cost. Thus, depthwise separable convolution are made up of two layers: depthwise convolutions and pointwise convolutions, and the combination of depthwise convolution and 1×1 (pointwise) convolution is referred to as depthwise separable convolution. The depthwise convolutions apply a single filter per input channel (input depth). Pointwise convolution, a simple 1×1 convolution, is then used to generate a linear combination of the output of the depthwise layer. The neural network 480 uses both batchnorm and ReLU nonlinearities for both layers. An additional layer that computes a linear combination of the output of depthwise convolution via 1×1 convolution is used in order to generate new features.

In this example, the neural network 480 is built on depthwise separable convolutions as mentioned above except for the first layer, which is a full convolution. Each layer is followed by a batchnorm and ReLU nonlinearity with the exception of the final fully connected layer, which has no nonlinearity and feeds into a softmax layer for classification. Down sampling is handled with strided convolution in the depthwise convolutions as well as in the first layer. A final average pooling reduces the spatial resolution to 1 before the fully connected layer. In some implementations, counting depthwise and pointwise convolutions as separate layers, the second neural network 136 has 28 layers, but it can also have other number of layers depending on application.

Figure 20:
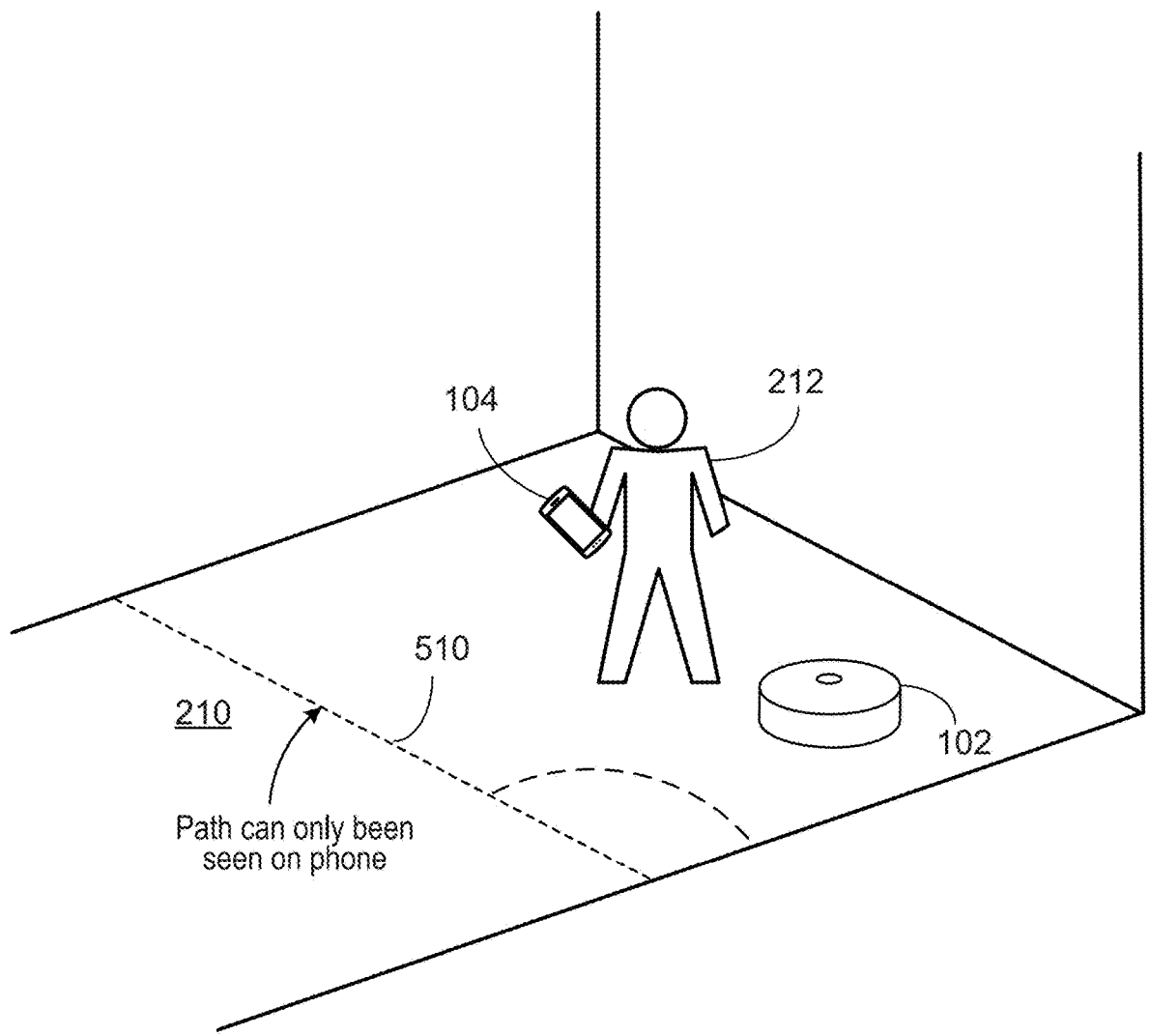
FIG. 20 is a diagram showing an example virtual path in a room.

In some implementations, the spot cleaning program 132 can show a map of the home 210 on the touch screen display 138 of the mobile computing device 104. The map of the home 210 can be derived from the persistent map maintained by the robot 102. Referring to FIG. 20, a path 510 that was traveled by the robot 102 can be overlaid on the map of the home 210, so that the user 212 can confirm that the robot 102 has cleaned the spots that need to be cleaned. As another example, the user 212 can draw a virtual path on the map shown in the user interface and instruct the mobile cleaning robot 102 to follow the virtual path to reach the dirt spot.

For example, if the robot 102 indicates that a condition prevented the robot 102 from cleaning the dirt spots, the condition can be overlaid on the map. For example, if the robot 102 cannot enter the room 214D (see FIG. 4) to clean the dirt spot P3 because a door leading to the room 214D is closed, an icon of a closed door can be shown on the map. If the path of the robot 102 is blocked by a thick carpet, an icon of a thick carpet can be shown on the map. If the path of the robot 102 is blocked by one or more unknown objects, the robot 102 can take an image of the one or more unknown objects, and the image of the one or more unknown objects can be shown on the map. The user 212 can remove the condition, such as open the closed door, or remove the objects blocking the robot's path. For example, the user 212 may look at the map, see where the obstacles are, and determine there is an alternative path for the robot 102 to reach the dirt spot. The user 212 can draw the alternative path on the touch screen, and the spot cleaning program 132 can send an instruction to the robot 102 to travel along the alternative path provided by the user 212.

Figure 21:
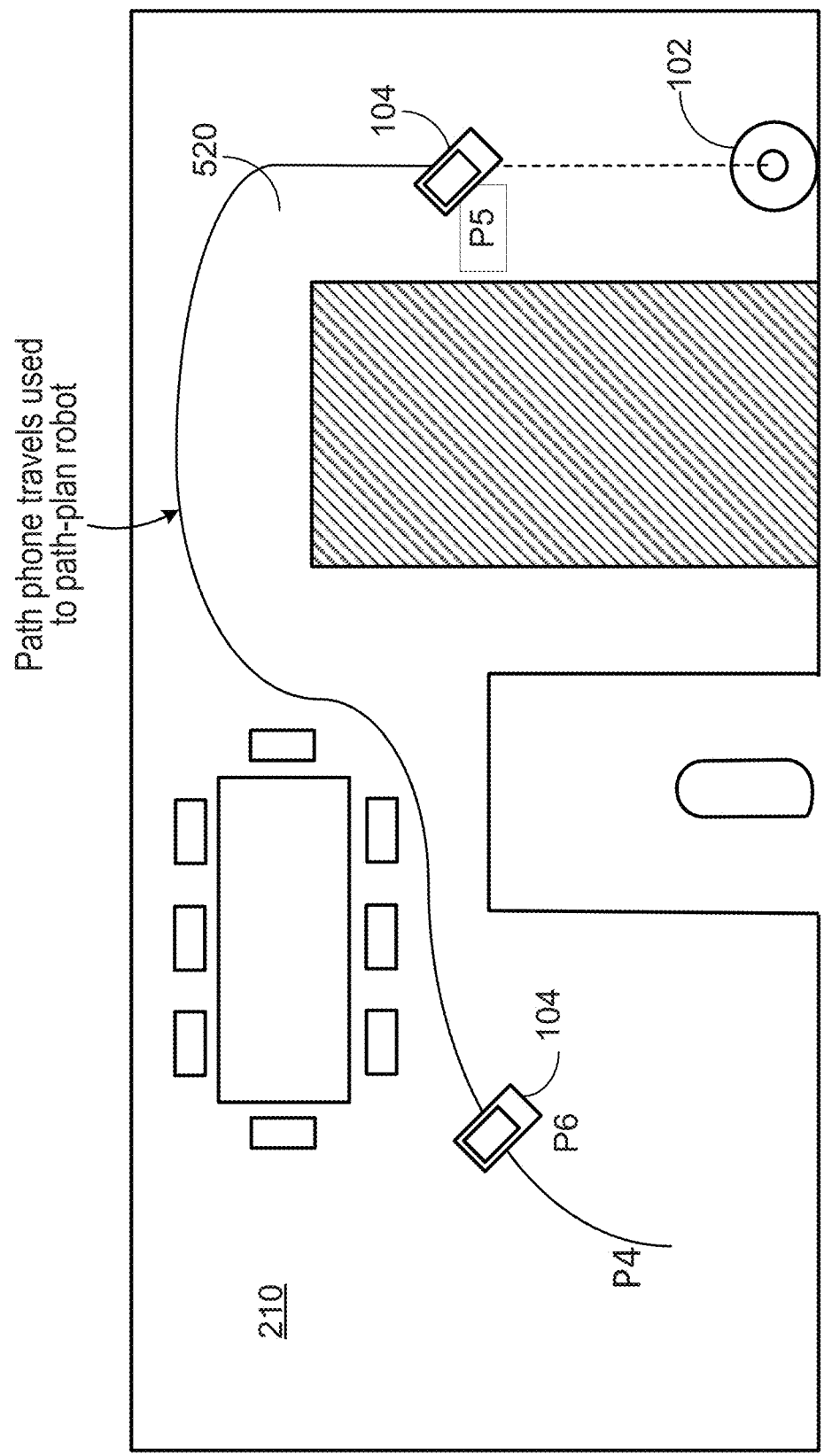
FIG. 21 is a diagram showing an example of a mobile robot following a path of a user from an initial location to a target location.

Referring to FIG. 21, in some implementations, the user 212 can guide the robot 102 and show the path that the robot 102 can take to reach a dirt spot at a location P4. For example, the user 212 holds the mobile computing device 104 at a location P5 and invokes the spot cleaning program 132 to determine the coordinates and the orientation angle of the robot 102 using the process 350 shown in FIG. 8A. The spot cleaning program 132 provides a user-selectable option (e.g., a "Follow Me" button) on the user interface. After the user 212 selects the option, the spot cleaning program 132 sends a request to the robot 102 requesting the robot 102 to follow the mobile computing device 104. As the user 212 walks along a path 520 from the location P5 towards the dirt spot, the spot cleaning program 132 invokes the augmented reality toolkit 126 to determine the coordinates of the mobile computing device 104 using visual-inertial odometry, and generates coordinates of a path on the floor that can be traveled by the robot 102. The spot cleaning program 132 sends the path to the robot 102, which travels to the dirt spot using the path information provided by the spot cleaning program 132.

In some implementations, the robot 102 has object recognition capabilities and can follow the user 212 using images captured by the camera 108 of the robot 102. The robot 102 can analyze the images and identify an individual in the images, and determine the direction in which the individual is moving. In this example, the spot cleaning program 132 sends an instruction to request the robot 102 to follow the user 212, and the robot 102 follows the user 212 as the user 212 walks from the location P5 to a location P6 that is near the location P4 of the dirt spot.

Figure 22A:
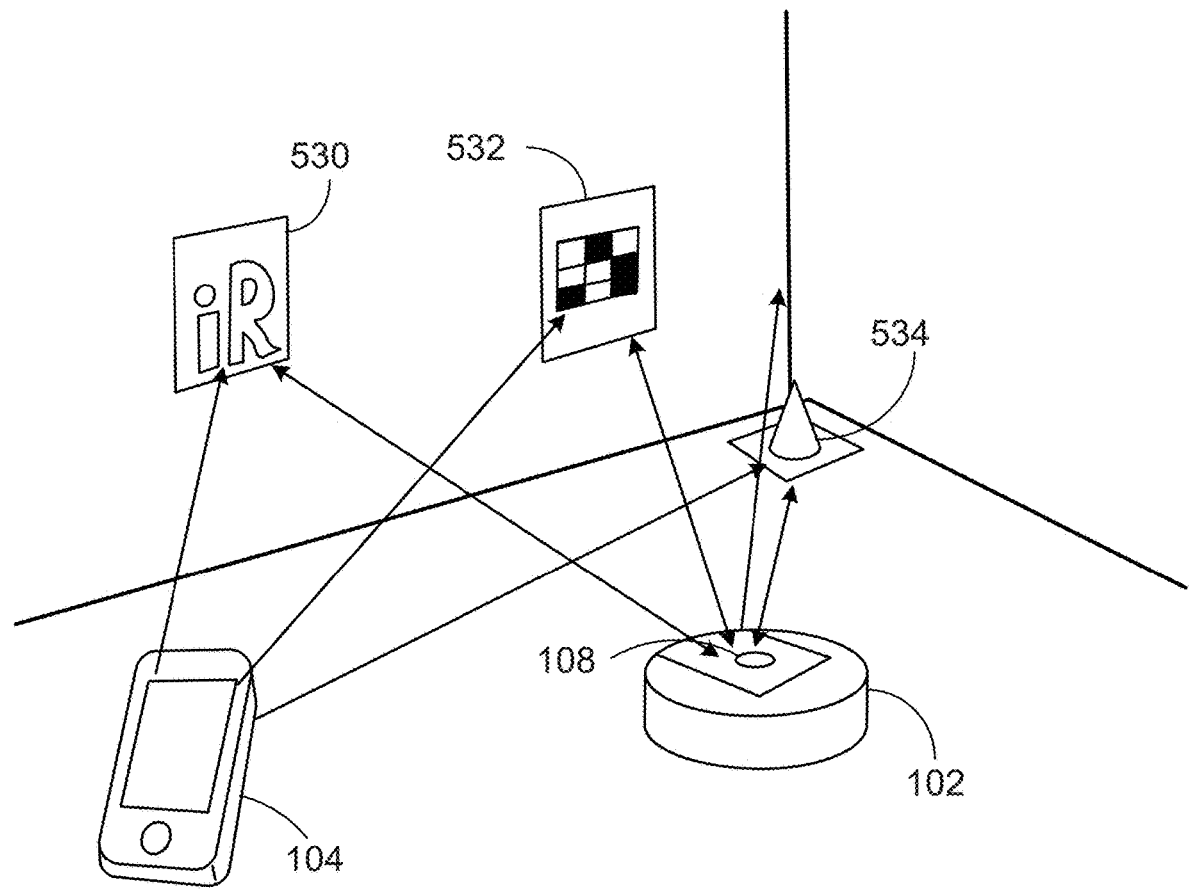
FIG. 22A is a diagram showing examples of markers that can assist a mobile robot in determining positions.

In some implementations, the robot 102 can use the camera 108 to capture images of its surroundings in the home 210 and recognize objects in order to help the robot 102 determine the location of the dirt spots, or the location of the robot 102 on the map. Referring to FIG. 22A, as the robot 102 moves around the home 210 and performs the cleaning tasks, the robot 102 updates the map to include various markers that it sees through the camera 108. For example, the markers may include one or more of a pattern 530, a QR code 532, and a beacon 534. The robot 102 recognizes the markers and places them on the map.

When the user 212 decides that spot cleaning is needed in a first room, the user 212 can use the camera 120 of the mobile computing device 104 to take images of the markers (e.g., 530, 532, 534) in the first room. The spot cleaning program 132 calls the augmented reality toolkit 126 to determine the coordinates of the markers in the virtual space. If the user 212 initiates a new augmented reality session, the user 212 can use the process 350 (FIG. 8A) or 390 (FIG. 9A) to establish a virtual space coordinate system, determine the coordinates of the dirt spots, the coordinates of the robot 102, and the orientation angle of the robot 102 in the virtual space coordinate system. The spot cleaning program 132 sends to the robot 102 the coordinates of the dirt spot, the markers, and the current position of the robot 102, and the orientation angle of the robot 102. The robot 102 travels toward the dirt spot based on information about the location of the dirt spot relative to the position of the robot 102. The robot 102 also uses information about the coordinates of the markers in the first room to enhance the accuracy of navigation to ensure that the robot 102 correctly arrives at the dirt spot in the first room specified by the user 212.

Suppose after the user 212 requests the robot 102 to go clean dirt spots in the first room, the user 212 goes to a second room and determines there are additional dirt spots that need to be cleaned. Since the coordinates of the robot 102 in the virtual space coordinate system have already been established, there is no need to perform steps 356 and 358 in the process 350, or steps 356 and 392 in the process 390 again. The user 212 uses the camera 120 to capture images of the additional dirt spots in the second room, and the spot cleaning program 132 calls the augmented reality toolkit 126 to determine the coordinates of the dirt spots in the second room. The user 212 uses the camera 120 to capture images of markers (e.g., special patterns 530, QR codes 532, or beacons 534) in the second room, the spot cleaning program 132 calls the augmented reality toolkit 126 to determine the coordinates of the markers in the second room. The spot cleaning program 132 sends the coordinates of the dirt spots and the coordinates of the markers in the second room to the robot 102. The spot cleaning program 132 sends an instruction to the robot 102 to request the robot 102 to go clean the dirt spots in the second room. The robot 102, after cleaning up the dirt spots in the first room, travels toward the dirt spots in the second room based on the coordinates of the dirt spots in the second room. The robot 102 also uses information about the coordinates of the markers in the second room to enhance the accuracy of navigation to ensure that the robot 102 correctly arrives at the dirt spots in the second room specified by the user 212.

The robot 102 establishes and updates an internal map (referred to as the robot map) using an internal coordinate system (referred to as the robot coordinate system). In the process 350 shown in FIG. 8A, the spot cleaning program 132 determines the coordinates of the robot 102 in the virtual space coordinate system, and the orientation angle of the robot 102 relative to a reference direction in the virtual space. This allows the robot 102 to convert coordinates in the virtual space coordinate system to coordinates in the robot coordinate system.

In some implementations, the robot 102 can navigate to the dirt spots without knowing the robot's coordinates in the virtual space coordinate system. As discussed above, when the robot 102 moves around the home 210 and performs the cleaning tasks, the robot 102 updates the map to include various markers that it sees through the camera 108. The robot 102 knows the coordinates of the markers in the robot coordinate system. By using information about the markers, the robot 102 can perform coordinate transformation or triangulation to determine the positions of the dirt spots. If two or more markers are on the floor and on the same plane as the dirt spots, the robot 102 can perform a 2D coordinate transformation or a 2D triangulation. If only one marker is on the floor and the other markers are on the wall or ceiling, or if all the markers are on the wall or ceiling, then three or more markers (that are not on the same plane) are needed for the robot 102 to perform a 3D coordinate transformation or a 3D triangulation.

If the robot 102 knows the 2D coordinates of two or more markers on the floor in the 2D virtual space coordinate system, and the coordinates of the markers in the 2D robot coordinate system, the robot 102 can determine a transformation between the 2D virtual space coordinate system and the 2D robot coordinate system. If the robot 102 knows the coordinates of three or more markers in the 3D virtual space coordinate system, and the coordinates of the markers in the 3D robot coordinate system, the robot 102 can determine a transformation between the 3D virtual space coordinate system and the 3D robot coordinate system. Given the coordinates of dirt spots in the virtual space coordinate system, the robot 102 can determine the coordinates of the dirt spots in the robot coordinate system.

If the robot 102 knows the distances of a dirt spot to two or more markers on the floor, the robot 102 can determine the location of the dirt spot relative to the two or more markers using 2D triangulation. If the robot 102 knows the distances of a dirt spot to three or more markers in a 3D space (in which at least three markers are not on the same plane), the robot 102 can determine the location of the dirt spot relative to the three or more markers using 3D triangulation.

Suppose the user 212 enters a third room and starts a new augmented reality session. The coordinates of the robot 102 in the virtual space coordinate system has not been established. Suppose there are two or more markers on the floor (which corresponds to a 2D space), or three or more markers in a 3D space (in which at least three markers are not on the same plane), and the robot 102 knows the positions of the markers in the robot coordinate system. The user 212 uses the camera 120 to capture images of the markers, and the spot cleaning program 132 calls the augmented reality toolkit 126 to determine the coordinates of the markers in the virtual space coordinate system. The user 212 uses the camera 120 to capture images of the dirt spots in the third room, and the spot cleaning program 132 calls the augmented reality toolkit 126 to determine the coordinates of the dirt spots in the virtual space coordinate system. The spot cleaning program 132 sends the virtual space coordinates of the markers and the dirt spots to the robot 102. The spot cleaning program 132 sends an instruction to the robot 102 to request the robot 102 to go clean the dirt spots in the third room.

Assuming that the robot 102 knows the coordinates of the markers in the third room in the robot coordinate system. Using the information of the coordinates of the markers in the virtual space coordinate system (provided by the spot cleaning program 132), and the coordinates of the markers in the robot coordinate system, the robot 102 can determine a transformation between the coordinates in the virtual space coordinate system and the coordinates in the robot coordinate system. Using the information about the coordinates of the dirt spots in the virtual space coordinate system (provided by the spot cleaning program 132) and information about the transformation between the virtual space coordinate system and the robot coordinate system, the robot 102 determines the coordinates of the dirt spots in the robot space coordinate system, and navigates towards the dirt spots in the third room using the robot map.

Alternatively, using the information of the coordinates of the markers and the dirt spots in the virtual space coordinate system (provided by the spot cleaning program 132), the robot 102 determines the distance from each dirt spot to each marker. Using the information about the coordinates of the markers in the robot coordinate system and the information about the distance from each of the dirt spots to each of the markers, the robot 102 determines the coordinates of the dirt spots in the robot space coordinate system by triangulation, and navigates towards the dirt spots in the third room using the robot map.

Figure 22B:
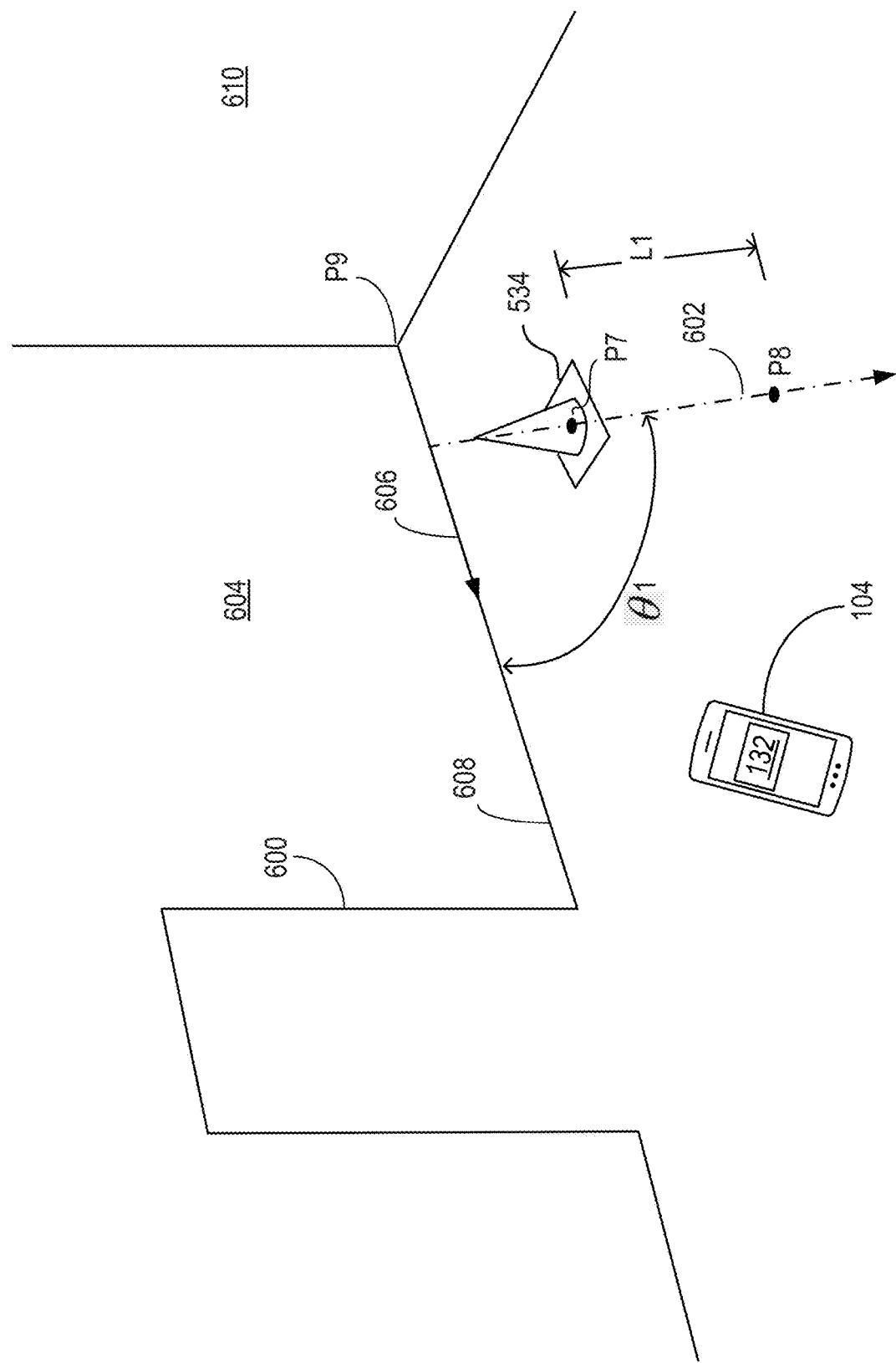
FIGS. 22B and 22C are diagrams showing examples of using markers to assist a mobile robot in determining positions of a target spot.

Referring to FIG. 22B, in some implementations, the spot cleaning program 132 can determine the position of a dirt spot relative to a marker 534 and provide that information to the robot 102, in which a portion of the environment (such as an intersection between a wall and the floor) is used as a reference. Suppose the marker 534 is in a vicinity of a wall 604, the marker 534 is at a location P7, and the dirt spot is at a location P8. The spot cleaning program 132 executing on the mobile computing device 104 calls the augmented reality toolkit 126 to determine the coordinates of the dirt spot (at P8) and the marker 534 (at P7) in the virtual space coordinate system. The spot cleaning program 132 determines the distance L1 between the dirt spot and the marker 534. The spot cleaning program 132 calls the augmented reality toolkit 126 to determine the angle θ1 between a first direction 602 and a second direction 606. The first direction 602 is in a direction from the location P7 to the location P8. The second direction 606 is from a location P9 toward a door 600 along an intersection 608 between the wall 604 and the floor, and the location P9 is at the intersection of the wall 604, another wall 610, and the floor. The spot cleaning program 132 sends to the robot 102 information about L1 and θ1, and information about the directions 602 and 606 from which θ1 is determined.

The robot 102 already has information about the coordinates of the marker 534 in the robot coordinate system. Given the distance L1 and the direction of the dirt spot relative to the marker (which can be determined by θ and the reference direction 606), the robot 102 determines the coordinates of the dirt spot in the robot coordinate system.

Figure 22C:
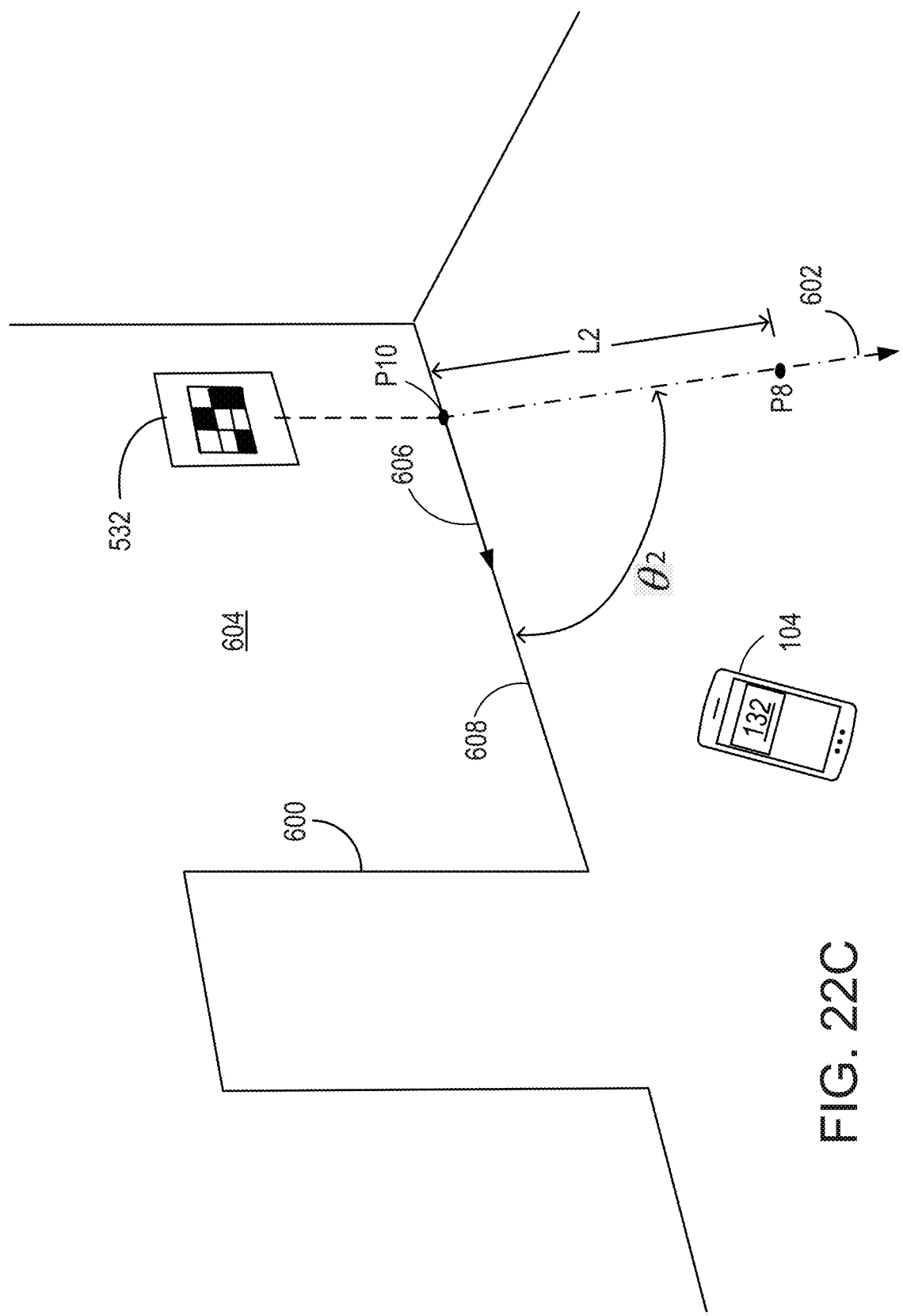

Referring to FIG. 22C, a marker 532 is on the wall 604, and the dirt spot is at the location P8. The spot cleaning program 132 executing on the mobile computing device 104 calls the augmented reality toolkit 126 to determine the coordinates of the dirt spot (at P8) and the marker 532 in the virtual space coordinate system. The spot cleaning program 132 determines a location P10 that is at the projection of the marker 532 on the floor, and determines the distance L2 between the dirt spot and the projection of the marker 532 on the floor. The spot cleaning program 132 calls the augmented reality toolkit 126 to determine the angle θ2 between a first direction 602 and a second direction 606. The first direction 602 is in a direction from the location P10 to the location P8. The second direction 606 is from the location P10 toward the door 600 along the intersection 608 between the wall 604 and the floor. The spot cleaning program 132 sends the robot 102 information about L2 and θ2, and information about the directions 602 and 606 from which θ2 is determined.

The robot 102 already has information about the coordinates of the marker 532 in the robot coordinate system. Given the distance L2 and the direction of the dirt spot relative to the projection of the marker onto the floor (which can be determined by θ and the reference direction 606), the robot 102 determines the coordinates of the dirt spot in the robot coordinate system.

Figure 23:
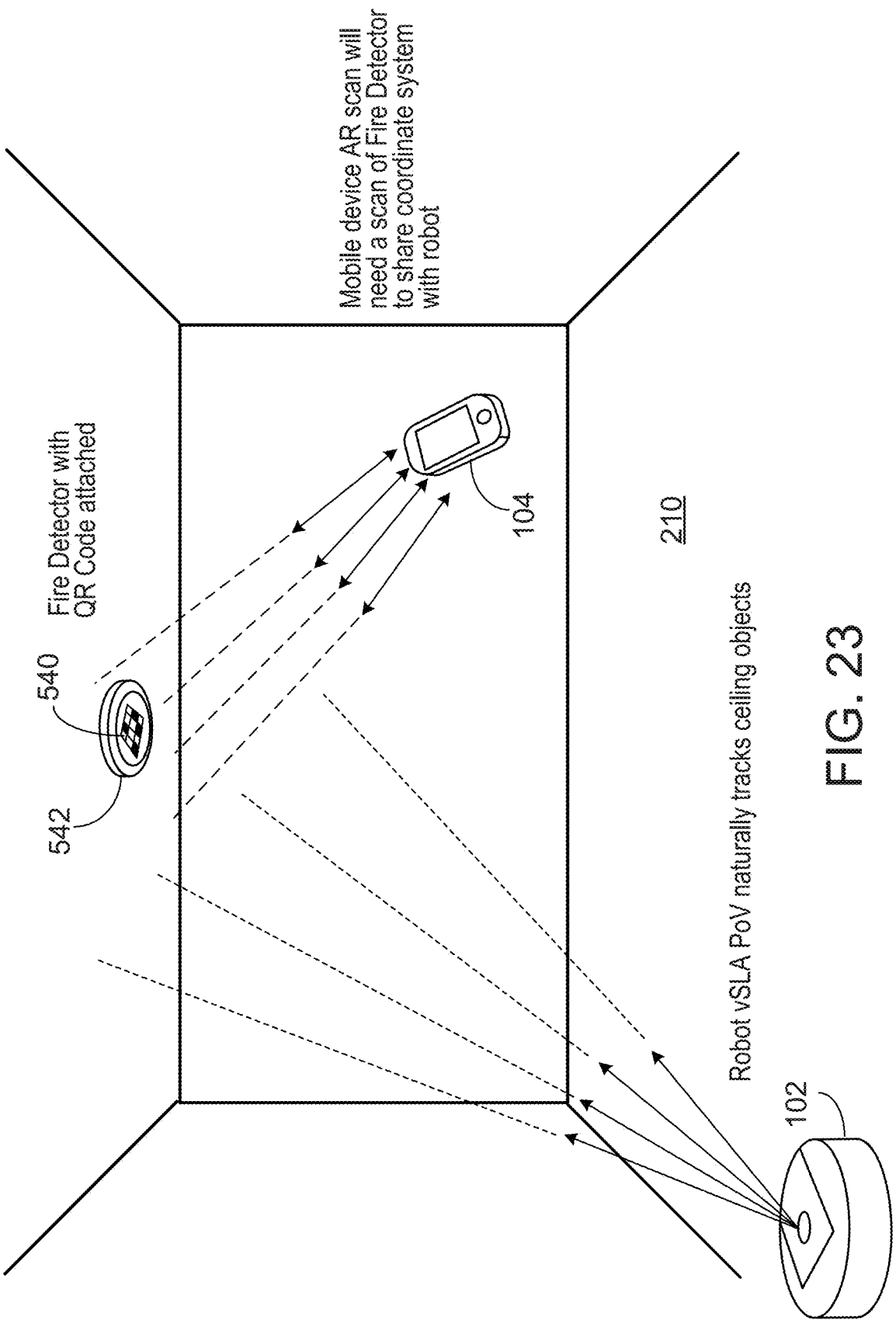
FIG. 23 is a diagram showing examples of objects in rooms that can assist a mobile robot in determine positions.

Referring to FIG. 23, in some implementations, a marker can be made small and placed at an inconspicuous location. For example, a QR code 540 can be placed on a fire detector 542 that is mounted on the ceiling. As another example, a QR code can be placed on the frame of a recessed ceiling light. Multiple QR codes can be placed at selected locations on the ceiling. By placing the QR code 540 and other markers on or near the ceiling, the markers will have little effect on the décor of the home 210 and be less distracting to the user 212. The robot 102 is provided with a high resolution camera or a zoom lens that enables the robot 102 to detect the markers on or near the ceiling. As the robot 102 moves in the home 210, the simultaneous localization and mapping (SLAM) sensors will track the locations of the objects on or near the ceiling, including the markers (e.g., the QR code 540).

When the spot cleaning program 132 calls the augmented reality toolkit 126 to determine coordinates of the robot 102 and the dirt spots, the spot cleaning program 132 prompts the user 212 to scan the markers, such as the QR code 540 on the ceiling. The spot cleaning program 132 determines the coordinates of the markers on the ceiling and uses that information to assist in sharing the virtual space coordinate system with the robot 102.

Figure 24:
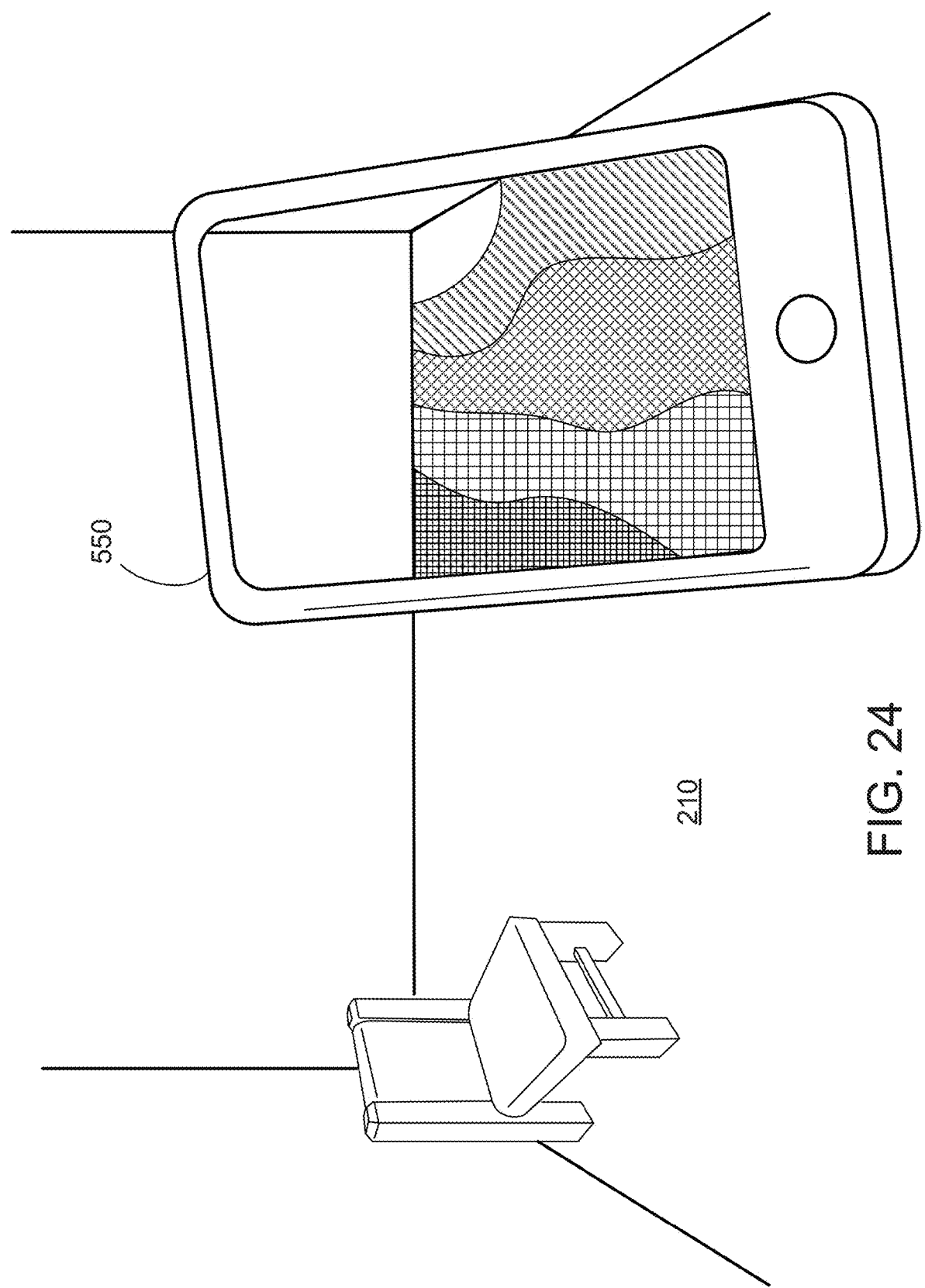
FIG. 24 is a diagram of an example Wi-Fi heat map overlaid on a floor map established by a mobile robot.

Referring to FIG. 24, in some implementations, the spot cleaning program 132 overlays additional information on the map that is shown to the user 212. For example, as the robot 102 moves about the home 210, the robot 102 determines the Wi-Fi signal strength at various locations in the home 210 and record that information. The robot 102 transmits the information about the Wi-Fi signal strength at various locations to the mobile computing device 104, and the spot cleaning program 132 uses that information to generate a Wi-Fi heat map 550. The Wi-Fi heat map 550 shows the regions in the home 210 that have stronger Wi-Fi signals, and the regions in the home 210 that have weaker Wi-Fi signals. The Wi-Fi heat map 550 can help the user 212 determine whether the Wi-Fi router is placed at the optimal location, and determine where to place electronic devices in the home 210 so that the devices can receive stronger Wi-Fi signals.

Figure 25:
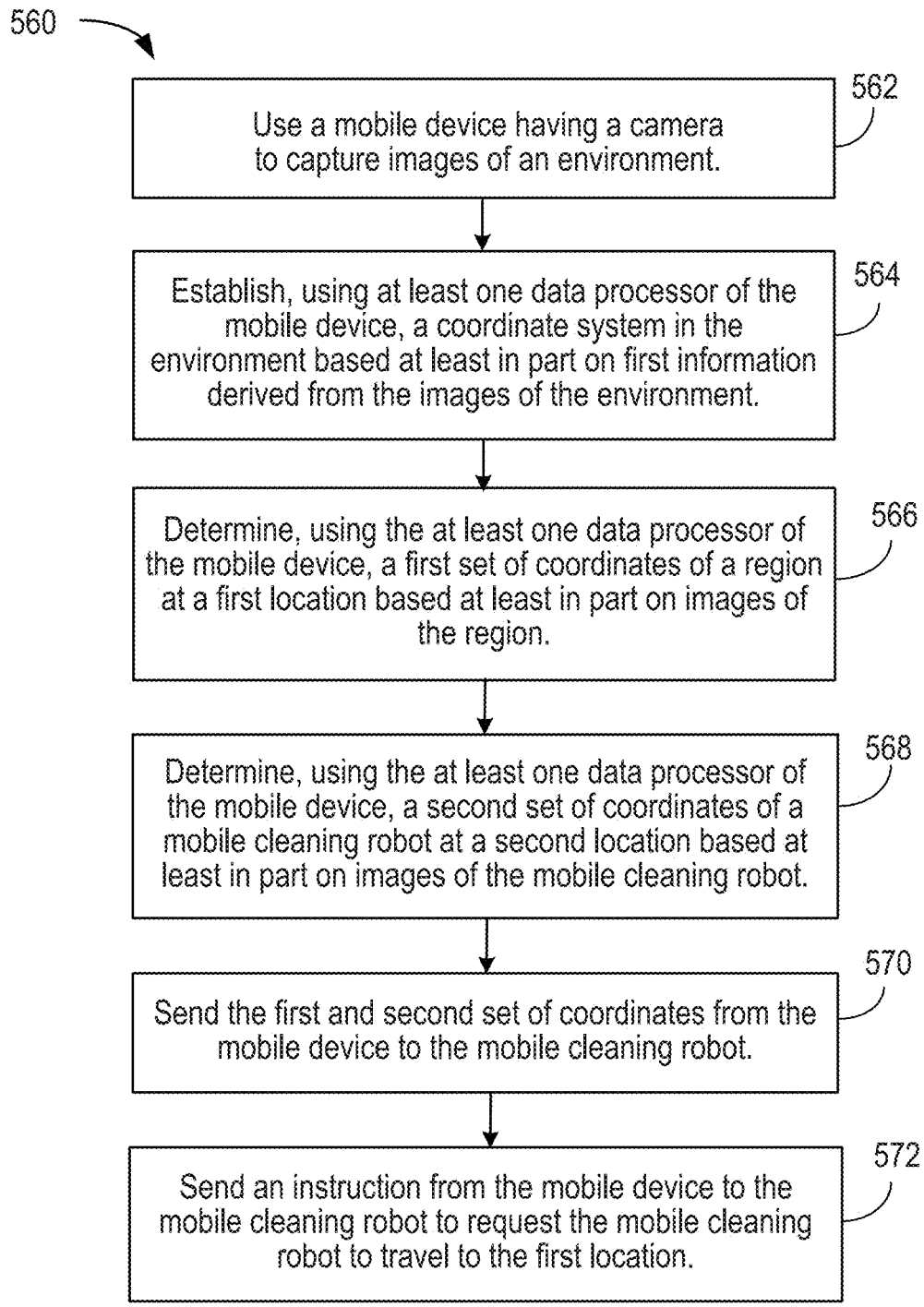
FIGS. 25 and 26 are flow diagrams of processes for enabling spot cleaning by a mobile robot.

Referring to FIG. 25, a process 560 for enabling spot cleaning by a mobile robot is provided. The process 560 includes using 562 a mobile computing device having a camera to capture images of an environment. For example, the mobile computing device can be the mobile computing device 104 of FIG. 1A, and the camera can be the camera 120. The environment can be the home 210.

The process 560 includes establishing 564, using at least one data processor of the mobile computing device, a coordinate system in the environment based at least in part on first information derived from the images of the environment. For example, the data processor 118 can execute instructions associated with the augmented reality toolkit 126 to identify features of the environment, and determine a coordinate system based on position information about the features.

The process 560 includes determining 566, using the at least one data processor of the mobile computing device, a first set of coordinates of a region at a first location based at least in part on images of the region. For example, the region at the first location can be the dirt spot or region that needs to be cleaned. The data processor 118 can execute instructions associated with the augmented reality toolkit 126 to process images of the dirt spot and determine the coordinates of the dirt spot.

The process 560 includes determining 568, using the at least one data processor of the mobile computing device, a second set of coordinates of a mobile cleaning robot at a second location based at least in part on images of the mobile cleaning robot. For example, the data processor 118 can execute instructions associated with the augmented reality toolkit 126 to process images of the robot 102 and determine the coordinates of the robot 102.

The process 560 includes sending 570 the first set of coordinates and the second set of coordinates from the mobile computing device to the mobile cleaning robot. For example, the mobile computing device 104 can send to the robot 102 the coordinates of the dirt spot and the current coordinates of the robot 102. Alternatively, the mobile computing device can send the relative coordinates between the first location and the second location to the robot 102.

The process 560 includes sending 572 an instruction from the mobile computing device to the mobile cleaning robot to request the mobile cleaning robot to travel to the first location. For example, the mobile computing device 104 can send an instruction to the robot 102 to request the robot 102 to travel from its current location to the location of the dirt spot.

Figure 26:
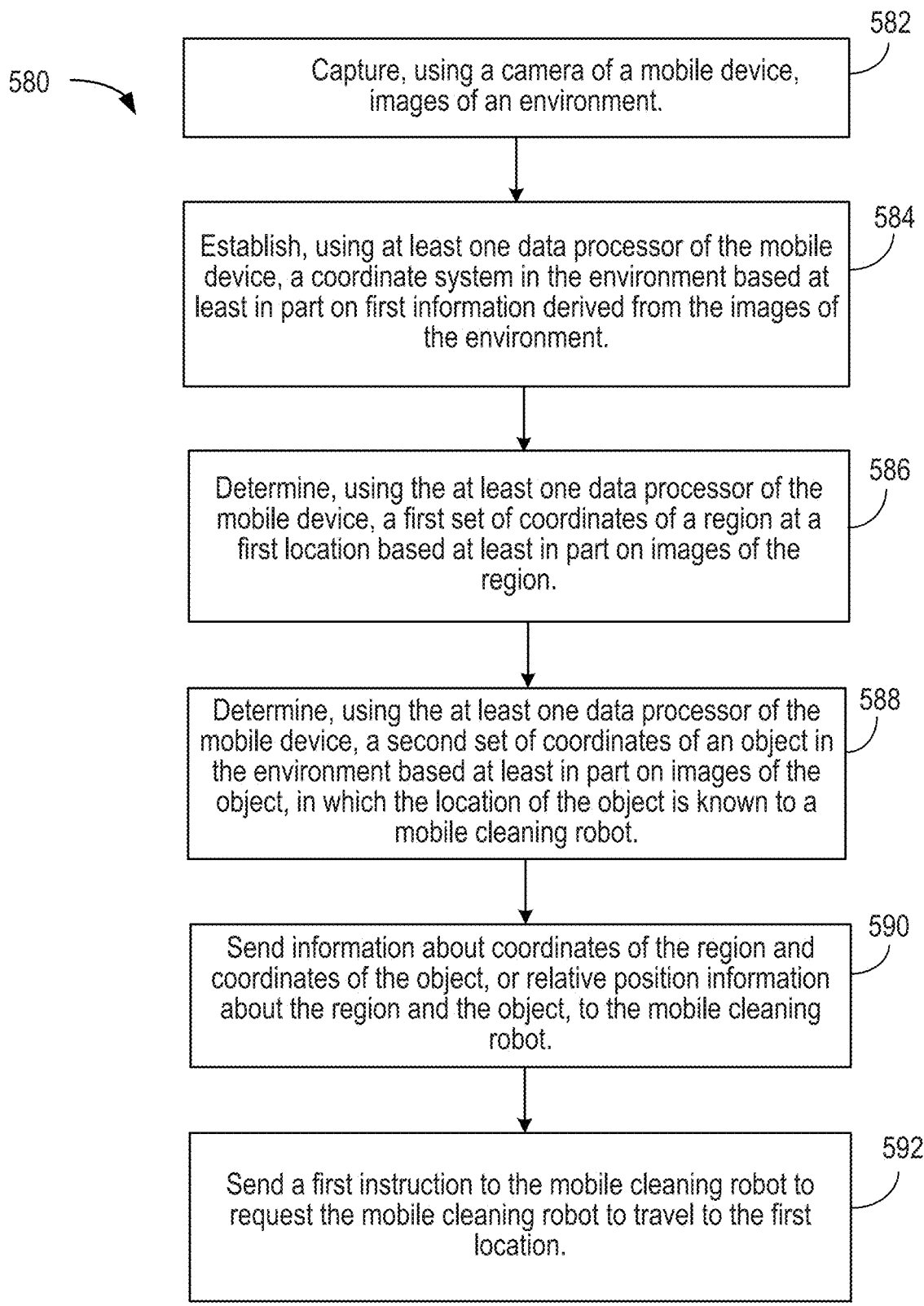

Referring to FIG. 26, a process 580 for enabling spot cleaning by a mobile robot is provided. The process 580 includes capturing 582, using a camera of a mobile computing device, images of an environment. For example, the mobile computing device can be the mobile computing device 104 of FIG. 1A, and the camera can be the camera 120. The environment can be the home 210.

The process 580 includes establishing 584, using at least one data processor of the mobile computing device, a coordinate system in the environment based at least in part on first information derived from the images of the environment. For example, the data processor 118 can execute instructions associated with the augmented reality toolkit 126 to identify features of the environment, and determine a coordinate system based on position information about the features.

The process 580 includes determining 586, using the at least one data processor of the mobile computing device, a first set of coordinates of a region at a first location based at least in part on images of the region. For example, the region at the first location can be the dirt spot or region that needs to be cleaned. The data processor 118 can execute instructions associated with the augmented reality toolkit 126 to process images of the dirt spot and determine the coordinates of the dirt spot.

The process 580 includes determining 588, using the at least one data processor of the mobile computing device, a second set of coordinates of an object in the environment based at least in part on images of the object, in which the location of the object is known to a mobile cleaning robot. For example, the object can be the pattern 530, the QR code 532, or the beacon 534 (FIG. 22A).

The process 580 includes sending 590 coordinates of the region and coordinates of the object, or relative position information about the region and the object, to the mobile cleaning robot. For example, the mobile computing device 104 can send the robot 102 the coordinates of the dirt spot and the coordinates of the pattern 530, the QR code 532, or the beacon 534.

The process 580 includes sending 592 a first instruction to the mobile cleaning robot to request the mobile cleaning robot to travel to the first location.

The autonomous mobile robots described in this document can be controlled, at least in part, using one or more computer program products, e.g., one or more computer programs tangibly embodied in one or more information carriers, such as one or more non-transitory machine-readable media, for execution by, or to control the operation of, one or more data processing apparatus, e.g., a programmable processor, a computer, multiple computers, and/or programmable logic components.

Operations associated with controlling the autonomous mobile robots described in this document can be performed by one or more programmable processors executing one or more computer programs to perform the functions described in this document. A computer program can be written in any form of programming language, including compiled or interpreted languages, and it can be deployed in any form, including as a stand-alone program or as a module, component, subroutine, or other unit suitable for use in a computing environment. Control over all or part of the robots described in this document can be implemented using special purpose logic circuitry, e.g., an FPGA (field programmable gate array) and/or an ASIC (application-specific integrated circuit).

The controllers described in this document can include one or more processors. Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as hard drives, magnetic disks, magneto-optical disks, or optical disks. Machine-readable storage media suitable for embodying computer program instructions and data include various forms of non-volatile storage area, including by way of example, semiconductor storage devices, e.g., EPROM, EEPROM, and flash storage devices; magnetic disks, e.g., internal hard disks or removable disks; magneto-optical disks; and CD-ROM and DVD-ROM discs.

The processes for enabling spot cleaning by one or more mobile robots described above can be implemented using software for execution on one or more mobile computing devices, one or more mobile robots, and/or one or more remote computing devices. For instance, the software forms procedures in one or more computer programs that execute on one or more programmed or programmable computer systems, either in the mobile robots, the mobile computing devices, or remote computing systems (which may be of various architectures such as distributed, client/server, or grid), each including at least one processor, at least one data storage system (including volatile and non-volatile memory and/or storage elements), at least one wired or wireless input device or port, and at least one wired or wireless output device or port. The software may form one or more modules of a larger program, for example, that provides other services related to managing the operations of a home, such as cleaning sessions and security monitoring of the home.

The software may be provided on a medium, such as a CD-ROM, DVD-ROM, or Blu-ray disc, readable by a general or special purpose programmable computer or delivered (encoded in a propagated signal) over a network to the computer where it is executed. The functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the description have been described. Nevertheless, it will be understood that various modifications may be made without departing from the spirit and scope of the description. For example, some of the steps described above may be order independent, and thus can be performed in an order different from that described. It is to be understood that the foregoing description is intended to illustrate and not to limit the scope of the invention, which is defined by the scope of the appended claims.

The mobile computing device 104, 165 can be, e.g., a smart watch, a smart camera, a smart goggle, or any other portable device that is capable of capturing images and performing image processing, or capable of capturing images and sending the images to a remote computing device or home computer server that can process the images. The user 212 can identify the location of the spot that needs to be cleaned using various methods. For example, the user may have a home robot and a mobile cleaning robot. The home robot may move about in the home and interact with the user using natural language. The home robot may provide security monitor functions and other services, such as playing music, answering user questions, setting up user calendar, and controlling various devices in the home. The user can point to a spot and speak to the home robot: "Clean this spot." The home robot has a camera and can recognize the spot pointed out by the user, determine the coordinates of the spot, and send the coordinate information to the mobile cleaning robot.

The mobile cleaning robot 102, 238 can store a persistent map in its internal non-volatile storage, instead of or in addition to, storing the persistent map in a storage device of a remote computing system (e.g., a cloud storage system).

In the process 350 (FIG. 8A), instead of tapping on the touch screen to identify the spots that need to be cleaned, the user can draw a border of a region on the touch screen. The spot cleaning program can identify points on the border, send the coordinates of the points on the border to the mobile cleaning robot, and indicate that the points are points on the border of the region to be cleaned. The mobile cleaning robot determines a cleaning path that enables the mobile cleaning robot to clean up the region identified by the points on the border. For example, the mobile cleaning robot can determine a rectangular or circular region that bounds the region to the cleaned, and clean the rectangular or circular region. Alternatively, the spot cleaning program can determine a rectangular or circular region that bounds the region to the cleaned, and sends information about the rectangular or circular region to the mobile cleaning robot. For example, the spot cleaning program can send the coordinates of four corners of the rectangular region, or the coordinates of the center and the radius of the circular region, to the mobile cleaning robot. The mobile cleaning robot can have a "spot cleaning" mode and a "region cleaning" mode. The spot cleaning program can send an instruction to the mobile cleaning robot to activate the "spot cleaning" mode and send position information about spots to be cleaned. In this case, the mobile cleaning robot cleans a small region surrounding each spot identified in the instruction. The spot cleaning program can send an instruction to the mobile cleaning robot to activate the "region cleaning" mode and send position information about a region that needs to be cleaned. In this case, the mobile cleaning robot cleans the region identified by the instruction.

The image detection modules 133 and 135 can be trained using various machine learning techniques. For example, supervised learning techniques may be implemented in which training is based on a desired output that is known for an input. Supervised learning can be considered an attempt to map inputs to outputs and then estimate outputs for previously unused inputs. Unsupervised learning techniques may also be used in which training is provided from known inputs but unknown outputs. Reinforcement learning techniques may also be employed in which the system can be considered as learning from consequences of actions taken (e.g., inputs values are known and feedback provides a performance measure). In some arrangements, the implemented technique may employ two or more of these methodologies.

As discussed above, neural network techniques can be implemented using images of various models of mobile cleaning robots to invoke training algorithms for automatically learning to identify the robots and their orientation angles. Such neural networks typically employ a number of layers. Once the layers and number of units for each layer is defined, weights and thresholds of the neural network are typically set to minimize the prediction error through training of the network. Such techniques for minimizing error can be considered as fitting a model (represented by the network) to the training data. A function may be defined that quantifies error (e.g., a squared error function used in regression techniques). By minimizing error, a first neural network may be developed that is capable of identifying a robot, and a second neural network may be developed that is capable of determining the angle of orientation of the robot. When training the second neural network for recognizing the angle of orientation, because the error in the orientation angle is cyclical (having a value in a range between 0 to 360°), a cyclical loss function such as (min (|Delta_error−360|,|60−Delta_error|)^2) can be used in training the neural network. Other factors may also be accounted for during neutral network development. For example, a model may too closely attempt to fit data (e.g., fitting a curve to the extent that the modeling of an overall function is degraded). Such overfitting of a neural network may occur during the model training and one or more techniques may be implemented to reduce its effects.

One or more techniques may be implemented for training the image detection module from the data calculated from the training images. For example, the neural network of the detection module may be trained by defining a cost function from the calculated data. In general, the cost function can be considered as providing a measure of a solution compared to an optimal solution. For machine learning that employs supervised learning, a cost function can be considered to assist with mapping (e.g., by minimizing error) between an output and a target. Implementing unsupervised learning, a cost function can be defined (e.g., as a function of data) and minimized to provide an output value. Techniques involved in the training of artificial neural networks may also employ techniques that involve cost functions. For example, a cost function may be processed (e.g., compute a derivative) with respect to parameters of the function to determine output values. A regularization component can be added to the cost function to counteract over-fitting by the function. To assist with the machine learning, the costs function provides a cost along with a derivative.

Typically a series of training cycles are executed to prepare a machine learning system (e.g., the detection modules 133, 135 in FIG. 1A). Once training is complete, the system may be used for detecting robots in images, and orientation angles of the robots.

Deep machine learning may be utilized for the detection modules 133, 135 in which a set of algorithms attempt to model high-level abstractions in data by using model architectures, with complex structures or otherwise, composed of multiple nonlinear transformations. Such deep learning techniques can be considered as being based on learning representations of data. The deep learning techniques can be considered as using a cascade of many layers of nonlinear processing units for feature extraction and transformation. The next layer uses the output from the previous layer as input. The algorithms may be supervised, unsupervised, combinations of supervised and unsupervised. The techniques are based on the learning of multiple levels of features or representations of the data (e.g., features of mobile cleaning robots). Multiple layers of nonlinear processing units along with supervised or unsupervised learning of representations can be employed at each layer, with the layers forming a hierarchy from low-level to high-level features. By employing such layers, a number of parameterized transformations are used as data propagates from the input layer to the output layer.

Other embodiments are within the scope of the following claims.

What is claimed is:

1. A system for enabling spot cleaning, the system comprising:
    a mobile computing device comprising:
        at least one camera configured to capture images of an environment;
        a storage device storing processor-executable instructions; and
        at least one data processor communicatively coupled to the storage device, in which upon execution of the processor-executable instructions by the at least one data processor, the at least one data processor is configured to:
            establish, based at least in part on first information provided by the at least one camera of the mobile computing device, a coordinate system corresponding to the environment;
            determine, based at least in part on second information provided by the at least one camera of the mobile computing device, a first set of coordinates of a region at a first location;
            determine, based at least in part on third information provided by the at least one camera of the mobile computing device, a second set of coordinates of a mobile cleaning robot at a second location;
            send at least one of (i) the first set of coordinates and the second set of coordinates, or (ii) the coordinates of the first location relative to the second location, to the mobile cleaning robot; and
            send a first instruction to the mobile cleaning robot to request the mobile cleaning robot to travel to the first location.

2. The system of claim 1 in which the at least one data processor is configured to send a second instruction to the mobile cleaning robot to request the mobile cleaning robot to perform a cleaning function in the region at the first location.

3. The system of claim 1 in which the storage device stores a neural network that was trained using images of the mobile cleaning robot or similar mobile cleaning robots, or images derived from the images of the mobile cleaning robot or similar mobile cleaning robots, and the at least one data processor is configured to:
    process, using the neural network, images provided by the at least one camera, or images derived from the images of the mobile cleaning robot provided by the at least one camera, to identify the mobile cleaning robot in the images.

4. The system of claim 3 in which the at least one data processor is configured to identify a feature of the mobile cleaning robot in the image, determine coordinates of the feature in the coordinate system, and assign the coordinates of the feature as the second set of coordinates of the mobile cleaning robot.

5. The system of claim 1 in which the at least one data processor is configured to:
    use fourth information provided by the at least one camera,
    determine an angle of orientation of the mobile cleaning robot, and
    send the angle of orientation of the mobile cleaning robot to the mobile cleaning robot.

6. The system of claim 5 in which the at least one data processor is configured to use a neural network to process images of the mobile cleaning robot provided by the at least one camera, or images derived from the images of the mobile cleaning robot provided by the at least one camera, to determine the angle of orientation of the mobile cleaning robot.

7. The system of claim 6 in which the at least one data processor is configured to:
    process images of the mobile cleaning robot to generate top-view images of the mobile cleaning robot, and
    use the neural network to process the top-view images of the mobile cleaning robot to determine the angle of orientation of the mobile cleaning robot.

8. The system of claim 7 in which the neural network was trained using top-view images of the mobile cleaning robot or similar mobile cleaning robots.

9. The system of claim 5, further comprising the mobile cleaning robot, in which the mobile cleaning robot is configured to, upon receiving the first instruction, the first set of coordinates, the second set of coordinates, and the angle of orientation, travel from the second location to the first location.

10. The system of claim 1 in which the at least one data processor is configured to:
    process video frames provided by the at least one camera and identify feature points in the video frames;
    track the feature points across multiple video frames and estimate three-dimensional positions of the feature points;
    fit planes to the feature points and identify a plane that best matches the feature points; and
    establish the coordinate system based on the identified plane.

11. The system of claim 10 in which the feature points substantially lie on a floor surface, and the identified plane substantially lies on the floor surface.

12. The system of claim 1 in which the storage device stores program code for one or more image detection modules and an augmented reality toolkit, and the at least one data processor is configured to use the one or more image detection modules and the augmented reality toolkit to establish the coordinate system in the environment, determine the first set of coordinates of the region, and determine the second set of coordinates of the mobile cleaning robot.

13. The system of claim 1 in which the first information comprises images of the environment, the second information comprises one or more images of the region at the first location, and the third information comprises one or more images of the mobile cleaning robot.

14. A system for enabling spot cleaning, the system comprising:
    a mobile computing device comprising:
        at least one camera configured to capture images of an environment;

a storage device storing processor-executable instructions; and at least one data processor communicatively coupled to the storage device, in which upon execution of the processor-executable instructions by the at least one data processor, the at least one data processor is configured to:

establish, based at least in part on first information provided by the at least one camera of the mobile computing device, a coordinate system corresponding to the environment;

determine, based at least in part on second information provided by the at least one camera of the mobile computing device, a first set of coordinates of a region at a first location;

determine, based at least in part on third information provided by the at least one camera of the mobile computing device, a second set of coordinates of an object in the environment, in which the location of the object is known to a mobile cleaning robot;

send at least one of (i) coordinates of the region and coordinates of the object, or (ii) relative position information about the region and the object, to the mobile cleaning robot; and send a first instruction to the mobile cleaning robot to request the mobile cleaning robot to travel to the first location.

15. The system of claim 14, further comprising the mobile cleaning robot, in which the mobile cleaning robot is configured to travel to the first location based on information about the position of the object in a map maintained by the mobile cleaning robot, and information about the position of the first location relative to the object.

16. A method for spot cleaning using a mobile cleaning robot, the method comprising:

using a camera of a mobile computing device to capture images of an environment;

establishing, using at least one data processor of the mobile computing device, a coordinate system corresponding to the environment based at least in part on first information derived from the images of the environment captured using the camera of the mobile computing device;

determining, using the at least one data processor of the mobile computing device, a first set of coordinates of a region at a first location based at least in part on one or more images of the region captured using the camera of the mobile computing device;

determining, using the at least one data processor of the mobile computing device, a second set of coordinates of a mobile cleaning robot at a second location based at least in part on one or more images of the mobile cleaning robot captured using the camera of the mobile computing device;

sending at least one of (i) the first set of coordinates and the second set of coordinates, or (ii) the coordinates of the first location relative to the second location, from the mobile computing device to the mobile cleaning robot; and sending an instruction from the mobile computing device to the mobile cleaning robot to request the mobile cleaning robot to travel to the first location.

17. The method of claim 16 in which determining the second set of coordinates of the mobile cleaning robot at the second location comprises:

using a neural network to process images of the mobile cleaning robot to identify the mobile cleaning robot in the images.

18. The method of claim 17 in which determining the second set of coordinates of the mobile cleaning robot at the second location comprises:

identifying a feature of the mobile cleaning robot in the image, determine coordinates of the feature in the coordinate system, and assign the coordinates of the feature as the second set of coordinates of the mobile cleaning robot.

19. The method of claim 17 in which the neural network was trained using images of the mobile cleaning robot or similar mobile cleaning robots, or images derived from the images of the mobile cleaning robot or similar mobile cleaning robots.

20. The method of claim 16, comprising:

determining, using the at least one data processor, an angle of orientation of the mobile cleaning robot based at least in part on images of the mobile cleaning robot, and sending the angle of orientation of the mobile cleaning robot to the mobile cleaning robot.

21. The method of claim 20, comprising using a neural network to process the images of the mobile cleaning robot, or images derived from the images of the mobile cleaning robot, to determine the angle of orientation of the mobile cleaning robot.

22. The method of claim 21, comprising:

processing the images of the mobile cleaning robot to generate top-view images of the mobile cleaning robot, and using the neural network to process the top-view images of the mobile cleaning robot to determine the angle of orientation of the mobile cleaning robot.

23. The method of claim 21 in which the neural network was trained using images of the mobile cleaning robot or similar mobile cleaning robots, or images derived from the images of the mobile cleaning robot or similar mobile cleaning robots.

24. The method of claim 20, comprising causing the mobile cleaning robot, based on the received (i) the first set of coordinates and the second set of coordinates, or (ii) the coordinates of the first location relative to the second location, and angle of orientation, to travel from the second location to the first location.

25. The method of claim 16, comprising:

processing video frames of the environment and identifying feature points from the video frames;

tracking the feature points across multiple video frames and estimating three-dimensional positions of the feature points;

fitting planes to the feature points and identifying a plane that best matches the feature points; and establishing the coordinate system based on the identified plane.

26. The method of claim 25 in which the video frames comprise video frames of a floor surface in the environment, the identified plane substantially lies on a floor surface, and the coordinate system comprises a Cartesian coordinate system having two axes that lie on the identified plane.

27. The method of claim 16, comprising:

showing, through a user interface, images of the environment to a user, and receiving an instruction from the user that identifies the region at the first location in the images.

28. The method of claim 27, comprising sending an instruction from the mobile computing device to the mobile cleaning robot to request the mobile cleaning robot to follow the user as the user moves from a vicinity of the first location to a vicinity of the second location.

29. The method of claim 28, comprising, at the mobile cleaning robot, capturing images of the user, tracking the user using image recognition, and following the user as the user moves from the vicinity of the first location to the vicinity of the second location.

30. The method of claim 16, comprising using an augmented reality toolkit to establish the coordinate system in the environment, determine the first set of coordinates of the region, and determine the second set of coordinates of the mobile cleaning robot.

* * * * *